US008718537B2

(12) United States Patent  
Sakata et al.

(10) Patent No.: US 8,718,537 B2  
(45) Date of Patent: May 6, 2014

(54) COMMUNICATION SYSTEM

(75) Inventors: Tsuguhide Sakata, Sagamihara (JP); Mitsuru Yamamoto, Kawasaki (JP); Ichiro Kato, Kawasaki (JP); Yasunori Ohora, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1117 days.

(21) Appl. No.: 11/848,955

(22) Filed: Aug. 31, 2007

(65) Prior Publication Data

US 2008/0063216 A1 Mar. 13, 2008

(30) Foreign Application Priority Data

Sep. 7, 2006 (JP) ................................. 2006-243399  
May 25, 2007 (JP) ................................. 2007-139527

(51) Int. Cl.

| H04H 40/00 | (2008.01) |
| H04B 7/00 | (2006.01) |
| H04M 3/00 | (2006.01) |
| H04N 9/475 | (2006.01) |
| H04B 1/00 | (2006.01) |
| H04B 1/06 | (2006.01) |
| H04R 5/00 | (2006.01) |
| H04B 5/00 | (2006.01) |
| H03G 5/00 | (2006.01) |
| H04L 7/04 | (2006.01) |
| H04S 3/00 | (2006.01) |
| H04N 21/43 | (2011.01) |

(52) U.S. Cl.  
CPC ................. *H04L 7/041* (2013.01); *H04S 3/006* (2013.01); *H04R 2420/07* (2013.01); *H04N 21/4307* (2013.01)  
USPC ......... 455/3.06; 455/41.2; 455/420; 348/515; 375/136; 375/267; 381/18; 381/79; 381/98

(58) Field of Classification Search  
CPC ............... H04N 21/4307; H04S 3/006; H04R 2420/07; H04L 7/033; H04L 7/041  
USPC .......... 455/3.03, 3.06, 6.3, 41.2, 45, 66.1, 74, 455/344, 345, 420, 575.1; 348/485, 515, 348/552, 734; 375/130, 133, 136, 138, 146, 375/147, 244, 267, 285, 295, 316; 381/1, 3, 381/14, 18, 28, 77, 80, 86, 99, 311; 700/94; 705/57, 58; 709/225; 725/25, 87, 89, 725/92, 134  
See application file for complete search history.

(56) References Cited

U.S. PATENT DOCUMENTS 3,927,269 A * 12/1975 Yoshino et al. .................. 348/24  
4,920,569 A * 4/1990 Yoshio ............................. 381/61

(Continued)

FOREIGN PATENT DOCUMENTS

JP 02-122800 A 5/1990  
JP 2001-223588 A 8/2001

(Continued)

*Primary Examiner* — Ping Hsieh  
*Assistant Examiner* — Paul P Tran  
(74) *Attorney, Agent, or Firm* — Carter, DeLuca, Farrell & Schmidt LLP

(57) ABSTRACT

A communication system has a controller for transmitting data to be played back by a plurality of playback devices corresponding to a plurality of channels, and a plurality of adapters required for executing playback by the playback devices. The controller has a setting unit which sets data to be played back by the playback devices and control information required to control playback of the data in time slots of a sync transmission frame, and a transmission unit which transmits the sync transmission frame the by the setting unit to the adapters. Each adapter has a reception unit which receives the transmitted sync transmission frame, and a playback control unit which extracts data corresponding to the channel to be played back by the adapter from the sync transmission frame, and controls the playback timing of the data based on control information corresponding to the data.

15 Claims, 56 Drawing Sheets

(56) References Cited

U.S. PATENT DOCUMENTS

| | | | | |
|---|---|---|---|---|
| 4,937,812 | A * | 6/1990 | Itoh et al. | 370/246 |
| 5,737,427 | A * | 4/1998 | Ambourn | 381/18 |
| 5,747,888 | A * | 5/1998 | Zilberberg | 307/66 |
| 5,867,223 | A * | 2/1999 | Schindler et al. | 348/552 |
| 6,016,166 | A * | 1/2000 | Huang et al. | 348/515 |
| 6,466,832 | B1 * | 10/2002 | Zuqert et al. | 700/94 |
| 6,512,884 | B1 * | 1/2003 | Sawada | 386/203 |
| 6,570,852 | B1 * | 5/2003 | Suzuki | 370/235 |
| 6,608,907 | B1 * | 8/2003 | Lee | 381/311 |
| 6,684,060 | B1 * | 1/2004 | Curtin | 375/146 |
| 7,061,365 | B2 * | 6/2006 | Izumi | 340/3.1 |
| 7,123,906 | B1 * | 10/2006 | Otterbeck et al. | 455/422.1 |
| 7,295,247 | B2 * | 11/2007 | Bang | 348/515 |
| 2004/0213411 | A1 * | 10/2004 | Sakagami | 381/1 |
| 2007/0011061 | A1 * | 1/2007 | East | 705/28 |
| 2007/0171976 | A1 * | 7/2007 | Toma et al. | 375/240.15 |

FOREIGN PATENT DOCUMENTS

| | | |
|---|---|---|
| JP | 2002-217911 A | 8/2002 |
| JP | 2003-264898 A | 9/2003 |
| JP | 2005-006069 A | 1/2005 |
| JP | 2005-175744 A | 6/2005 |
| JP | 2005-175745 A | 6/2005 |
| JP | 2005-198249 A | 7/2005 |

* cited by examiner

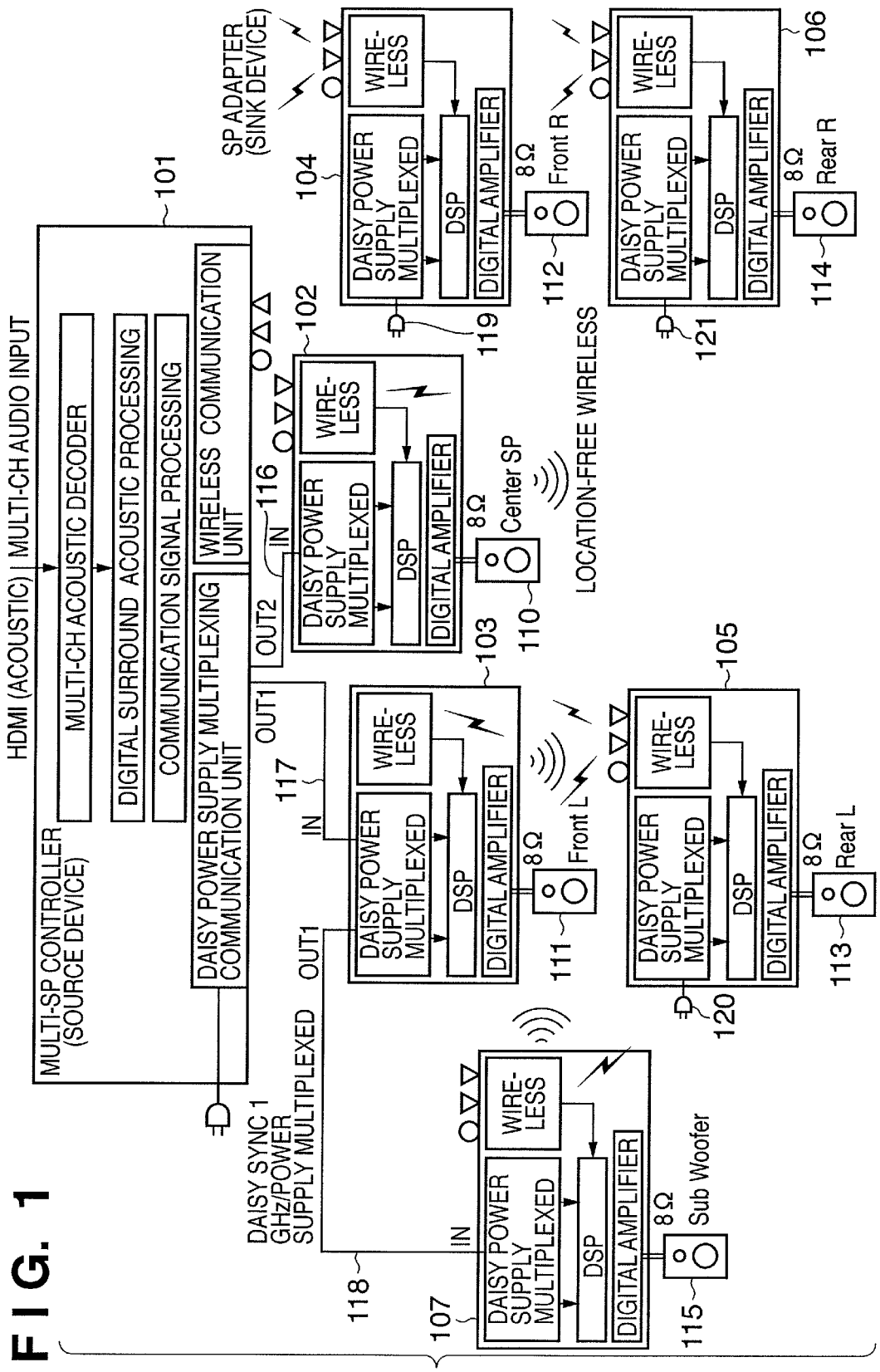
F I G. 1

DAISY CONNECTOR INPUT
SIDE PLUG(凸)

DAISY CONNECTOR OUTPUT
SIDE PLUG(凹)

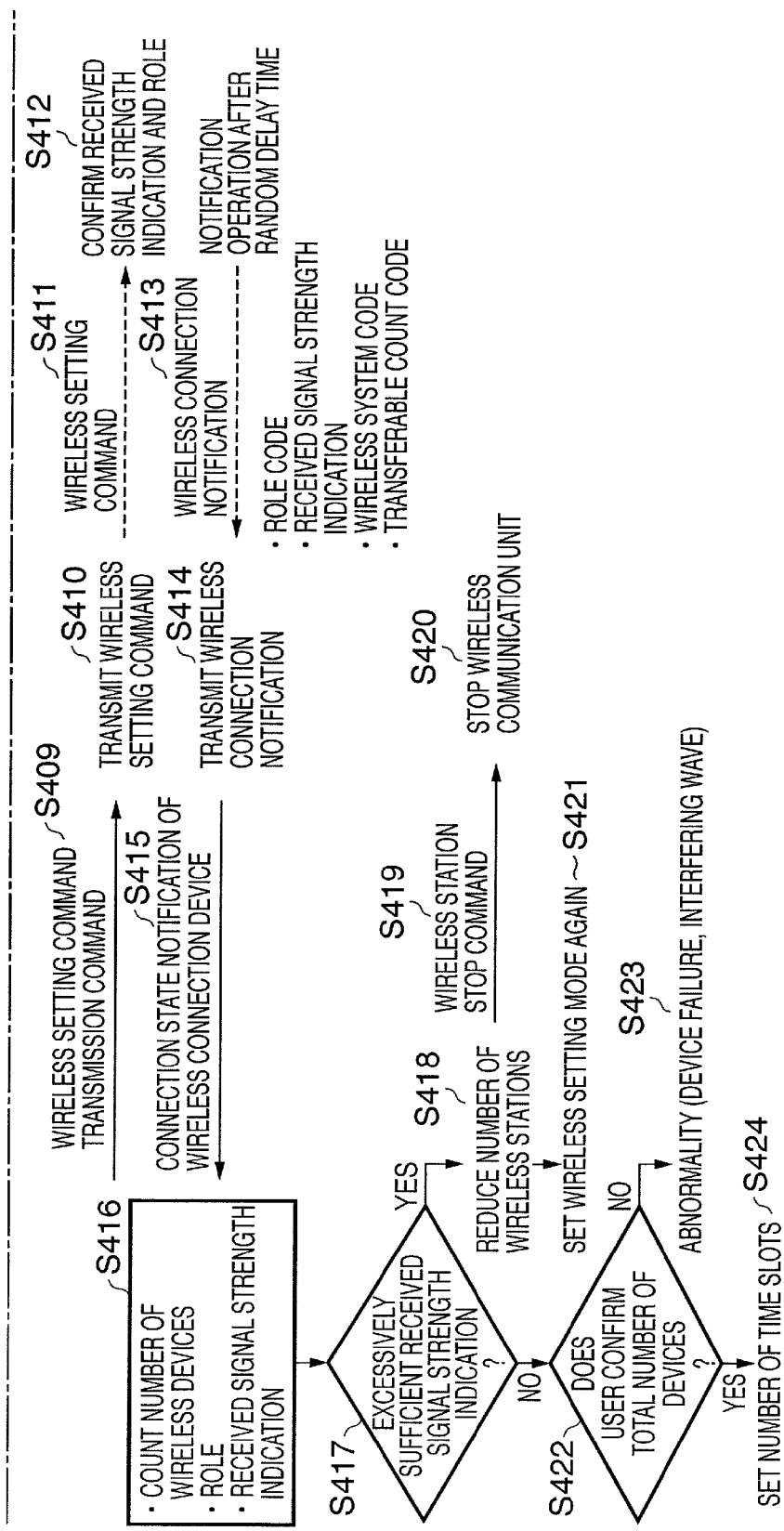

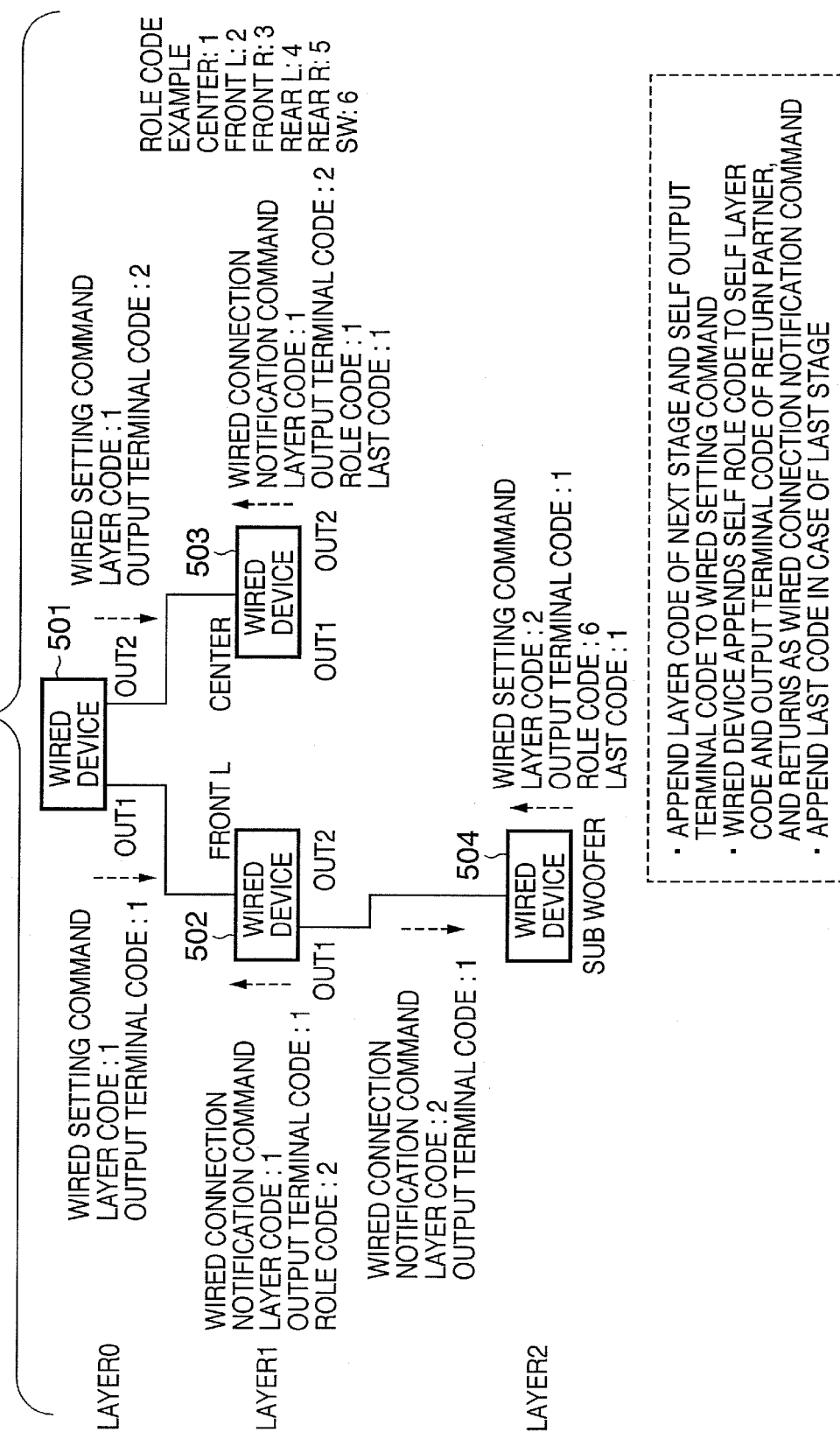

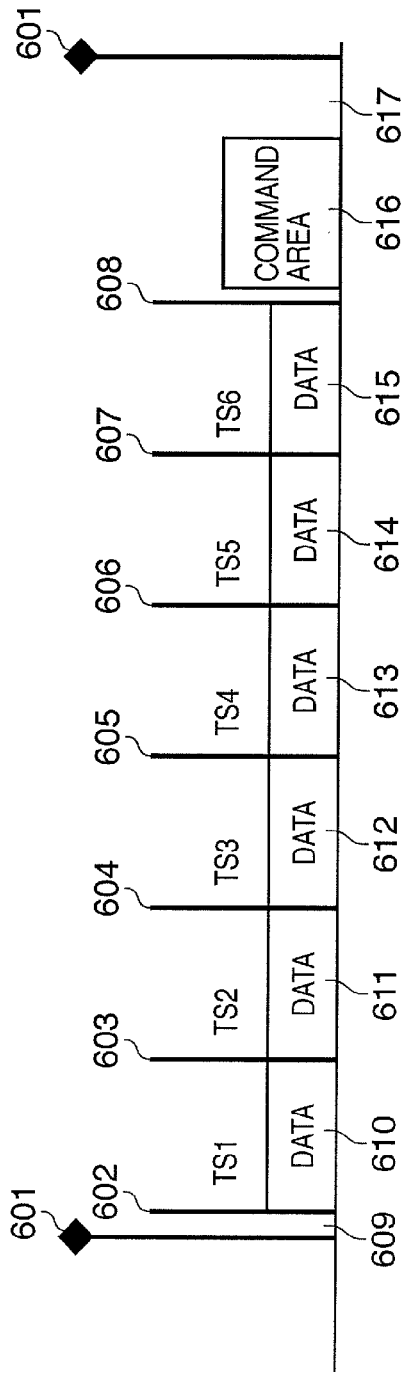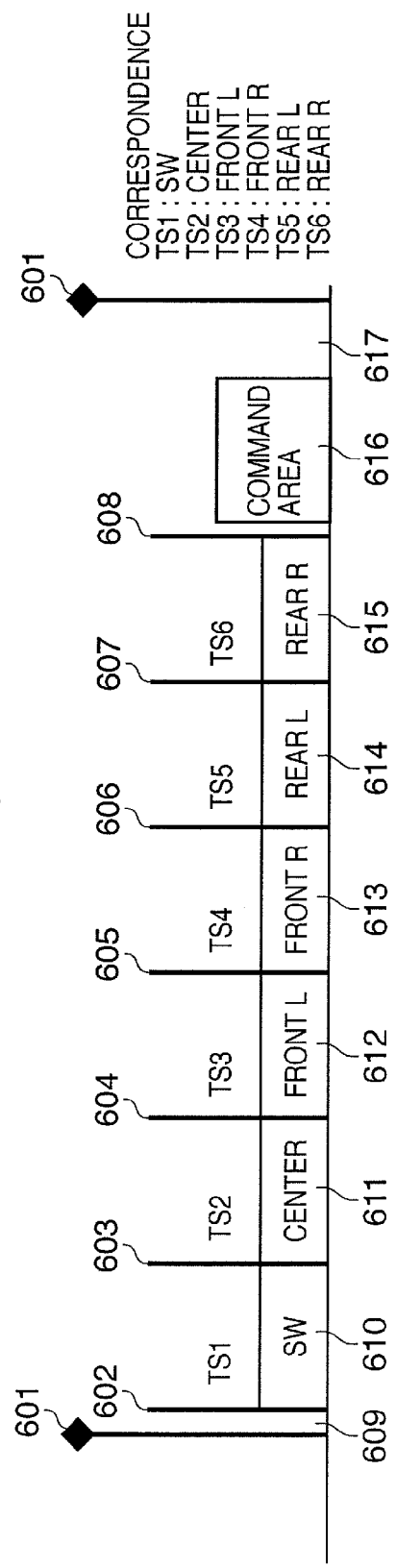

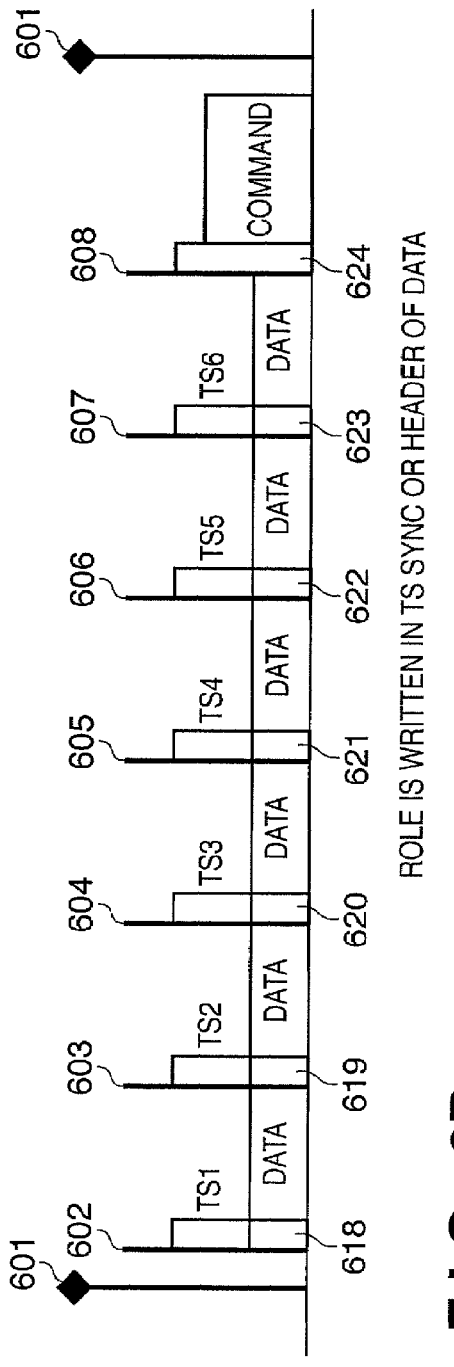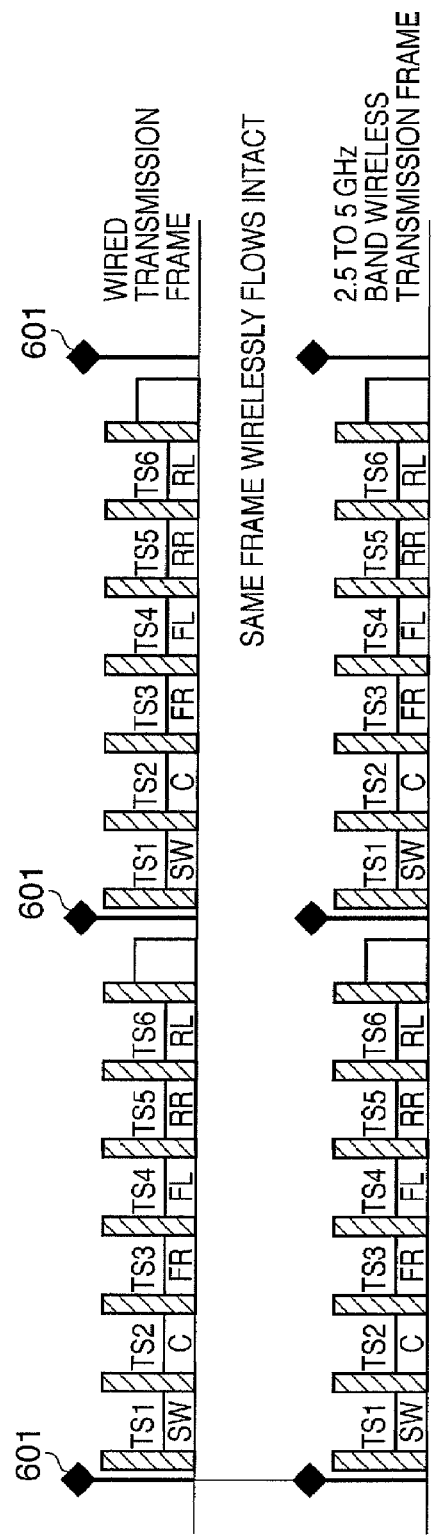

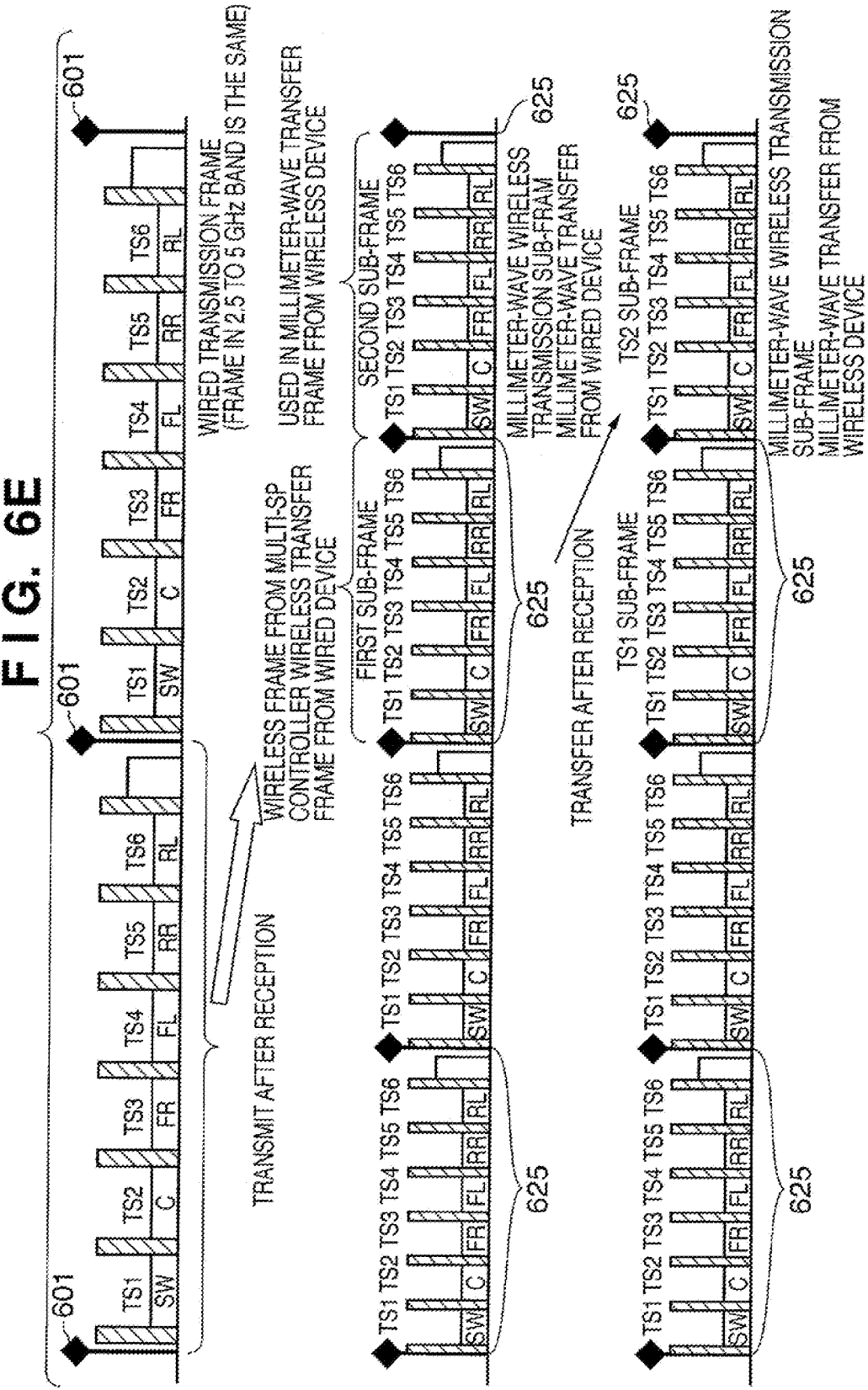

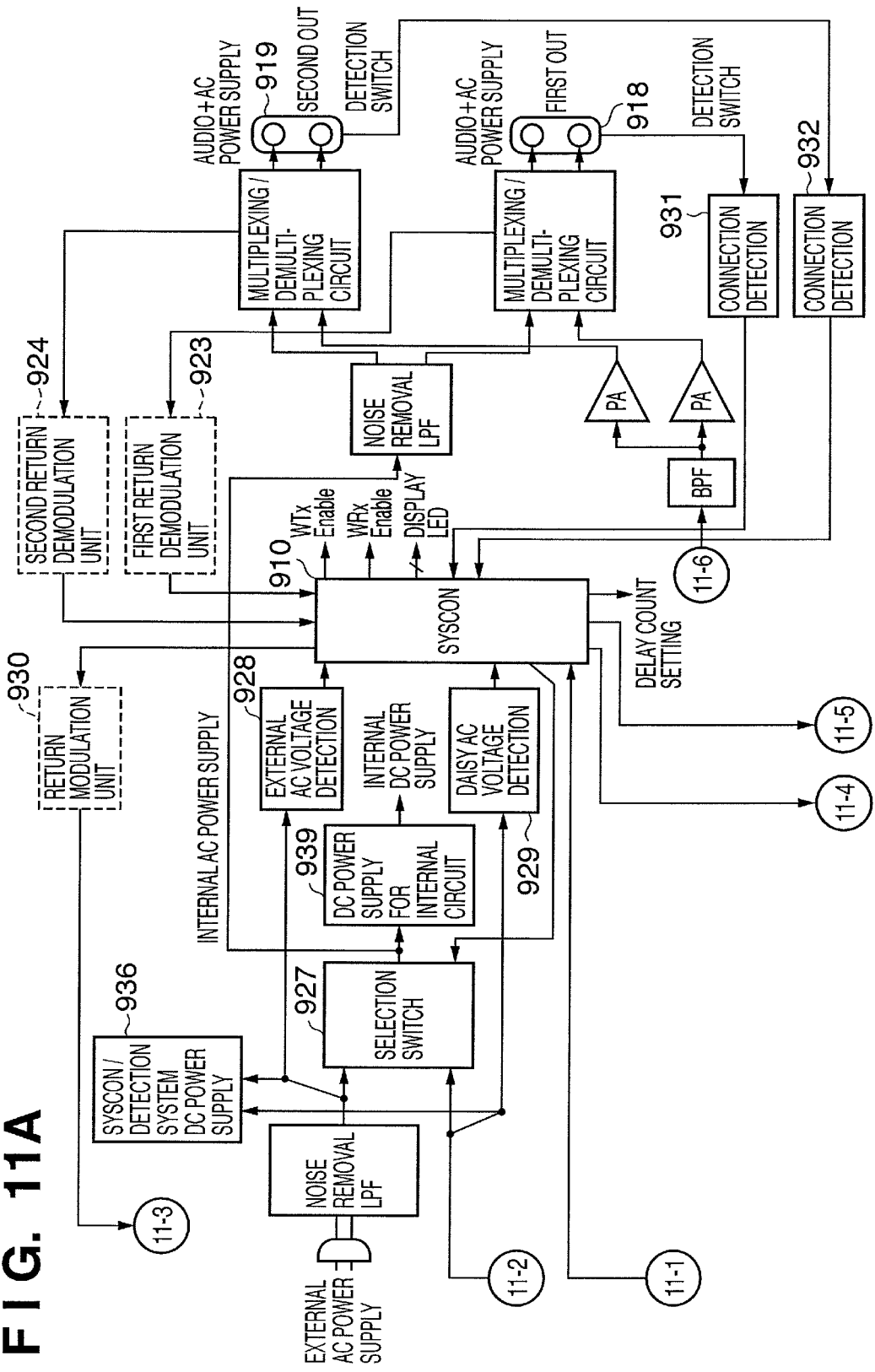
F I G. 11A

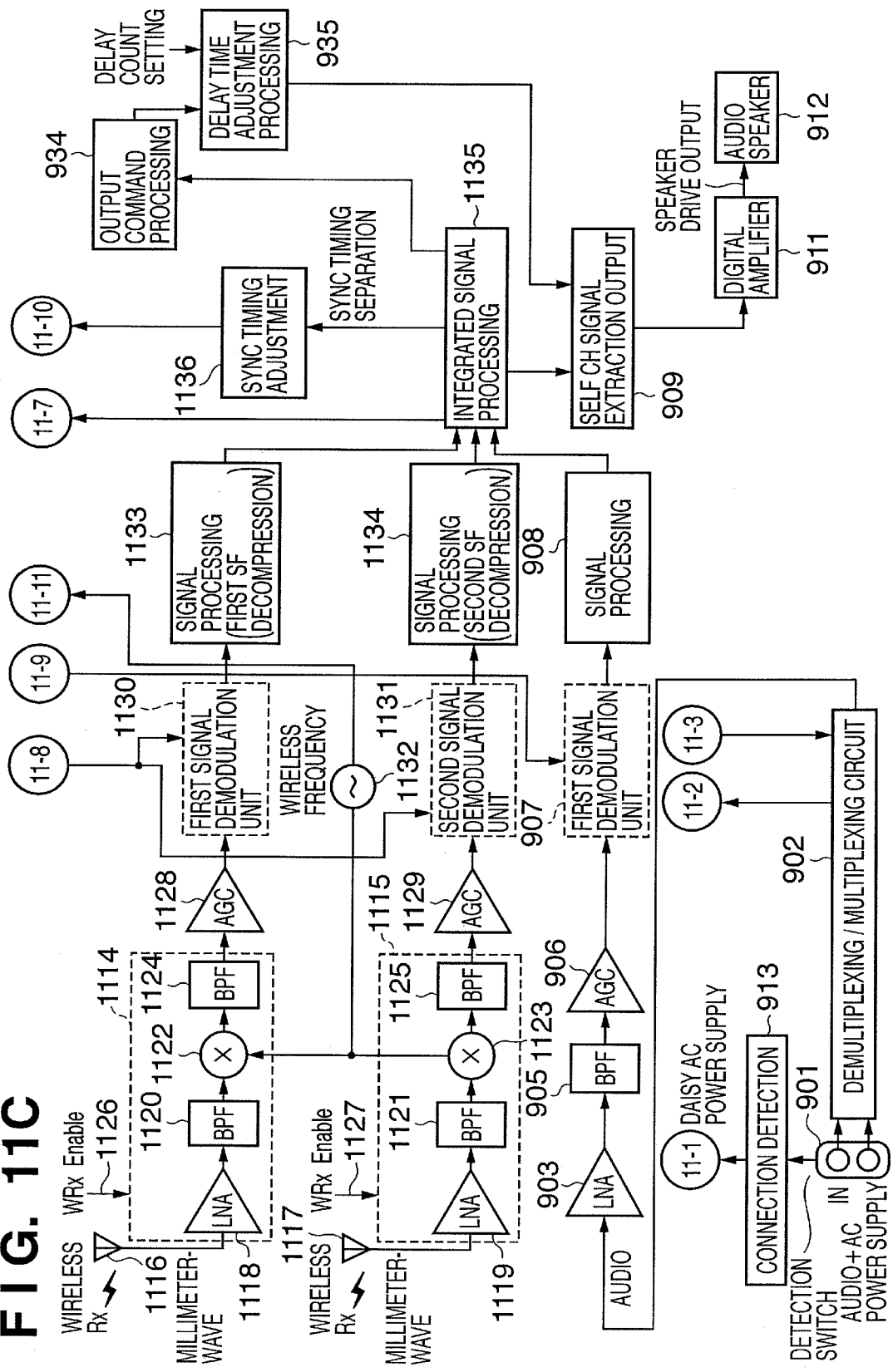

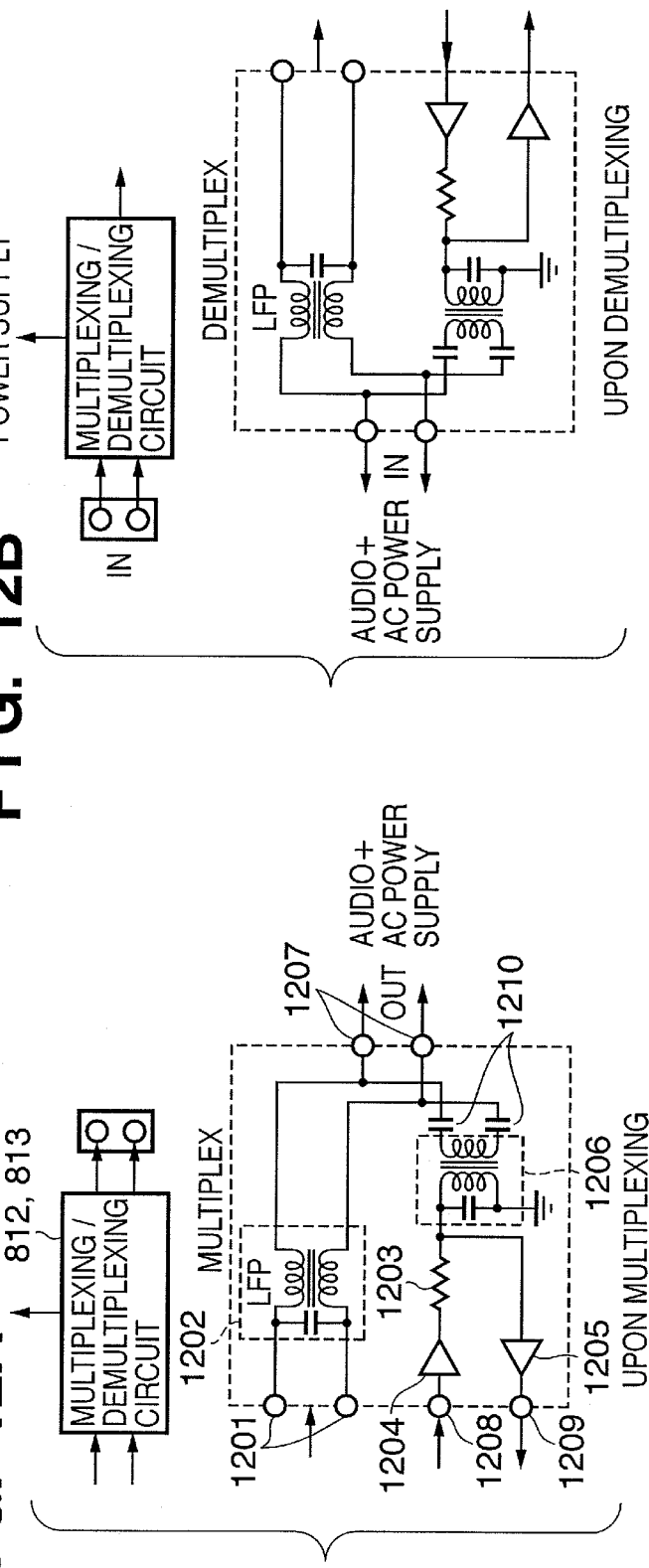
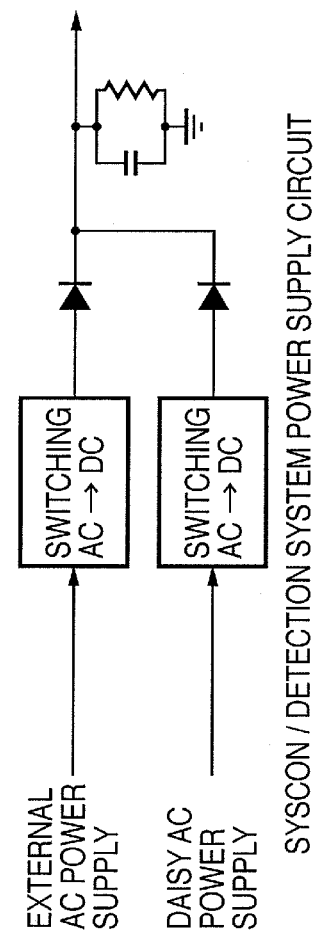
FIG. 12A  FIG. 12B  FIG. 12C

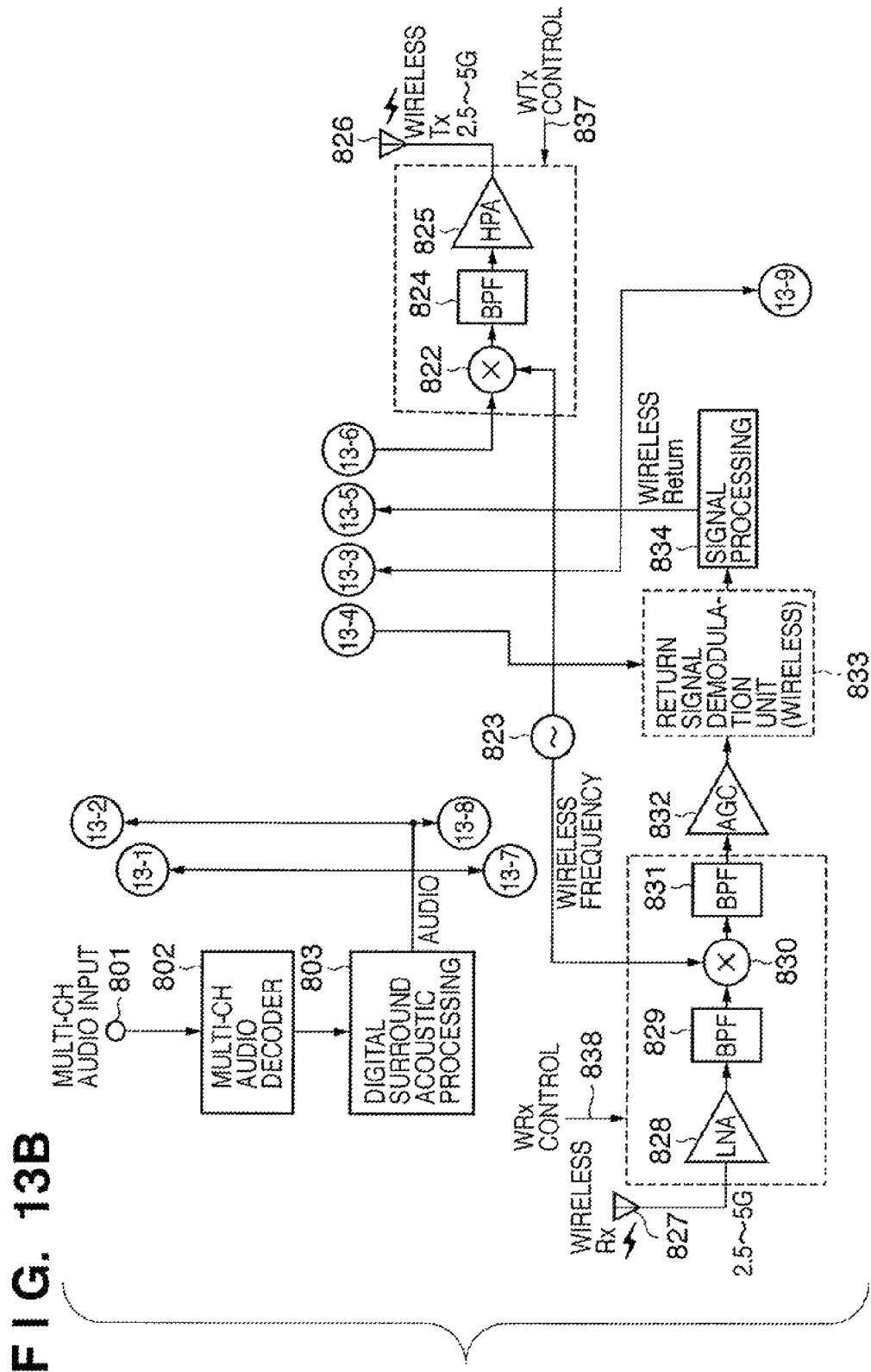

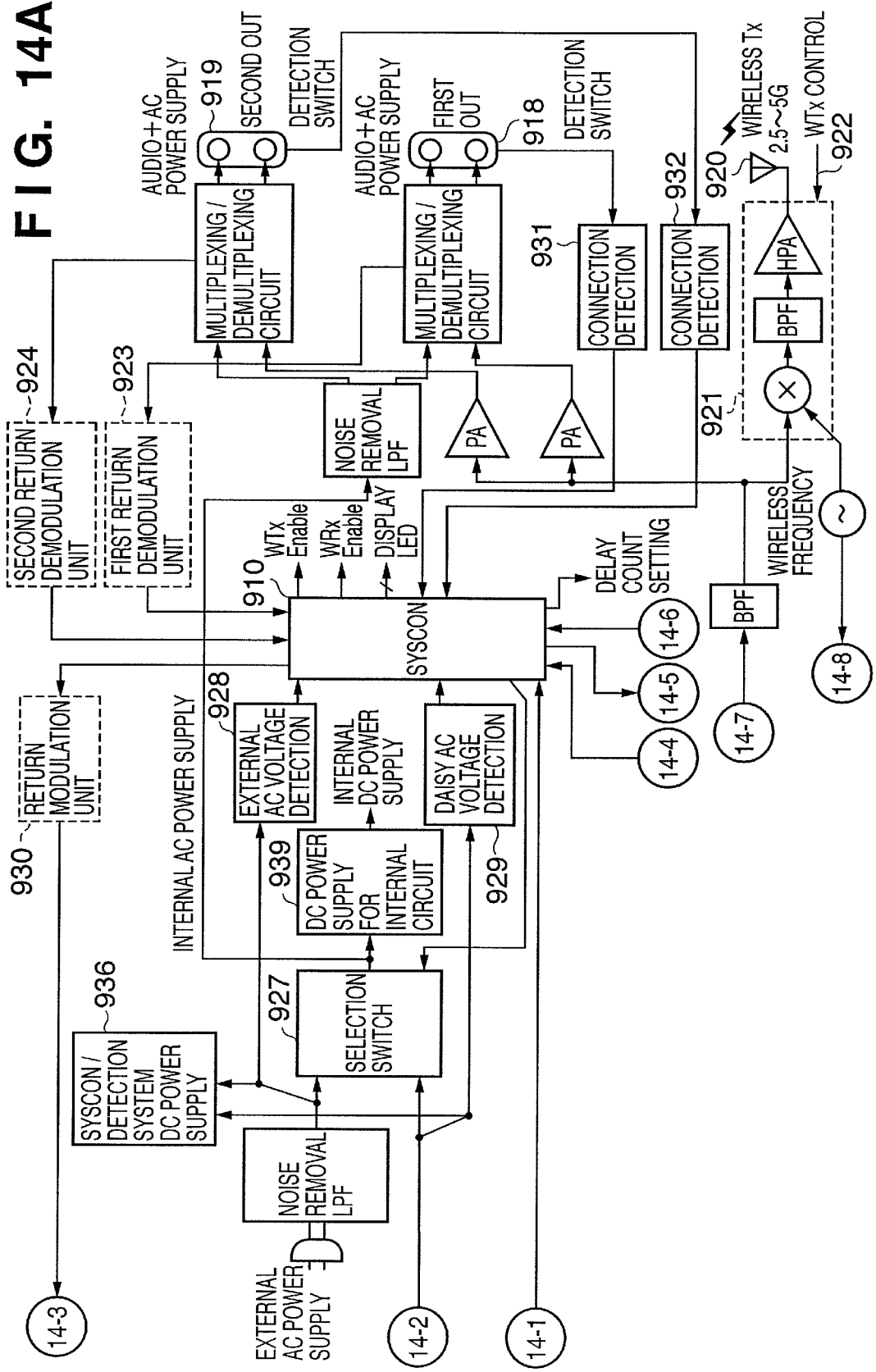
F I G. 14A

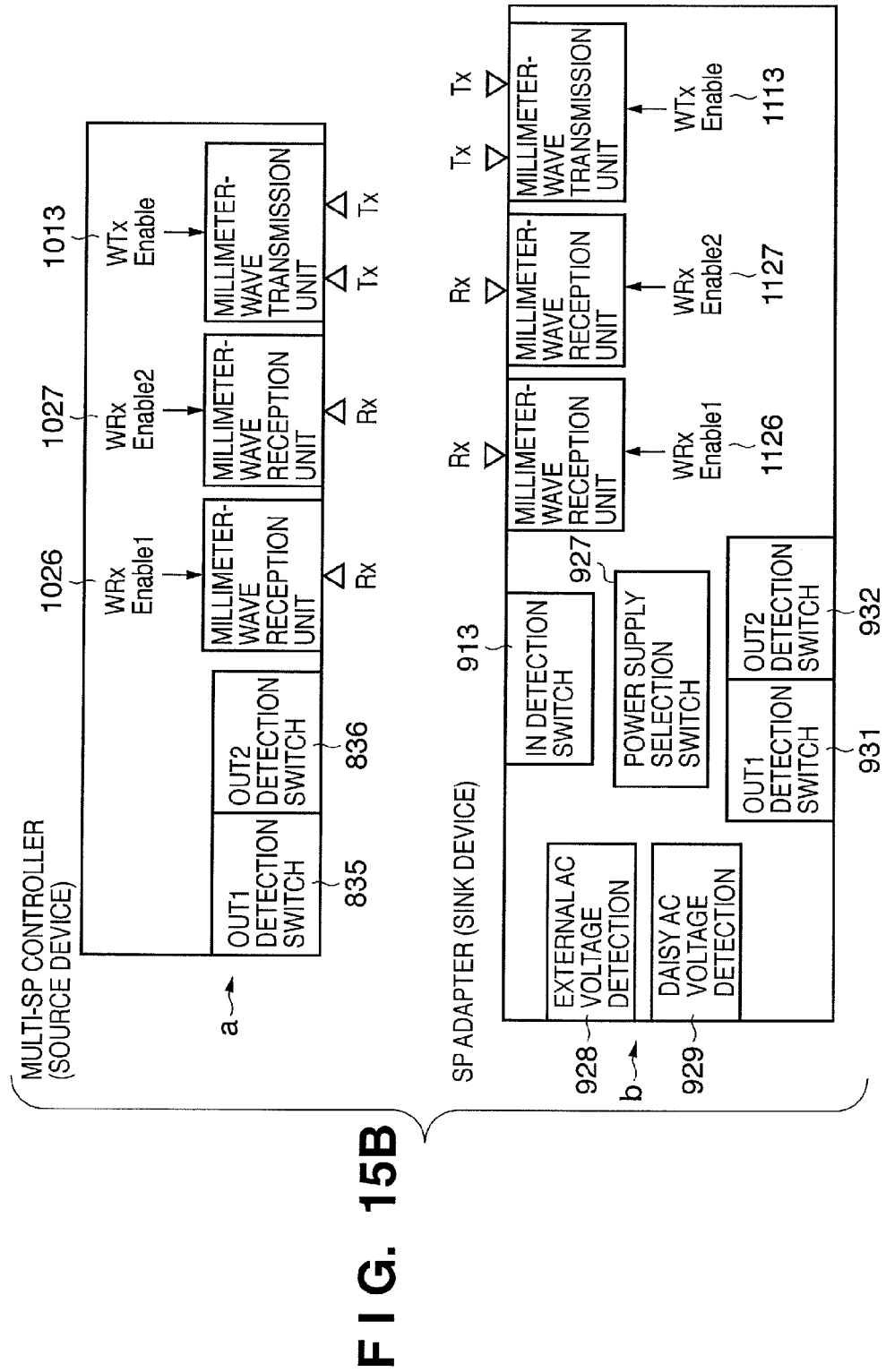
F I G. 15B

FIG. 16A(1)
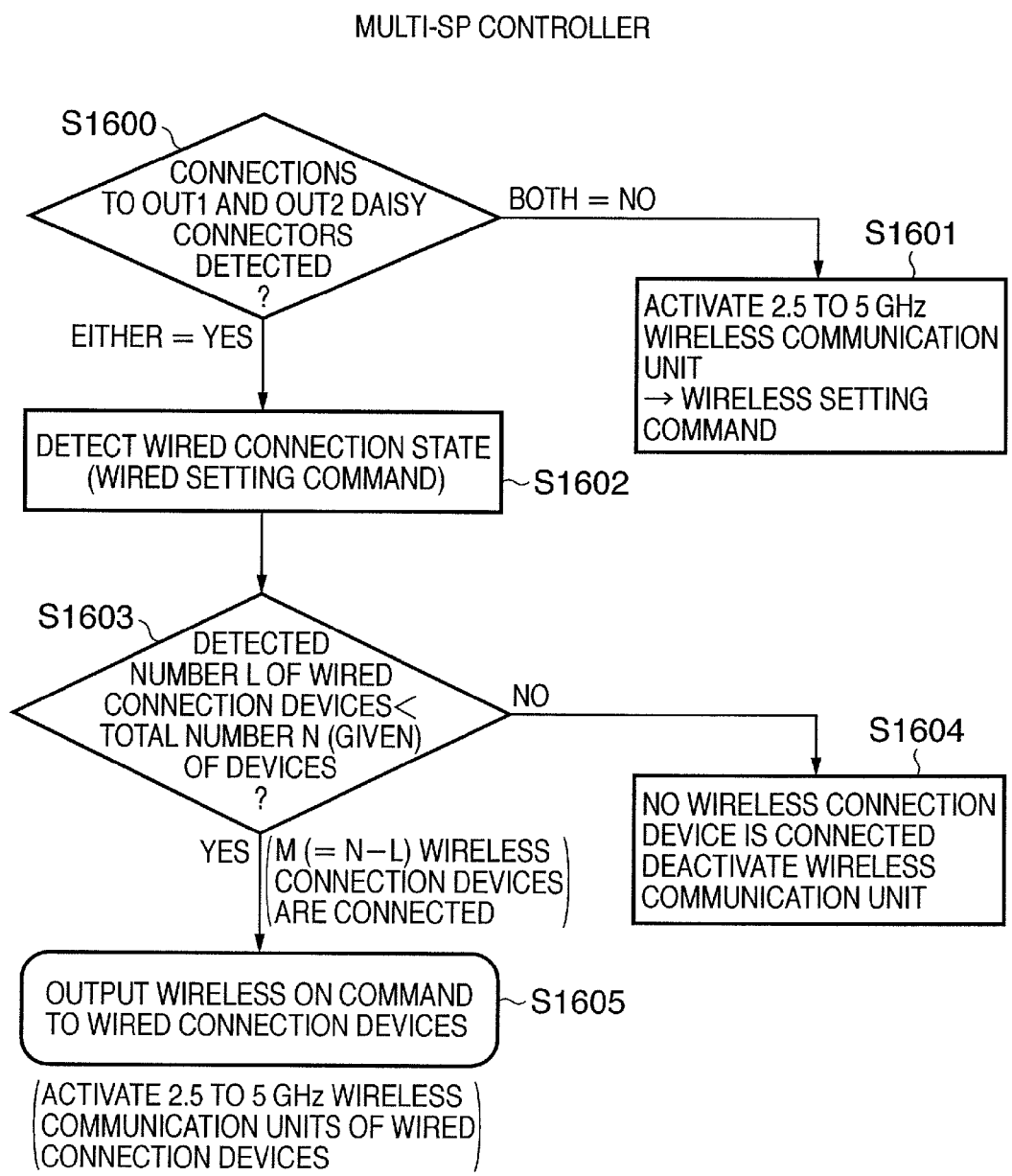

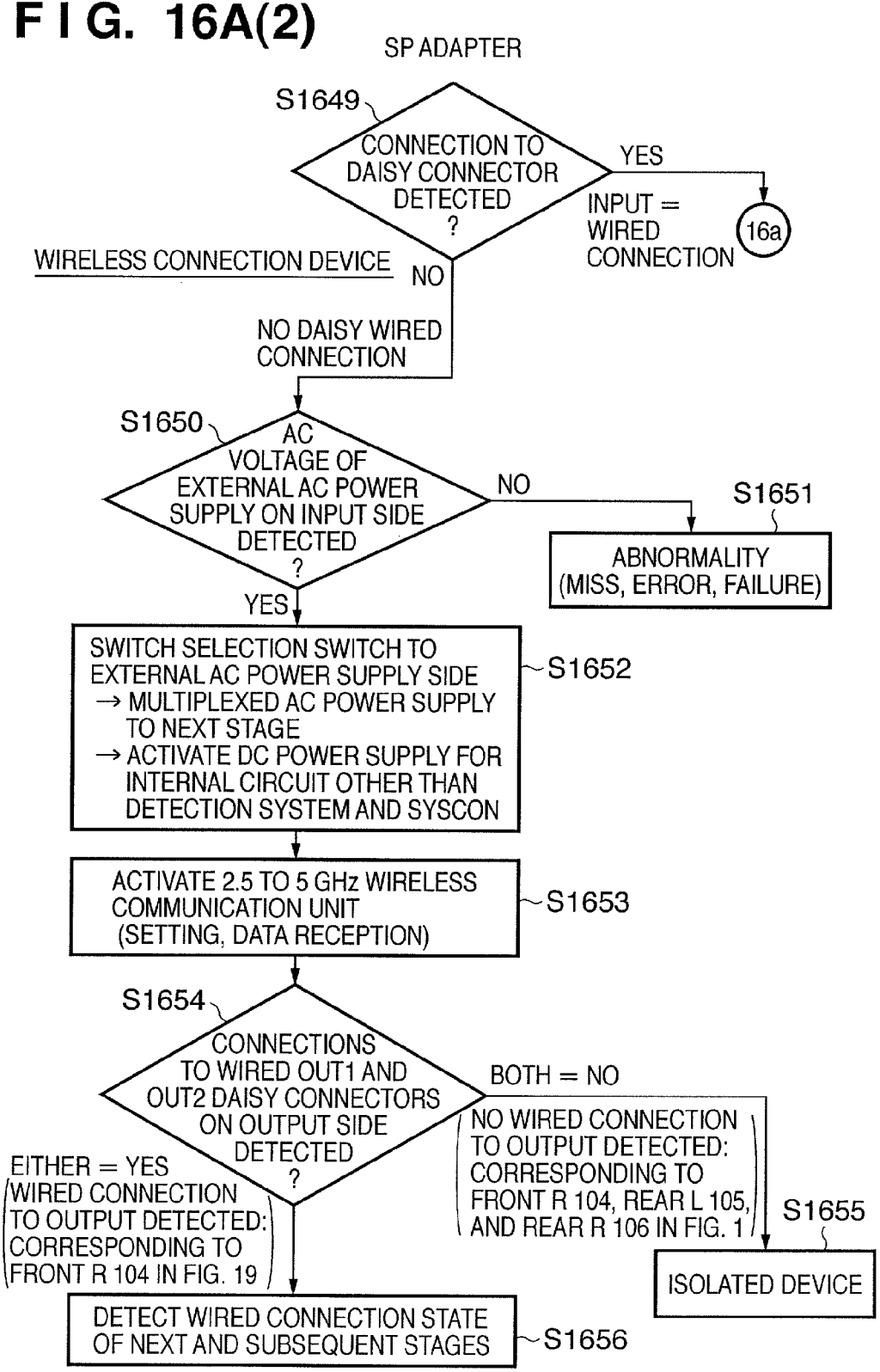
FIG. 16A(2)

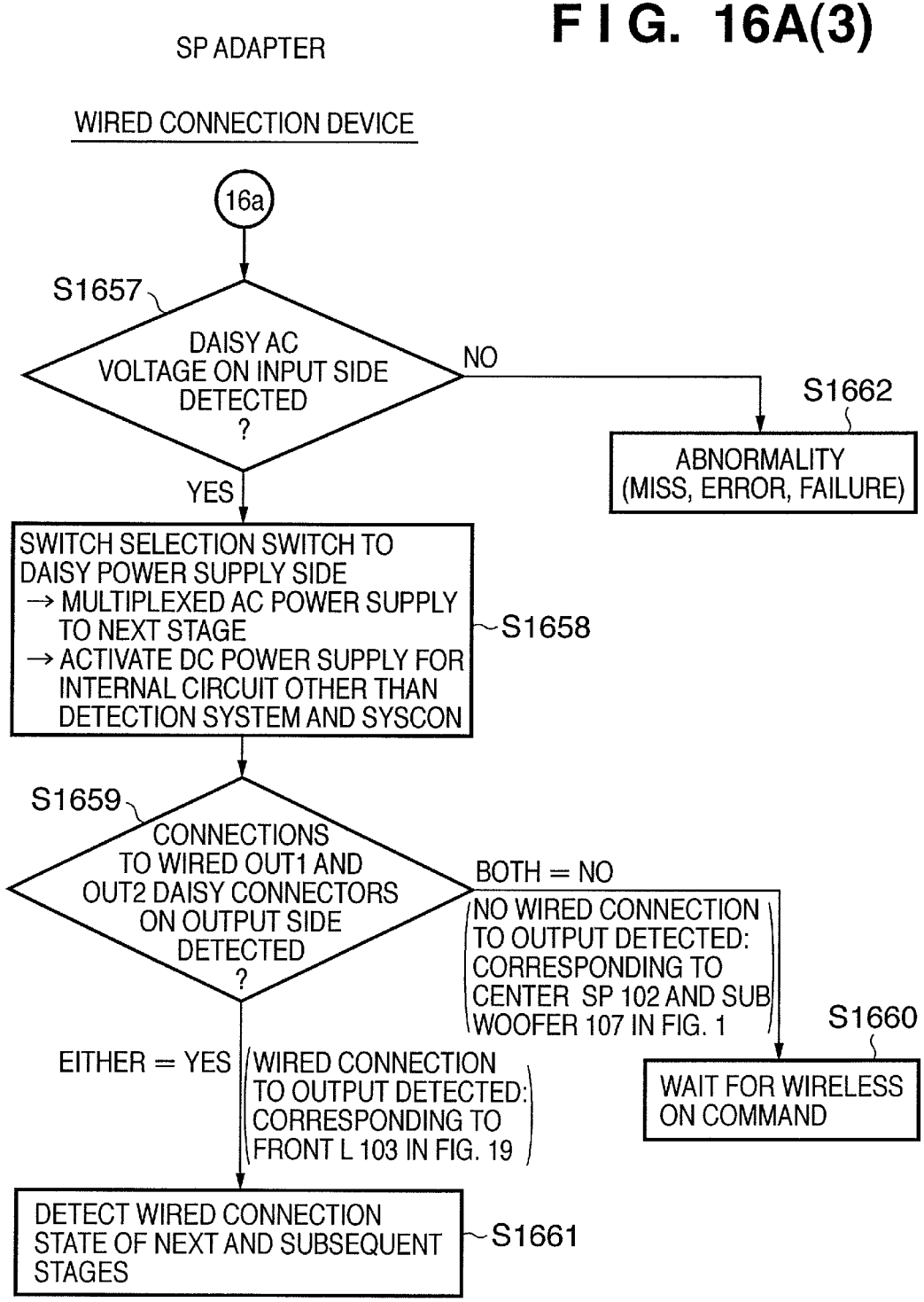
FIG. 16A(3)

F I G. 16B(1)
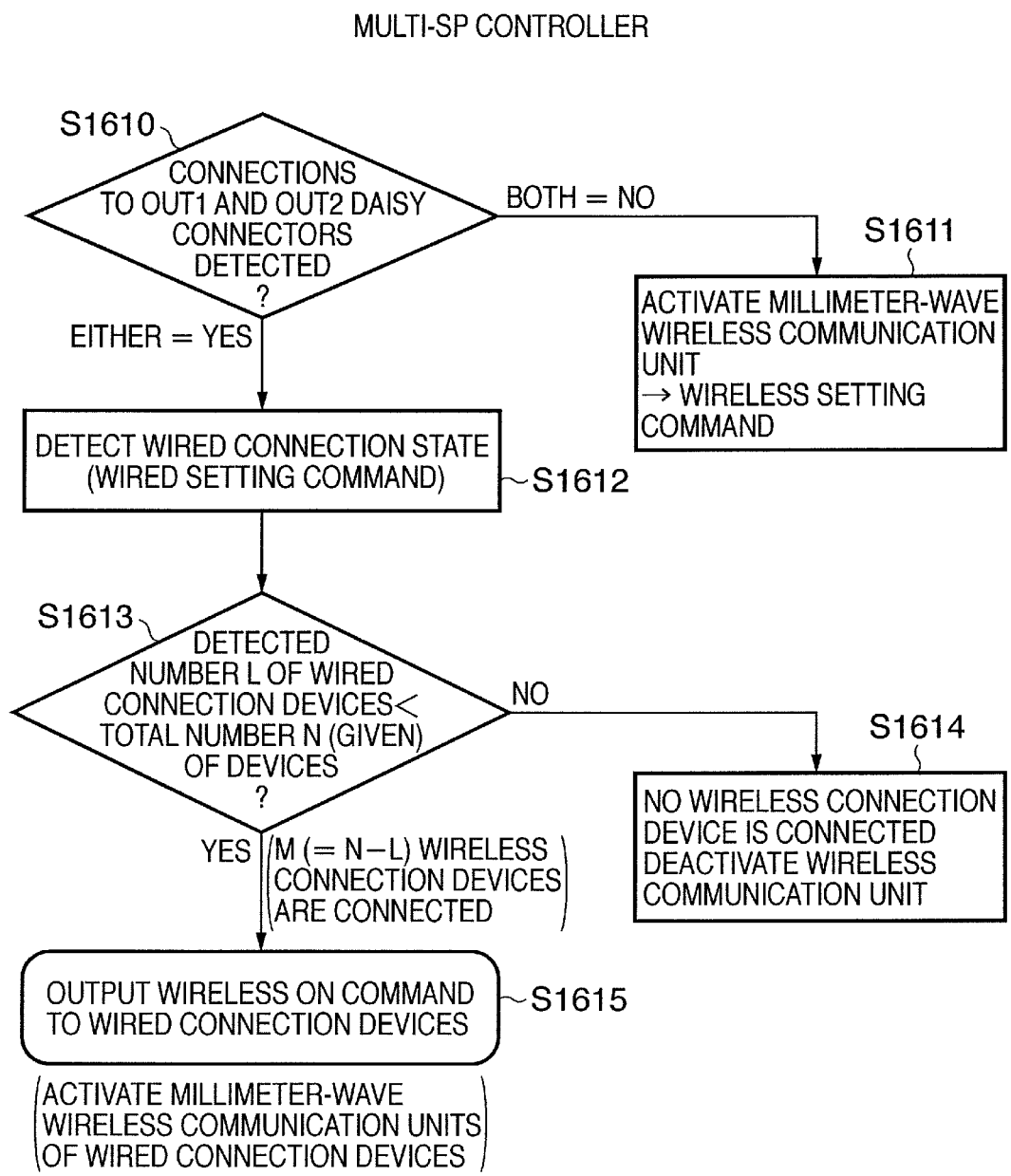

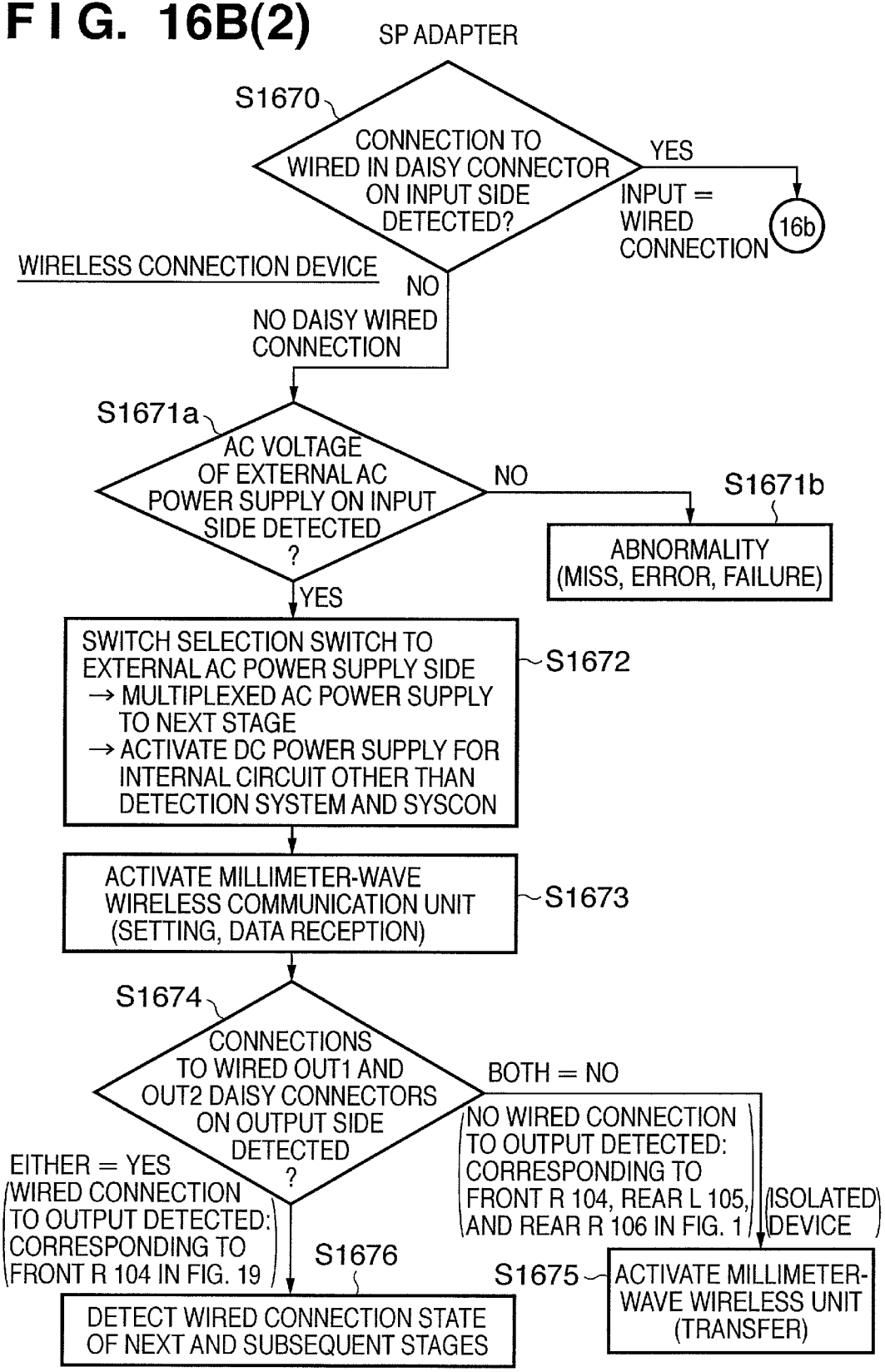
FIG. 16B(2)

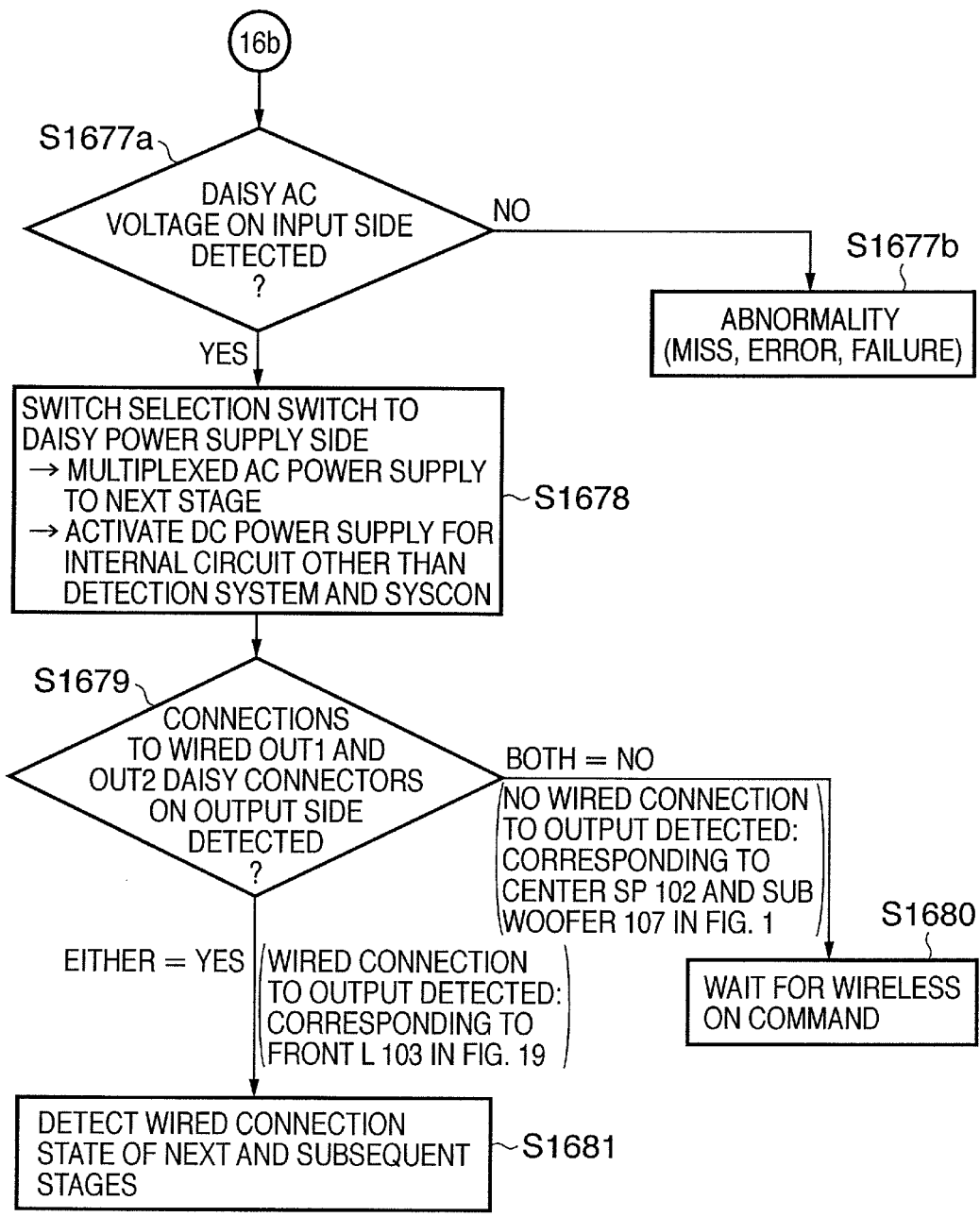

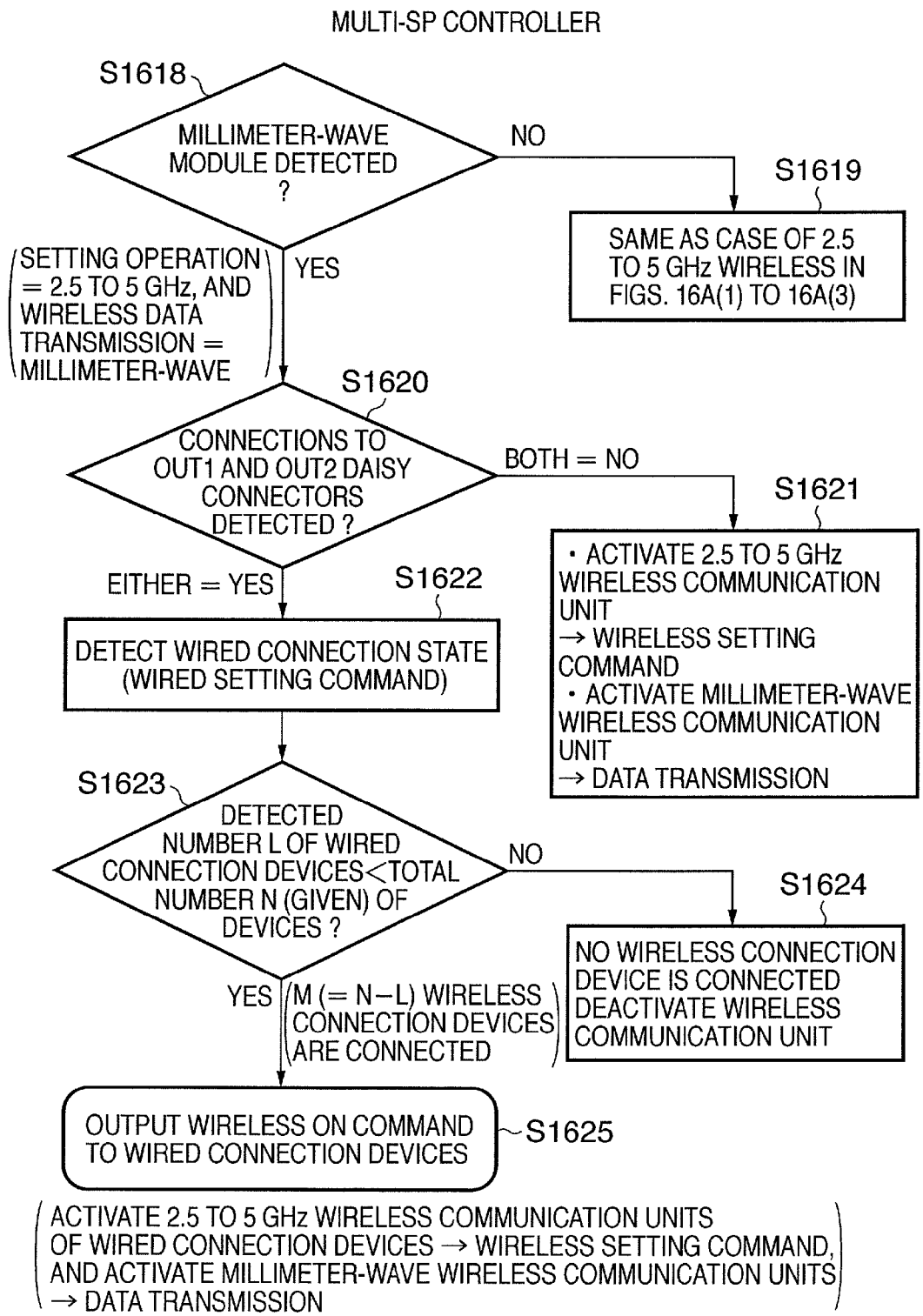
F I G. 16C(1)

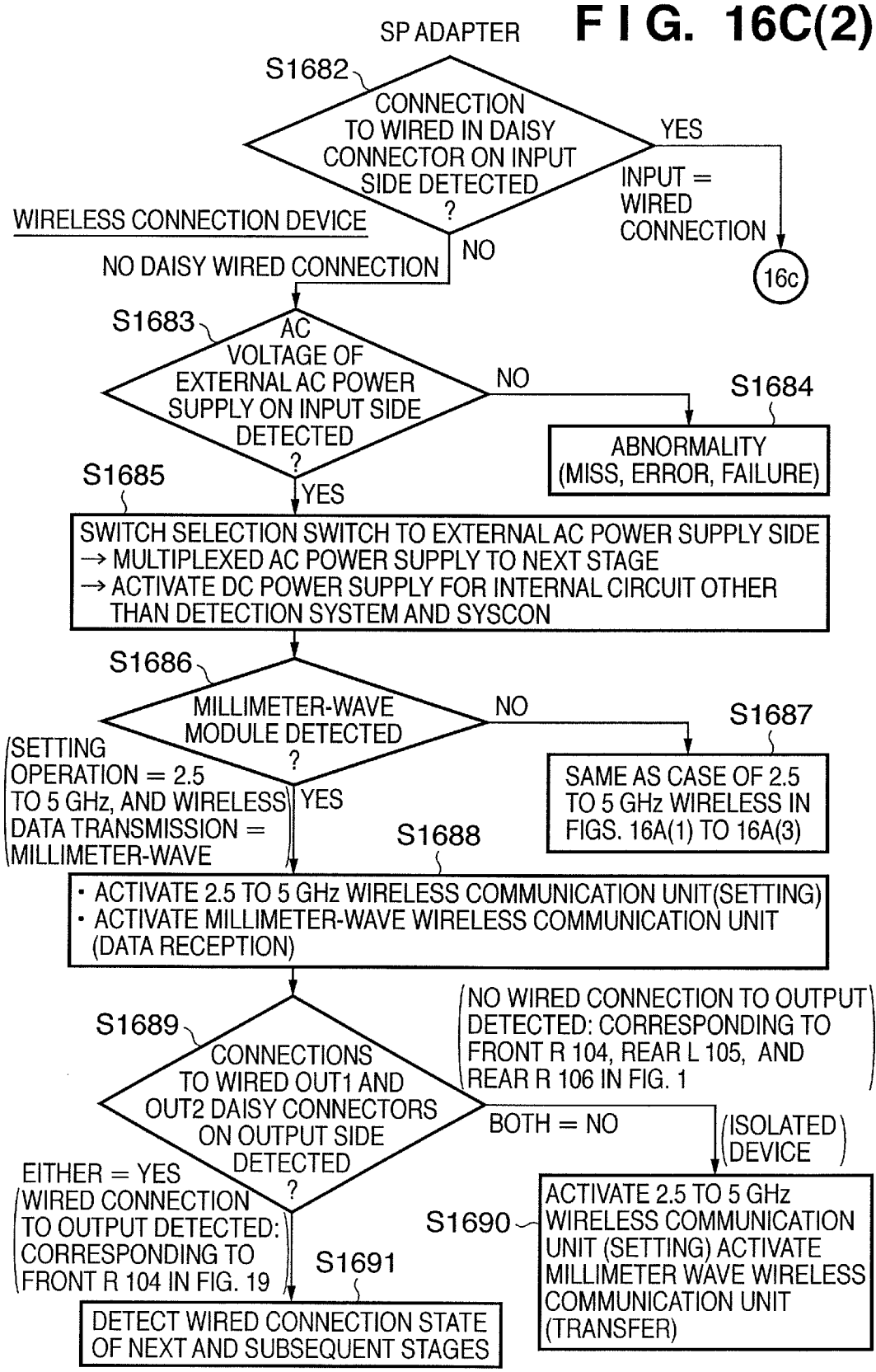

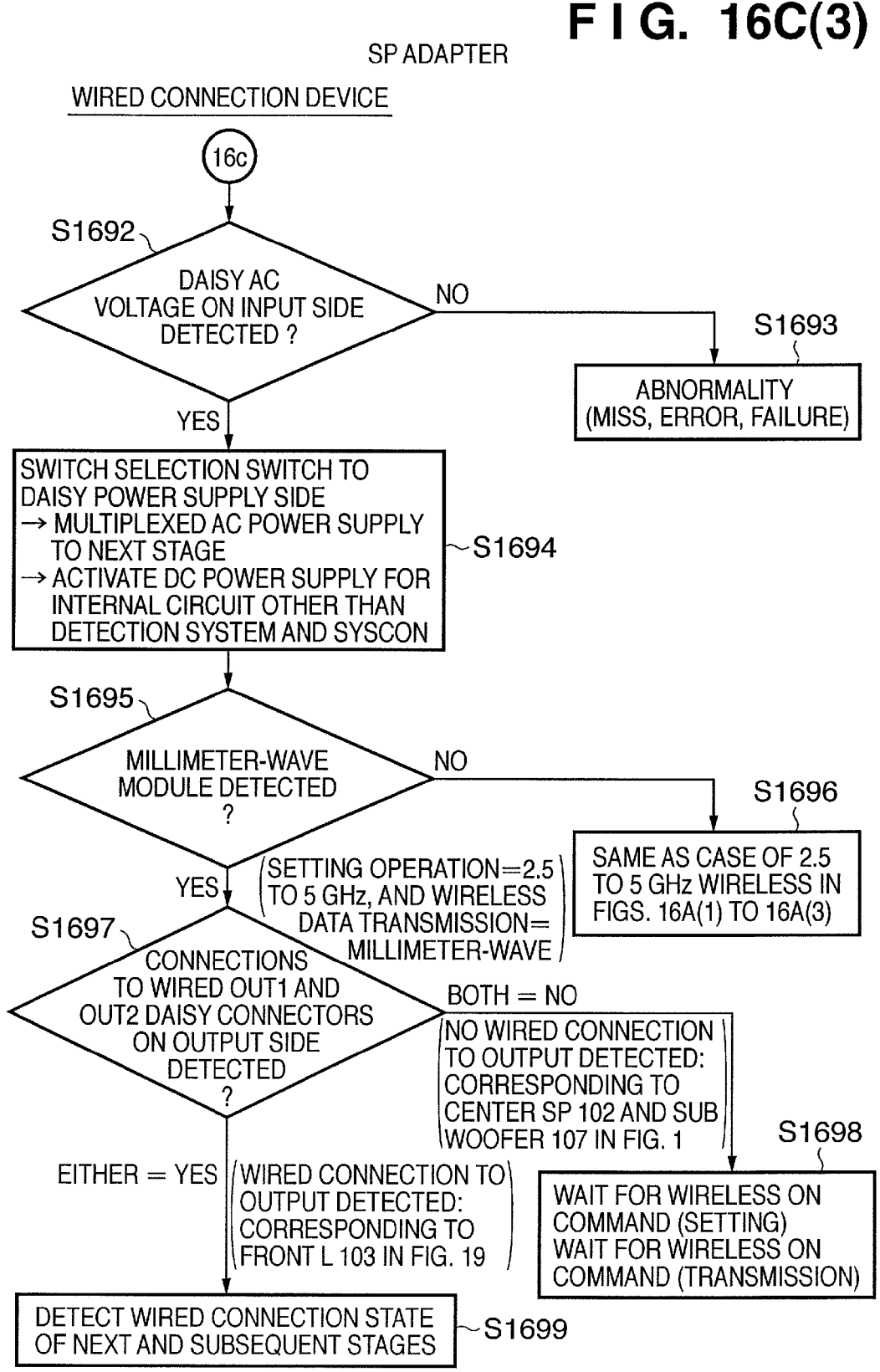
FIG. 16C(3)

FIG. 17C

| FIELD | SETTING |
|---|---|
| OUTPUT CODE<br>FRAME CODE<br>DELAY COUNT CODE | OUTPUT / Mute<br>FRAME / SUB-FRAME |

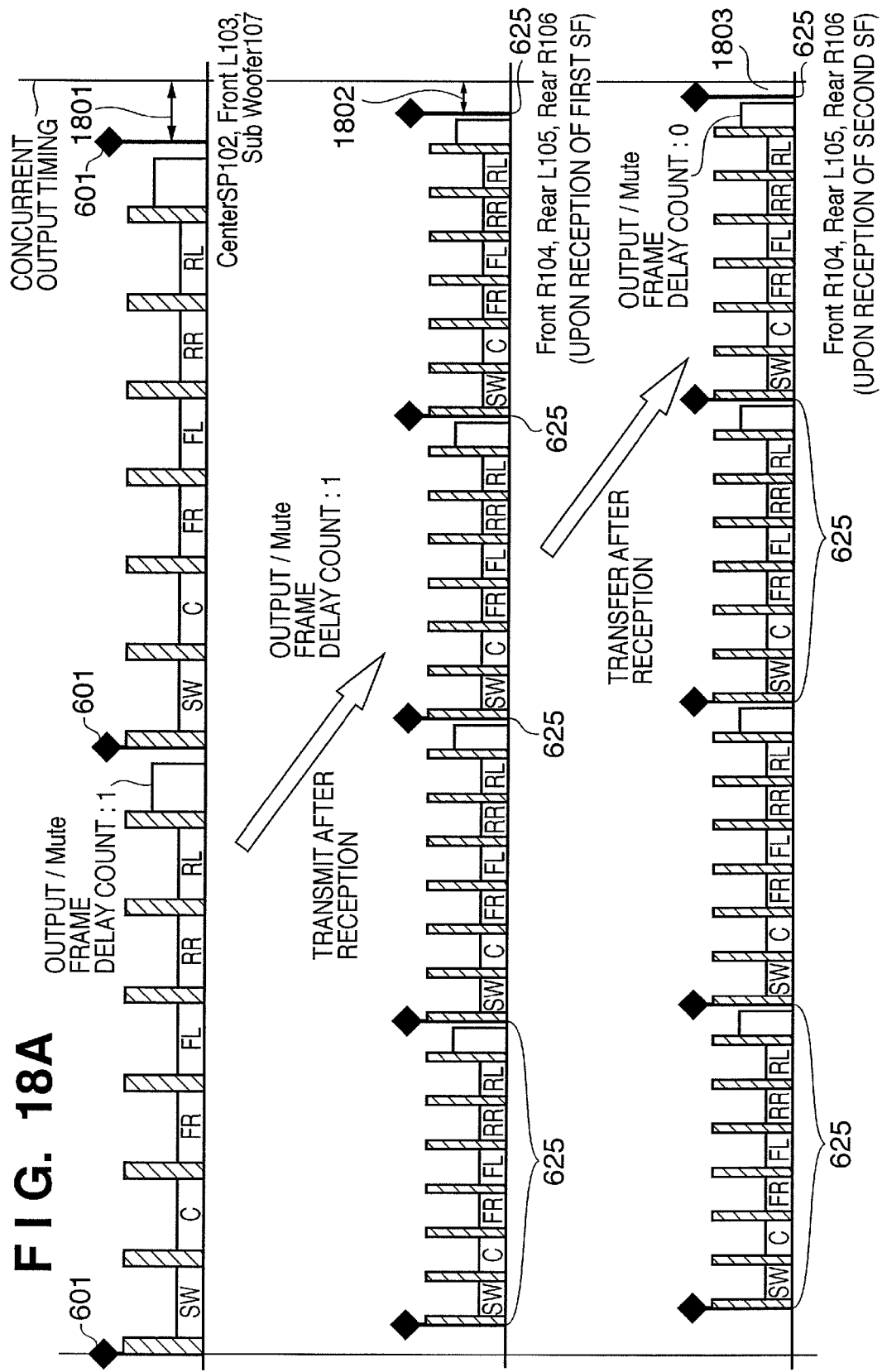

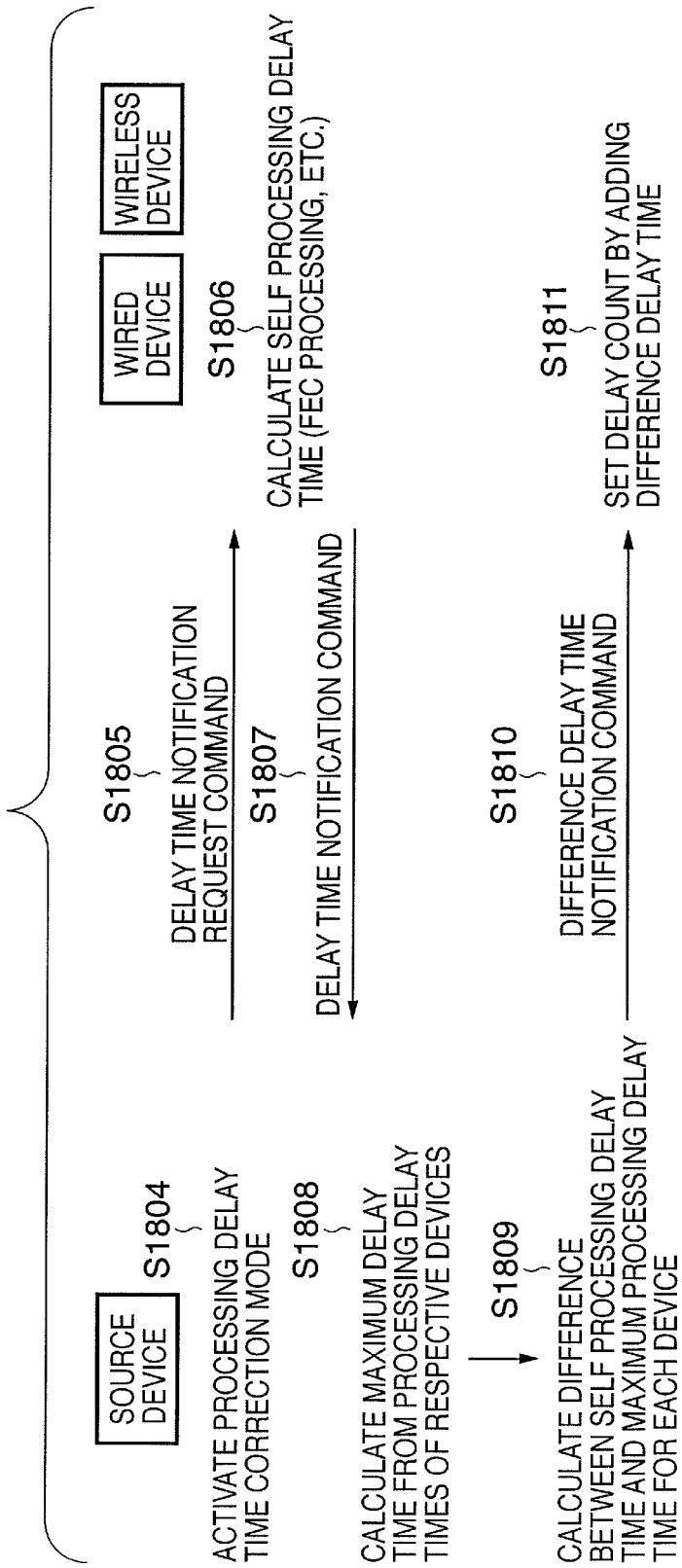

FIG. 22
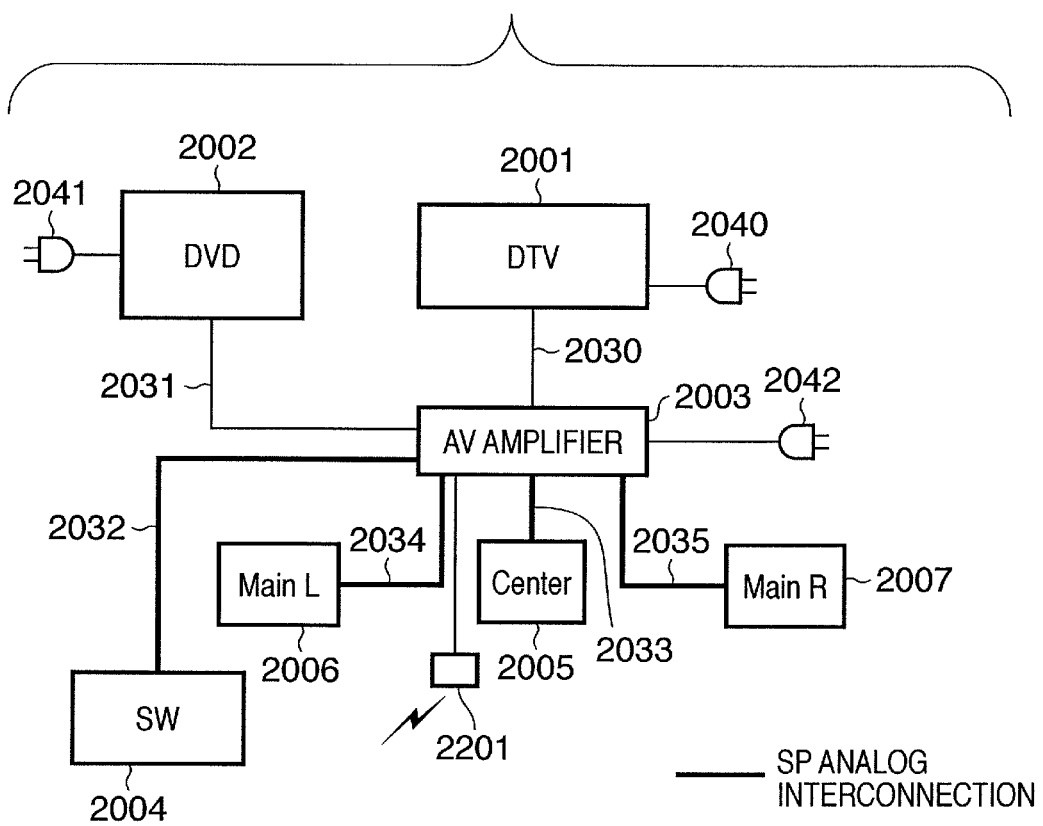
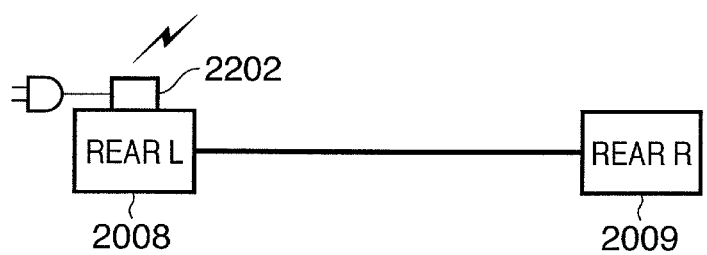

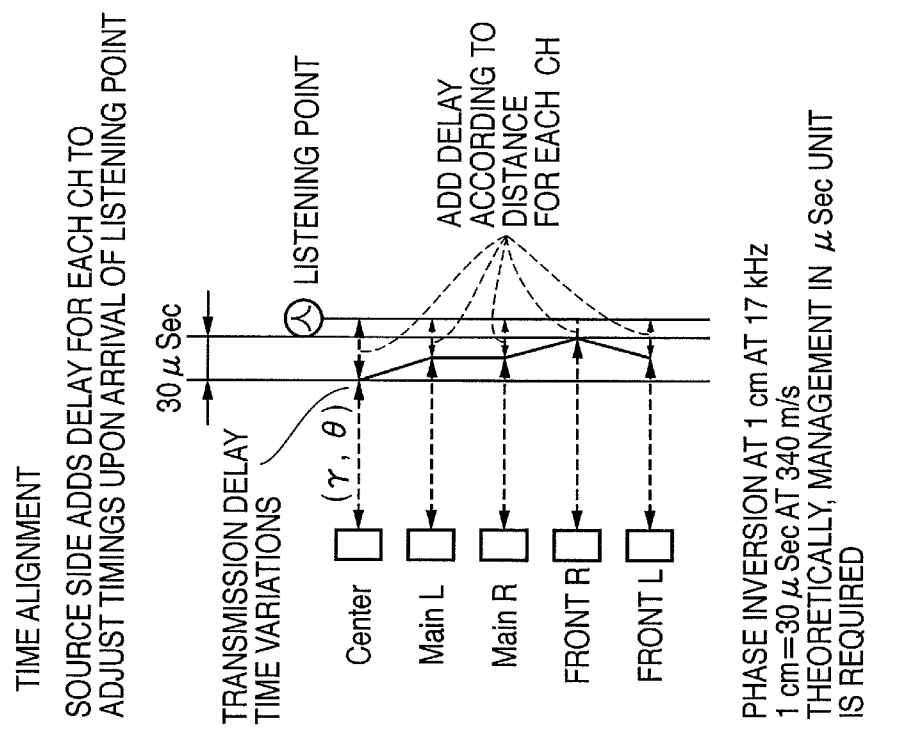
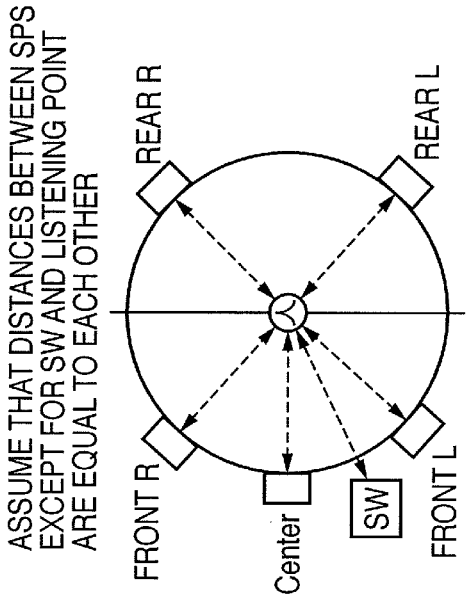
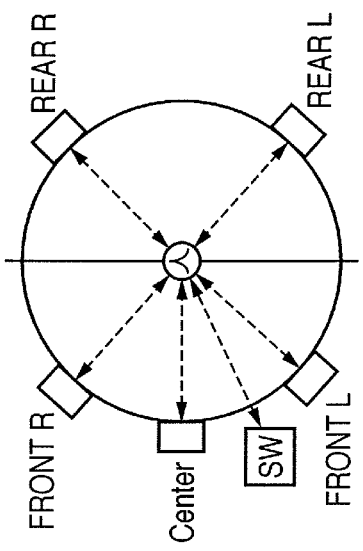

COMMUNICATION SYSTEM

BACKGROUND OF THE INVENTION

1. Field of the Invention

The present invention relates to a communication technique for synchronously transferring data from a single signal source to multi-channel playback devices.

2. Description of the Related Art

A multi-channel speaker system (to be abbreviated as "multi-CH SP system" hereinafter) as the prior art is used together with a digital television, DVD player, AV amplifier, and the like to form a home theater. An interconnection example of a typical home theater has an arrangement shown in FIG. 20. Reference numeral 2001 denotes a digital television (to be abbreviated as "DTV" hereinafter); and 2002, a DVD player (to be abbreviated as "DVD" hereinafter). Reference numeral 2003 denotes an audio video amplifier (to be abbreviated as "AV amplifier" hereinafter); and 2004 to 2009, six speakers (SPs) which form a 5.1CH surround system. For example, reference numeral 2004 denotes a subwoofer (to be abbreviated as "SW" hereinafter); 2005, a center SP; 2006, an L-channel main SP; 2007, an R-channel main SP; 2008, an L-channel rear SP; and 2009, an R-channel rear SP.

As for interconnections among these devices, reference numeral 2030 denotes an interconnection which connects the AV amplifier 2003 and DTV 2001. Typically, the interconnection 2030 comprises a High Definition Multimedia Interface (HDMI) cable used to connect the HDMI output of the AV amplifier 2003 to the HDMI input of the DTV 2001. Reference numeral 2031 denotes an HDMI cable which connects the HDMI output of the DVD 2002 to the HDMI input of the AV amplifier 2003, typically. Reference numerals 2032 to 2037 denote SP cables connected from the AV amplifier 2003 to the six SPs, respectively. On the other hand, as for power supply interconnections, reference numeral 2040 denotes an AC power supply line of the DTV 2001; 2041, a power supply line of the DVD; and 2042, a power supply line of the AV amplifier.

FIG. 20 shows a case in which the SP interconnections are implemented by full-wired interconnections. In this case, the SPs are interconnected by six SP cables from the AV amplifier. These SP cables impose a heavy load on the user since they must be interconnected in consideration of the plus and minus polarities, R and L (right and left) channel differences, and the like. How to simplify many complicated SP interconnections from the AV amplifier is the first issue.

On the other hand, upon actually allocating these SPs, the interconnections to the SPs themselves may often pose a problem such as obstructions to persons' passages in relation to the floor plan of a room.

For example, the interconnections to the R and L surround SPs run across the entrance, and it is not preferable to physically interconnect them.

Upon laying down roundabout interconnections along the wall or ceiling to avoid passage obstructions, the interconnection cable length to each surround SP becomes as long as 5 m or more, thus posing another problem such as deterioration of signal transmission performance, and the like. How to cope with difficulty of physical interconnections to individual SPs is the second issue.

As a method of solving the first issue, a method of connecting a playback audio signal from an optical disk player to playback devices including SPs by, for example, IEEE1394 via a network has been proposed, as described in patent reference 1 (Japanese Patent Laid-Open No. 2001-223588) and patent reference 2 (Japanese Patent Laid-Open No. 2002-217911).

Also, patent reference 3 (Japanese Patent Laid-Open No. 2005-198249), patent reference 4 (Japanese Patent Laid-Open No. 2005-175744), and patent reference 5 (Japanese Patent Laid-Open No. 2005-175745) disclose a surround system by means of a wired bus-connected network system. As an example of the bus-connected network, USB, IEEE1394, and the like are known.

On the other hand, as for the protocol of audio data supplied to such network, non-patent reference (Audio and Music Data Transmission Protocol 2.1 by 1394 TA) is available as public information.

However, these methods pose the following new problems.

(1) Each SP requires a power supply. However, the consumption power of the surround system is around 100 W per CH, and such electric power cannot be supplied via a USB (DC 5 V, 0.5 A) or IEEE1394 (DC 8 to 40 V, 1.5 A) connection cable. For this reason, each SP must individually receive a power supply. Then, the actual interconnection state including power supplies becomes as shown in FIG. 21, resulting in troublesome power supply interconnections. In FIG. 21, reference numerals 2140 to 2145 denote new power supply interconnections to be added.

(2) The cable length is limited to about 5 m, and a relatively expensive cable must be used since it adopts a multi-core structure.

(3) To support the transmission protocol, each device such as the SP or the like must incorporate an advanced-function CPU, resulting in an expensive system.

(4) Due to the audio signal playback requirement for the surround system, playback time management is required. For example, in the case of IEEE1394, such management is achieved using time stamps included in its isochronous data packets. That is, each device holds synchronized clocks, and controls the output timing of playback data based on time stamp information included in incoming received data. Also, hardware for this purpose becomes relatively expensive.

(5) Since IEEE1394 or the like is a standard interface (I/F), if it is used in the surround system, an unexpected device is likely to be connected, and an extra processing function must be provided to cope with errors.

On the other hand, as for the second issue, as a method of solving the problem of these surround SP interconnections, a partial wireless system called a rear-wireless surround system shown in FIG. 22 is available. This system wirelessly connects two, rear-right (R) SP and rear-left (L) SP from the front, and attains wireless interconnections to the SPs allocated farthest from the AV amplifier. In FIG. 22, reference numeral 2201 denotes a wireless transmission adapter; and 2202, a wireless reception adapter. Rear R and L signals are transmitted via a single wireless channel.

However, in practice, as shown examples a to e in FIG. 23, various cases occur depending on installation locations. FIG. 23 shows the example of passage zones assumed depending on allocations in the home, that is, those of ineligible wired interconnection locations. Furthermore, after installation, the room layout may be changed, and failure locations may therefore change. In this way, in the case of devices which are allocated on the living space to provide their functions like the multi-channel SP system, flexibility that allows arbitrarily including wired and wireless connections together becomes an important point. In addition, in the rear-wireless surround system, the total number of interconnections associated with SPs does not always decrease. Hence, the first issue also remains unsolved.

SUMMARY OF THE INVENTION

The present invention has been made in consideration of the aforementioned problems, and has as its object to provide a communication system which can simplify a large number of complicated speaker interconnections from an amplifier and can install an arbitrary number of speakers, for which wired interconnections are not possible, at arbitrary locations in a multi-channel speaker system.

It is another object of the present invention to provide a low-cost communication system which can configure a network interface (I/F) on the playback device side such as a speaker and the like without using any advanced-function CPU and time stamp-compatible hardware.

It is still another object of the present invention to provide a flexible communication system which allows wireless interconnections at arbitrary locations to cope with failures in terms of actual interconnections of installation locations in the home.

According to one aspect of the present invention, a communication system, having a controller for transmitting data to be played back by a plurality of playback devices corresponding to a plurality of channels, and a plurality of adapters for executing playback by the plurality of playback devices, the controller comprises:

a setting unit adapted to set data to be played back by the plurality of playback devices and control information to control playback of the data in time slots of a sync transmission frame; and a transmission unit adapted to transmit the sync transmission frame set by the setting unit to the plurality of adapters, and each of the plurality of adapters comprising:

a reception unit adapted to receive the sync transmission frame transmitted by the transmission means; and a playback control unit adapted to extract data corresponding to the channel to be played back by the adapter from the sync transmission frame, and controlling a playback timing of the data based on control information corresponding to the data.

According to the present invention, the total number of interconnections of speaker cables and power supply interconnections can be reduced, thus simplifying the interconnections themselves.

According to the present invention, since a network I/F on the playback device side can be configured without any advanced-function CPU and time stamp-compatible hardware, low cost can be attained.

According to the present invention, since wireless interconnections can be adopted at arbitrary locations to cope with failures in terms of actual interconnections depending on the installation locations in the home, a flexible communication system can be realized.

Further features of the present invention will become apparent from the following description of exemplary embodiments with reference to the attached drawings.

BRIEF DESCRIPTION OF THE DRAWINGS

FIG. 1 is a system diagram showing an example of a network surround system according to one embodiment of the present invention;

FIGS. 4A and 4B are charts showing the system setting operation according to the embodiment of the present invention;

FIG. 5A is a diagram for explaining the mechanism for detecting a wired connection state;

FIG. 6A shows the frame configuration of multi-CH audio data and commands transmitted from a source device to a wired connection device via the daisy wired connection;

FIG. 6B shows an example of a data sending method;

FIG. 6C shows an example of a data sending method;

FIG. 6D shows an example using identical frames in wired transmission and wireless transmission;

FIG. 6E shows an example of data transfer of a wired transmission frame and millimeter-wave wireless transmission frames;

FIG. 11A is a block diagram showing an SP adapter (sink device) in the case of a wired & millimeter-wave wireless communication connection state;

FIG. 11C is a block diagram showing the SP adapter (sink device) in the case of a wired & millimeter-wave wireless communication connection state;

FIGS. 12A to 12C are block diagrams of a multiplexer/demultiplexer and a system controller/detection system power supply circuit;

FIG. 13B is a block diagram showing the arrangement of the multi-SP controller (source device) in the case of a wired & 2.5 GHz to 5 GHz & millimeter-wave wireless communication connection state;

FIG. 14A is a block diagram showing the arrangement of an SP adapter (sink device) in the case of a wired & 2.5 GHz to 5 GHz & millimeter-wave wireless communication connection state;

FIG. 15B is a diagram for explaining a system control operation in the case of wired & millimeter-wave wireless communication;

FIG. 16A(1) is a flowchart for explaining the system control procedure of the multi-SP controller and SP adapter in the case of wired & 2.5 GHz to 5 GHz wireless communication;

FIG. 16A(2) is a flowchart for explaining the system control procedure of the multi-SP controller and SP adapter in the case of wired & 2.5 GHz to 5 GHz wireless communication;

FIG. 16A(3) is a flowchart for explaining the system control procedure of the multi-SP controller and SP adapter in the case of wired & 2.5 GHz to 5 GHz wireless communication;

FIG. 16B(1) is a flowchart for explaining the system control procedure of the multi-SP controller and SP adapter in the case of wired & millimeter-wave wireless communication;

FIG. 16B(2) is a flowchart for explaining the system control procedure of the multi-SP controller and SP adapter in the case of wired & millimeter-wave wireless communication;

FIG. 16B(3) is a flowchart for explaining the system control procedure of the multi-SP controller and SP adapter in the case of wired & millimeter-wave wireless communication;

FIG. 16C(1) is a flowchart for explaining the system control procedure of the multi-SP controller and SP adapter in the case of wired & 2.5 GHz to 5 GHz & millimeter-wave wireless communication;

FIG. 16C(2) is a flowchart for explaining the system control procedure of the multi-SP controller and SP adapter in the case of wired & 2.5 GHz to 5 GHz & millimeter-wave wireless communication;

FIG. 16C(3) is a flowchart for explaining the system control procedure of the multi-SP controller and SP adapter in the case of wired & 2.5 GHz to 5 GHz & millimeter-wave wireless communication;

FIG. 17C is a table showing an example of fields and setting data of an output command;

FIG. 18A is a chart for explaining delay time correction of concurrent outputs;

FIG. 18B is a view for explaining delay time correction of concurrent outputs;

FIG. 22 is a block diagram showing the prior art of a rear-wireless surround system;

FIGS. 24A to 24C are views for explaining surround acoustic field playback according to an embodiment of the present invention.

DESCRIPTION OF THE EMBODIMENTS

Figure 2B:
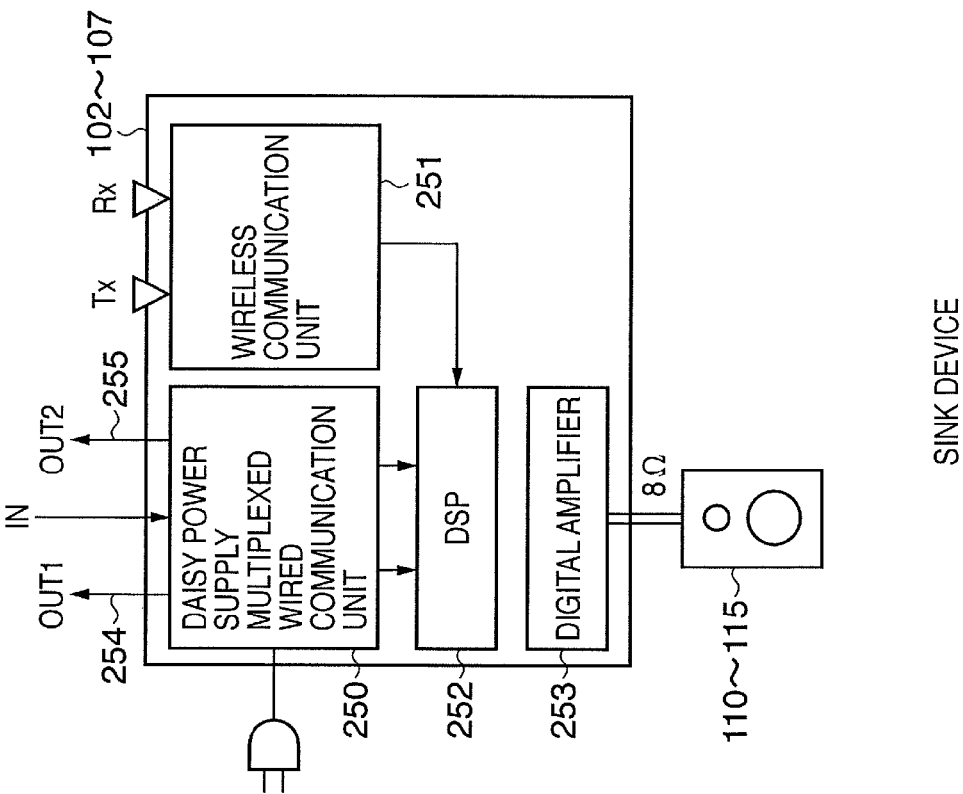
FIGS. 2A and 2B are schematic block diagrams showing the internal arrangements of a multi-SP controller 101 and SP adapters 102 to 107 shown in FIG. 1.

Preferred embodiments of the present invention will be illustrated in detail hereinafter with reference to the accompanying drawings. Note that building components described in the embodiments are merely examples, and they do not limit the scope of the invention.

FIG. 1 is a system diagram showing an example of a network surround system according to one embodiment of the present invention. Referring to FIG. 1, reference numeral 101 denotes a multi-speaker (to be abbreviated as "SP" hereinafter) controller; and 102 to 107, network adapters respectively connected to speakers of respective audio CHs. Reference numerals 110 to 115 denote, for example, commercially available Box speakers of the 8Ω type. In the case of a 5.1CH surround system, these speakers 110 to 115 are respectively called a center SP, front L SP, front R SP, rear L SP, rear R SP, and LFE (or subwoofer).

That is, the network surround system according to this embodiment of the present invention adopts a basic arrangement including only the multi-SP controller 101 having a network management function, and as many network adapters as the number of speakers, that is, the SP adapters 102 to 107. Respective devices have wired and wireless network connection functions.

The example of FIG. 1 shows a case in which the SP adapters 102, 103, and 107 allow wired connections, and the SP adapters 104, 105, and 106 are wireless connection targets due to the problem of an allocation environment.

The wired connection of this embodiment proposes a daisy chain (to be simply referred to as "daisy" hereinafter) system which multiplexes signals and an AC power supply on a duplex balanced connector. In FIG. 1, interconnections 116 to 118 correspond to interconnection examples of this system.

The daisy output terminals of the multi-SP controller (source device) 101 are respectively connected to the daisy input terminal of the center SP adapter 102 and that of the front L SP adapter 103 via duplex balanced daisy cables 116 and 117. The daisy output terminal of the SP adapter 103 is connected to the daisy input terminal of the subwoofer adapter 107 via the duplex balanced daisy cable 118.

On the duplex balanced daisy cable, for example, 5.1CH audio signals and an AC power supply flow while being multiplexed. As for the AC power supply, an external AC power supply is a supply source, and appropriate filtering processing is executed so as to prevent communication signals such as PLC (Power Line Communication) and the like from entering from the AC power supply.

Figure 3A:
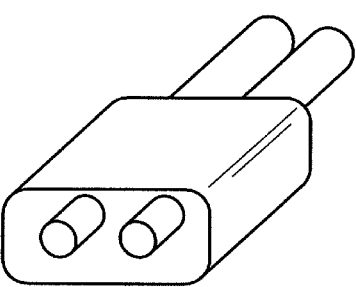
FIGS. 3A and 3B show cable examples used in daisy wired connections according to an embodiment of the present invention.
Figure 3B:
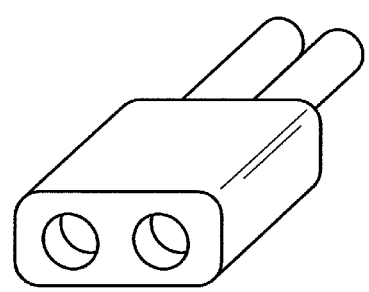

FIGS. 3A and 3B show an example of cable parts used in the daisy wired connection according to embodiments of the present invention. FIG. 3A shows the structure of the input side of the daisy cable, that is, an example of a plug which is connected to the duplex balanced cable and has male insertion pins. In correspondence with this plug, a female output receptacle (not shown) is equipped on the device (multi-SP controller, SP adapter) side. The output receptacle includes a mechanical plug insertion detection switch (not shown) which is used in automatic detection.

FIG. 3B shows the structure of the output side of the daisy cable, that is, a plug which is connected to the duplex balanced cable and has female reception components. In correspondence with this plug, a male input receptacle (not shown) is equipped on the device (SP adapter) side. The input receptacle includes a mechanical plug insertion detection switch (not shown) which is used in automatic detection.

On the other hand, in the wireless connection according to this embodiment, the front R SP adapter 104, rear L SP adapter 105, and rear R SP adapter 106 are wireless connection targets. Upon detection of a state in which the output-side plug (FIG. 3B) is not inserted into the daisy input terminal of each wireless connection target, a wireless communication unit of the target is activated, and establishes wireless connections to those of the multi-SP controller, the wired connection devices 102, 103, and 107, and the like. Since these wireless connection devices 104, 105, and 106 do not receive any power supply by means of the daisy cable, their power plugs must be connected to indoor AC feed outlets to receive a power supply. Reference numerals 119, 120, and 121 in FIG. 1 denote power plugs.

Figure 2A:
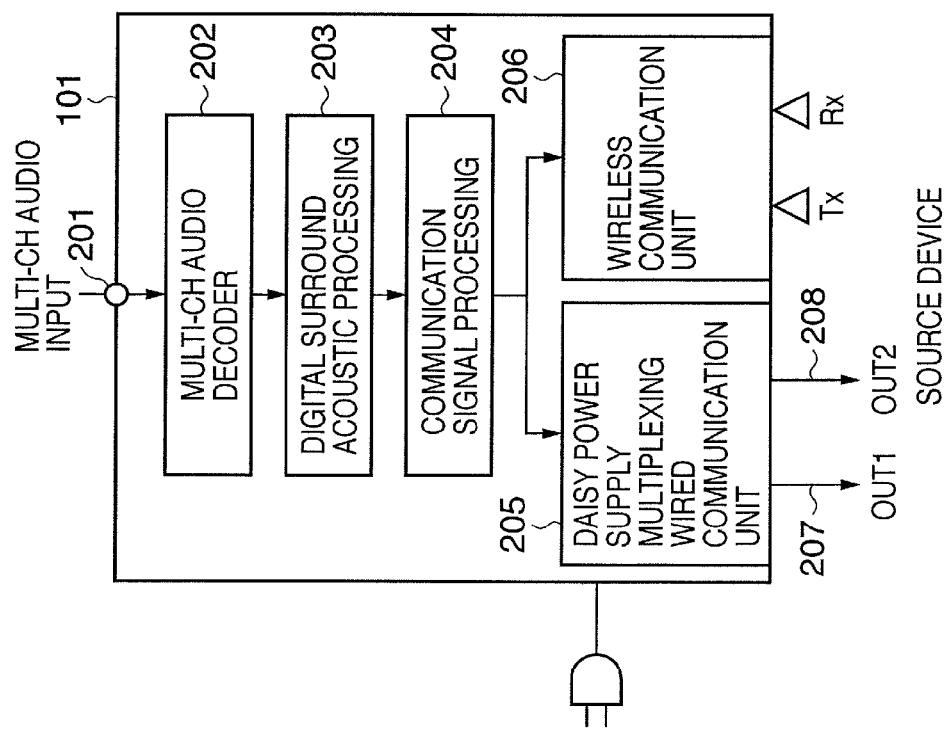

FIGS. 2A and 2B are schematic block diagrams showing the internal arrangement of the multi-SP controller 101 and the SP adapters 102 to 107. FIG. 2A shows the arrangement of the multi-SP controller (to be also referred to as "source device" or simply as "controller" hereinafter), and FIG. 2B shows the arrangement of the speaker adapter (to be also referred to as "sink device" or simply as "device" hereinafter). The sink device can control reception of data to be played back by a speaker, and playback using the speaker.

In FIG. 2A, reference numeral 201 denotes a multi-CH audio signal input terminal, which is connected to, for example, an external DVD player (not shown) via an HDMI cable and receives a multi-CH audio signal encoded by, for example, Dolby Digital. Reference numeral 202 denotes a multi-CH audio decoder which decodes, for example, a Dolby Digital signal, and outputs six audio raw data for 5.1CHs.

Reference numeral 203 denotes a digital surround processing circuit which performs frequency characteristic correction, delay time correction (time alignment), amplitude correction, and the like of audio signals to the respective SPs. The corrected 6CH audio data are sent to a communication signal processor 204, and undergo processing such as framing, sync timing addition, and the like (to be described later). The communication audio signals which have undergone the processing are sent to a daisy power supply multiplexing wired communication unit 205 and wireless communication unit 206.

The daisy power supply multiplexing wired communication unit 205 has output terminals OUT1 207 and OUT2 208 for two systems. This is to allow efficient interconnections by providing two systems of outputs since the multi-speakers are generally allocated as R and L systems on the two sides to have the controller as the center. The wireless communication unit will be described later.

In FIG. 2B, reference numeral 250 denotes a daisy power supply multiplexing wired communication unit; 251, a wireless communication unit; and 252, a digital signal processor (DSP), which performs correction of various characteristics and the like depending on the physical characteristics of the SPs. Reference numeral 253 denotes, for example, a D-class digital amplifier which drives an external SP (or may be internal SP) at 8Ω. The daisy power supply multiplexing wired communication unit 250 has output terminals OUT1 254 and OUT2 255 for two systems. This is to allow efficient interconnections by providing two systems of outputs for connections to the subwoofer and the SP of the next stage, since the subwoofer that handles the low-frequency range is freely allocated and may be connected to any SP adapter. The wireless communication unit will be described later.

Both the multi-SP controller and SP adapters have daisy outputs for two systems. However, FIG. 1 illustrates a case in which only one system is used except for the source device 101.

The operation of the network surround system shown in FIG. 1 is as follows.

Initially, detecting the connection states of all devices is required to make various settings, and this is called a system setting. Principal contents of the system setting are to detect the number of wired connection devices, the number of wireless connection devices, the connection order of wired connections, and the like.

The source device (multi-SP controller) comprises a detector (first wired connection detection means) for detecting the presence/absence of wired connections between the wired communication unit of the source device and respective sink devices (adapters). The source device comprises an activation controller (first activation control means) for controlling activation of the wireless communication unit (wireless communication means) of the source device based on the detection result of the detector (first wired connection detection means). The source device comprises an activation signal transmitter (activation signal transmission means) for transmitting an activation signal used to synchronize activation of the wireless communication unit (wireless communication means) of the source device and those of respective sink devices.

Each sink device (adapter) comprises an activation controller (second activation control means) for controlling activation of the wireless communication unit (wireless communication means) of that device based on reception of the activation signal transmitted from the activation signal transmitter (activation signal transmission means).

Each sink device (adapter) comprises a detector (second wired connection detection means) for detecting the presence/absence of a wired connection to the wired communication unit (wired communication means) of that sink device (adapter). When the detector (second wired connection detection means) detects the absence of a wired connection to the wired communication unit (wired communication means), the activation controller (second activation control means) activates the wireless communication unit (wireless communication means).

<System Setting>

Figure 4A:
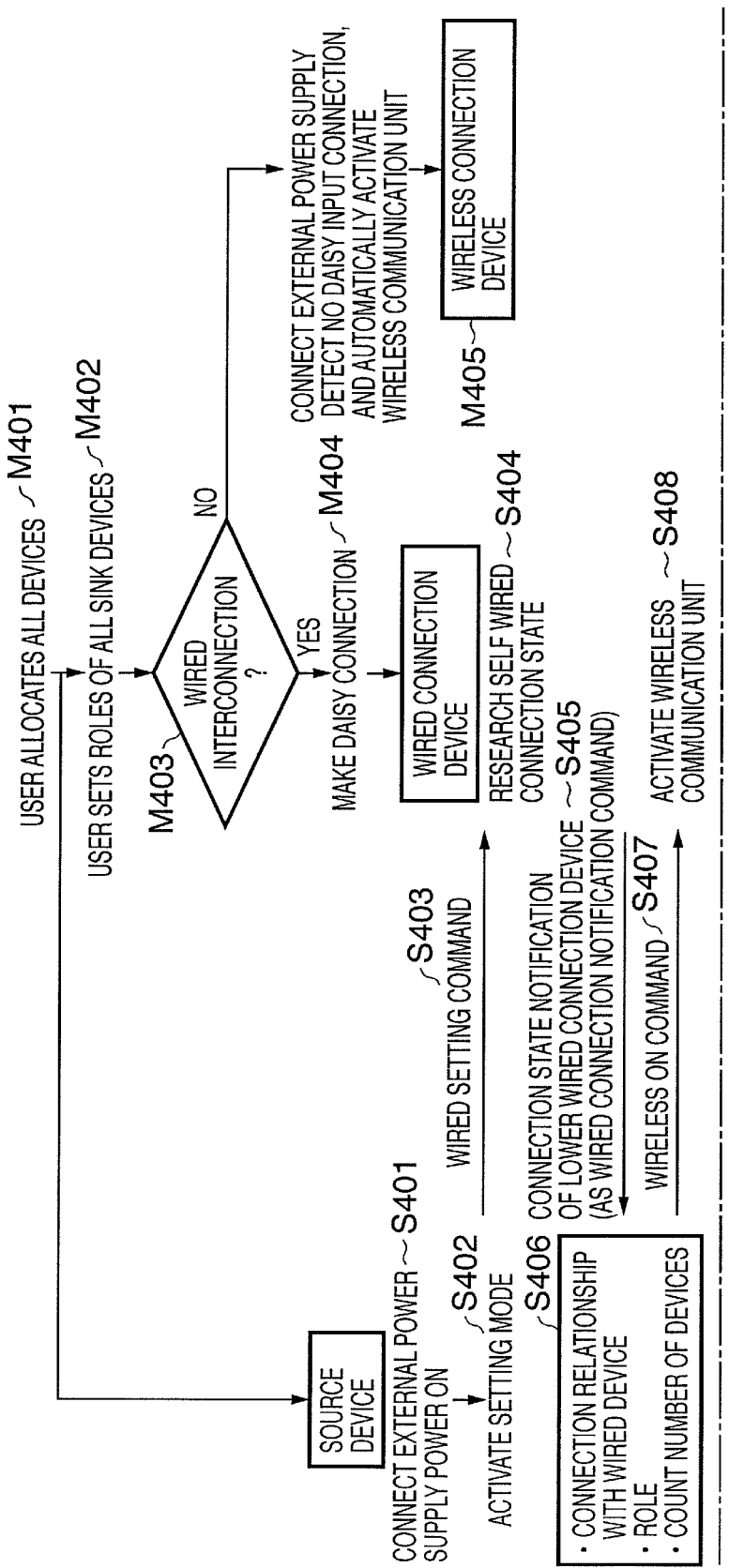

FIGS. 4A and 4B show the system setting operation according to this embodiment, and show the system operations among the source device (multi-SP controller), wired connection devices, and wireless connection devices.

The user locates the source device 101 in FIG. 2A at a desired position, and then locates the six SP devices (each including the sink device connected to the speaker) in FIG. 2B (M401 in FIG. 4A).

The subwoofer is freely located at any location, since its output acoustic frequency is low. However, the other five SPs have predetermined recommended locations, which are designated by, for example, an installation manual or the like. Note that the speakers, except for the subwoofer with a relatively large size used for low-frequency playback, are the same, and their roles are determined depending on their locations. After completion of the location of these SPs, the user sets a role for each SP using a mechanical setting switch (in practice, the user sets the role for each SP adapter: M402 in FIG. 4A).

Note that the role indicates "center", "front L", "front R", "rear L", "rear R", "subwoofer", and the like. Since the subwoofer has no dependence on the alloted location, its role can be set in advance.

The user considers the location situation (M403 in FIG. 4A), and interconnects wired connection devices in turn from the source device using the daisy cables (M404 in FIG. 4A). In the case of FIG. 1, the user connects the daisy cable to the daisy OUT1 terminal of the source device 101, and the opposite end of the cable to the daisy IN terminal of the front L 103. Likewise, the user connects the daisy OUT2 terminal of the source device to the daisy IN terminal of the center 102 via the daisy cable. Furthermore, the user connects the daisy OUT1 terminal of the front L 103 to the daisy IN terminal of the subwoofer 107 via the daisy cable.

Upon completion of the aforementioned wired interconnection operations, the user turns on the power switch of the source device (S401 in FIG. 4A). Upon power ON, a system controller (to be abbreviated as "syscon" hereinafter) in the source device is activated. Upon power ON of the source device, an AC power supply is superposed on its daisy OUT, and electric power is supplied in turn to the daisy-connected devices to also activate a syscon in each device.

Next, the source device syscon starts a setting mode (S402), and transmits a wired setting command to the connected devices (S403). This command is transmitted while being inserted in a predetermined field of a time slot (to be described later). This command is a broadcast command, and is broadcasted from the single source device to the respective devices. In response to this command, each device may return an acknowledgement (ACK).

Upon reception of this wired setting command, each of the wired connection devices 102, 103, and 107 in FIG. 1 researches the self wired connection state (S404), and returns the result to the source device (S405). FIG. 5A shows an example of a mechanism for detecting the wired connection state.

In FIG. 5A, a source device 501 assigns predetermined corresponding codes (e.g., layer code=1, and output terminal code=1) to layer code (to instruct the layer of the setting destination) and output terminal code (to identify the self output terminal) fields of the wired setting command. The source device 501 then transmits the assigned result to a next wired device, front L 502. The wired device front L 502 appends a self-role code (e.g., 2) to the received layer code (=1) and output terminal code (=1), and returns the command to the source device 501 as a wired connection notification command. The front L 502 adds "1" to the self-layer code (=1), appends the output terminal code (=1), and transmits that command to a next wired device subwoofer 504. The wired device subwoofer 504 appends a self-role code (=6) to the layer code (=2) and output terminal code (=1), and returns the command to the wired device front L 502 as a wired connection notification command.

The subwoofer 504 must successively output wired setting commands to its own two output terminals. However, in this example, the output terminal of the subwoofer 504 has no daisy cable connection. For this reason, the subwoofer 504 informs the source device using a Last code that it is the last stage.

The devices of the respective middle layers transfer this return command (wired connection notification command) to the host devices intact.

Likewise, the source device 501 assigns predetermined corresponding codes (e.g., layer code=1, and output terminal code=2) to layer code (to instruct the layer of the setting destination) and output terminal code (to identify its own output terminal) fields of the wired setting command. The source device 501 then transmits the assigned result to a next wired device, center 503. The wired device 503 appends a self-role code (e.g., 1) to the received layer code (=1) and output terminal code (=2), and returns the command to the source device 501 as a wired connection notification command. The wired device center 503 must successively output wired setting commands to its own two output terminals. However, in this example, the output terminal of the wired device center 503 has no daisy cable connection. For this reason, the wired device center 503 informs the source device using a Last code that it is the last stage.

With this process, the source device detects the wired connection relationship with the wired devices and their roles, and counts the number of wired connection devices (S406). If the number of wired connection devices matches the total number of devices, there is no wireless connection device. However, in this example, the number of wired connection devices does not match the total number of devices, and the source device transmits a wireless ON command to the wired connection devices (S407). At this time, the source device activates its own wireless communication unit 206 in FIG. 2A. Upon reception of the wireless ON command, the wired connection devices 102, 103, and 107 in FIG. 1 activate their wireless communication units (S408).

The source device wirelessly transmits a wireless setting command by itself, and sends a wireless setting command transmission command to the wired connection devices (S409). Upon reception of the command, the wired connection devices immediately control their wireless communication units to wirelessly transmit a wireless setting command (S410).

This wireless command (S411) is simultaneously transmitted from the wireless communication units of the source device 101 and the wired connection devices 102, 103, and 107 using identical time slots.

For this reason, in this case, since four wireless transmission stations simultaneously transmit the commands, respective wireless connection devices can receive the wireless command at a sufficient strength. Assume that the wireless communication units of the wireless connection devices 104, 105, and 106 detect whether or not the cables are connected to their daisy inputs, and are automatically activated since it is detected that no cables are connected (M405 in FIG. 4A).

Figure 5B:
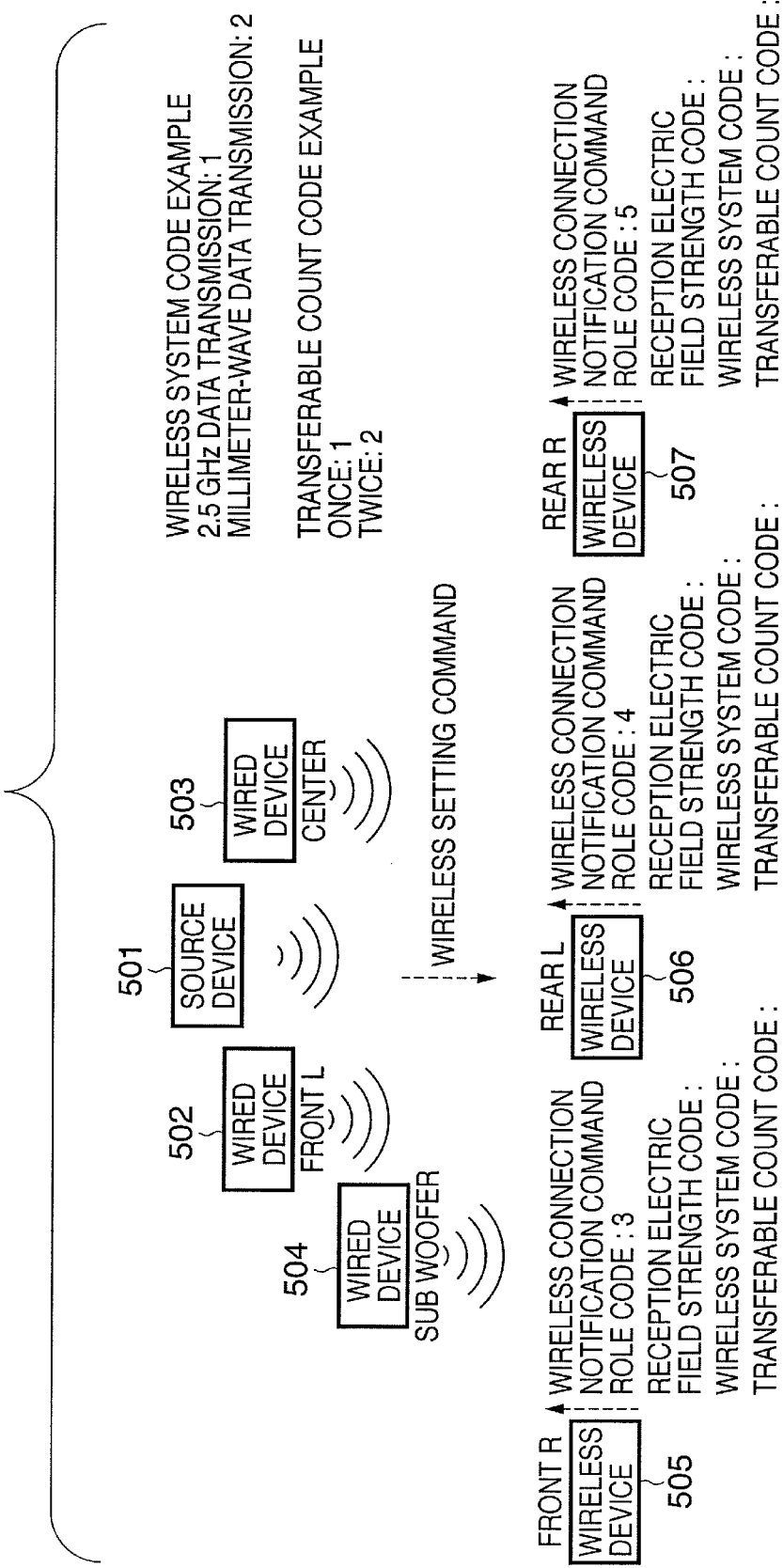
FIG. 5B is a diagram for explaining the mechanism for detecting a wireless connection state.

FIG. 5B shows an example of a mechanism for detecting the wireless connection state.

In FIG. 5B, the source device 501 transmits a wireless setting command to wireless connection devices 505 to 507 directly and indirectly. Upon reception of the wireless setting command, each wireless connection device checks and confirms its role and received signal strength indication (S412 in FIG. 4B), and generates a corresponding role code and received signal strength indication code. Each wireless connection device appends a wireless system code and transferable count code as its own performance to these codes, assigns these codes to predetermined fields, and transmits the command as a wireless connection notification command (S413 in FIG. 4B).

Upon transmission, in order to avoid collision among the wireless connection devices, each wireless connection device performs random delay, and transmits the command after confirming through carrier detection that no collisions have occurred. Upon reception of the wireless connection notification, each of the wired connection devices 502 to 504 similarly executes random delay processing, and wired-transfers the wireless connection notification to the source device.

S414 is the wired transfer step of the wireless connection notification. The source device collects and detects information such as the total number of wireless connection devices, their roles, received signal strength indication, supported wireless systems, transferable counts, and the like (S416) from the reception signals of the self wireless communication unit and the transferred notifications from the wired connection (S415).

Then, the received signal strength indication is compared with a predetermined setting value. If the received signal strength indication is larger than the setting value (S417), processing for reducing the number of wireless stations is executed in consideration of the influence on other wireless systems (wireless LAN, WUSB) (S418).

The source device comprises a wireless connection controller which transmits a command for stopping a wireless connection to the adapter.

The source device determines at least one adapter, the wireless communication unit of which is to be stopped, and the wireless connection controller (wireless connection control means) transmits a command for stopping a wireless connection to the determined adapter.

The source device transmits a radio station stop command of the wireless connection device having appending a role code (S419). Of the wireless connection devices which receive the wireless station stop command, the device whose role matches the role code stops its wireless communication unit (S420). The device whose wireless station is to be stopped may be automatically determined based on the device location and wireless system (the directivity level). In this case, assume that the user stops the wireless station of the source device by his or her choice. In this case, the source device need not transmit any wireless station stop command.

After that, the wireless setting mode is set again (S421). After an appropriate received signal strength indication is set (S417), the source device presents the total number of devices and the contents to the user via a predetermined UI and prompts the user to confirm it (S422). If the set state is different from an actual state, it is determined that some abnormality such as a device failure or the like has occurred. If the set state is equal to the actual state, the system setting operation ends.

With the aforementioned operations, the source device detects the connection states of all the devices, and ends the system setting operation. After the system setting, a time slot setting operation is executed (S424).

<Time Slot Setting>

FIG. 6A shows the frame configuration of multi-CH audio data and commands transmitted from the source device to the wired connection devices via the daisy wired connections.

In FIG. 6A, reference numeral 601 denotes a frame sync timing. Within a period of the frame sync timing, audio data tile slots TS1 to TS6 of audio data for 6CHs, a command area 616, GAPs 609 and 617, and the like are allocated. Note that data time slots for 6CHs are determined based on the information of the total number of devices in the system setting (S422 in FIG. 4B) (in case of 6.1CH, 7.1CH, and 8.1CH surround systems, data time slots are assured for 7CHs, 8CHs, and 9CHs, respectively).

The frame sync frequency is set to be 96 kHz in the case of 96-kHz sampling and a 24-bit audio signal for each CH.

In FIG. 6A, reference numeral 602 denotes a TS sync timing of the first data time slot. After this sync signal, for example, audio signal data for one sample point, data 610 (for example, 24-bit data) is allocated. Reference numerals 603 to 607 similarly denote TS sync timings. After these sync signals, audio data 611 to 615 (for example, 24-bit data) are allocated.

Reference numeral 608 also denotes a TS sync timing. After this timing, the command area 616 is set, and various commands can be allocated. The number of bits of commands need not always be equal to the number of data bits. Also, the commands need not be closed within a 1-frame period. The GAPs 609 and 617 are used for, for example, time adjustment or the like. The GAP 617 includes a Guard Interval for modulation and demodulation.

The source device generates the data/command frame configuration shown in FIG. 6A based on the audio signal attributes, the number of CHs, and the like, assigns audio data of each CH, required commands, and the like to that frame, and transmits it to the sink device. FIG. 6B shows an example of a method of assigning audio data to the data/command frame configuration, that is, a data sending method.

The controller comprises a correspondence notification unit (correspondence notification means). The correspondence notification unit (correspondence notification means) assigns audio data having respective roles, that is, SW, center, front L, front R, rear L, rear R, and the like, so that the time slot positions correspond to the roles (FIG. 6B). The source device notifies each connected device of the correspondence between the time slot positions and roles by transmitting a sync transmission frame.

In this way, each device detects the time slot that stores data corresponding to its own role (each device is set with its own role by the mechanical setting switch in M402 in FIG. 4A). Then, the device can select the time slot addressed to itself, and can extract an audio signal addressed to itself. The correspondence notification notified by the source device uses a command signal.

As another data sending method, a method shown in FIG. 6C may be used. FIG. 6C shows a method which assures a header (header information) for each TS sync timing itself (602 to 608) or data, and embeds a role code. In FIG. 6C, reference numerals 618 to 623 denote headers. Reference numeral 624 denotes a header (header information) indicating commands. The source device notifies each device of the correspondence between the roles and role codes. Based on this correspondence, each device detects the correspondence between its own role and role code, and selects and extracts data addressed to itself from the role code written in the header (header information) of the time slot or data.

FIG. 6C shows an example in which the role code is written in the header (header information) of each time slot or data. In place of the role code, an identifier (ID) to be assigned to each device itself may be used. The identifier is not particularly limited. For example, the identifier may include a serial number, network ID, and the like as long as it can be uniquely assigned to each device. In this case, the source device notifies each device of a correspondence table between the time slots and IDs. The setting of the time slots associated with the data sending method has been described. Note that the source device sets the time slots.

There are two communication connection modes of each device, that is, wired and wireless, and the time slot setting corresponding to these modes will be described below.

In case of the wired daisy connection, data is supplied to respective devices using the aforementioned frame configuration. Upon actual data transmission, the frame configuration data is modulated by OFDM (orthogonal frequency division multiplexing transmission method) modulation, and the modulated data is transmitted. In the case of wireless transmission, the frame configuration may or may not be used intact depending on the case. This depends on the wireless system. In this embodiment, assume that two different wireless systems are used.

Figure 7A:
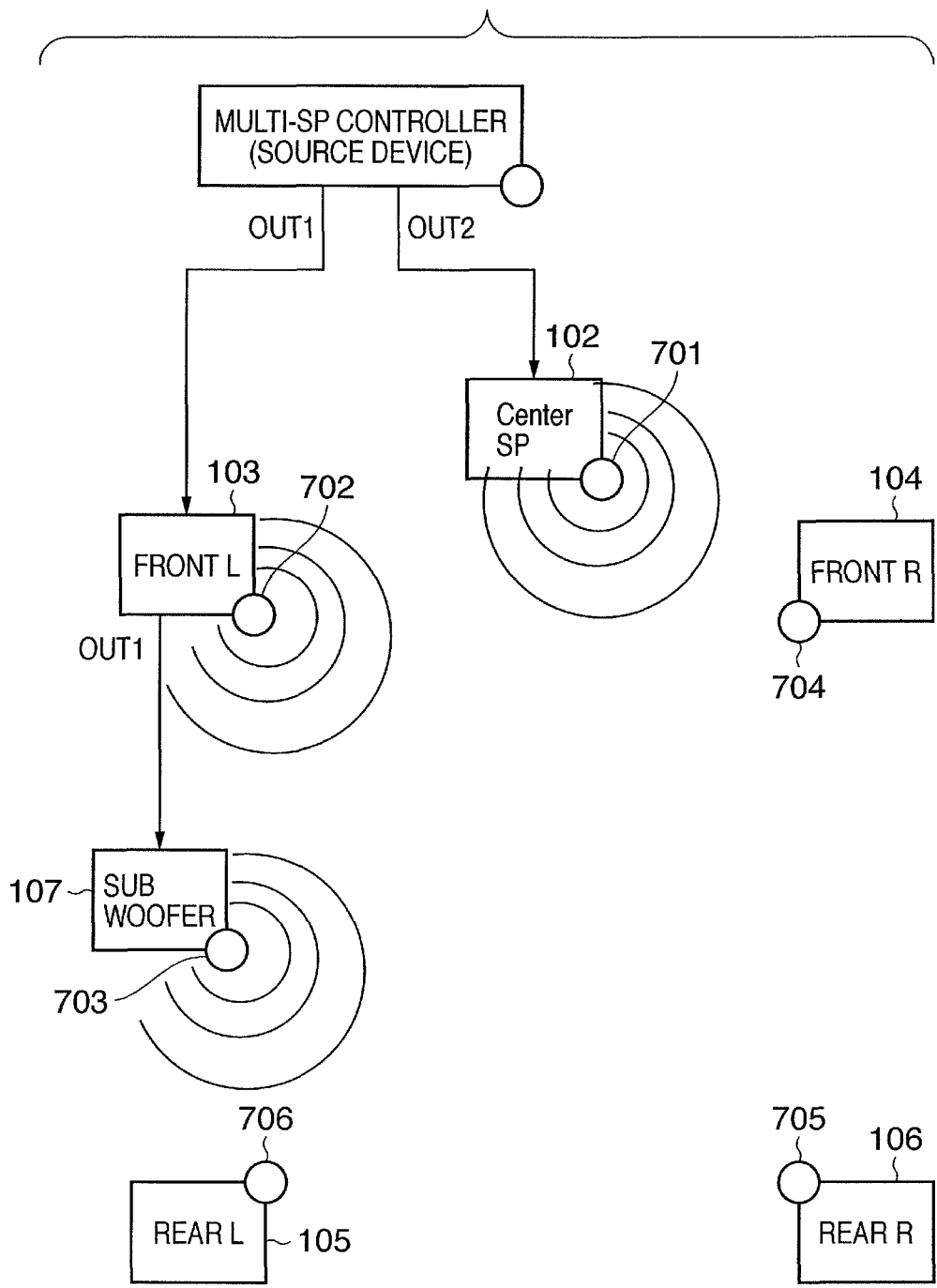
FIG. 7A is a diagram showing wireless connections using a wireless system of a 2.5 GHz to 5 GHz band.

FIG. 7A is a diagram for explaining a wireless connection using a wireless system of a 2.5 GHz to 5 GHz band, which has a relatively low carrier frequency, low directivity, and is less susceptible to the influence of blocking by a human body. More specifically, MB-OFDM (Multi-band OFDM) UWB (Ultra Wide Band) system band group 1 (3.1 GHz to 4.8 GHz) or the like is assumed. In FIG. 7A, the same reference numerals denote the same blocks as in FIG. 1. Reference numerals 701 to 706 denote antennas. Of these antennas, the antennas 701 to 703 belong to the wired connection devices, and mainly play a role of data transmission. The antennas 704 to 706 belong to the wireless connection devices, and mainly play a role of data reception. These antennas may be used for both transmission and reception. Assume that the state in FIG. 7A corresponds to step S424 in FIG. 4B and subsequent steps, and the wireless communication unit of the source device is stopped due to signal strength indication adjustment.

The antennas 701, 702, and 703 in FIG. 7A radiate predetermined wireless signals from the wireless communication units of the devices 102, 103, and 107 to which they belong. These wireless signals are modulated by the OFDM method (orthogonal frequency division multiplexing transmission method). The devices 102, 103, and 107 are wired-connected via the daisy cables and receive the sync frame shown in FIG. 6A at nearly the same time. Since these devices 102, 103, and 107 radiate the sync frame after it is modulated by the same method, these wireless signals are transmitted to environments where the respective devices are allocated in a synchronized state. Note that frequency synchronization of wireless carriers of the wireless signals is implemented by wired or wireless transmission of a reference signal.

In this manner, by the synchronous operations of a plurality of wireless communication units, sufficiently high radio signal strength indication characteristics can be obtained even by ultra weak radio waves regulated by the emission signal strength indication. Even when a person moves in a space between neighboring devices, the influence of blocking is small within the 2.5 GHz to 5 GHz band. Also, since multipath transmission from a plurality of antennas at different positions is made, a more stable communication can be assured. In the case of the wireless system of the 2.5 GHz to 5 GHz band shown in FIG. 7A, the same frame can be used in the wired transmission and wireless transmission, as shown in FIG. 6D.

Figure 7B:
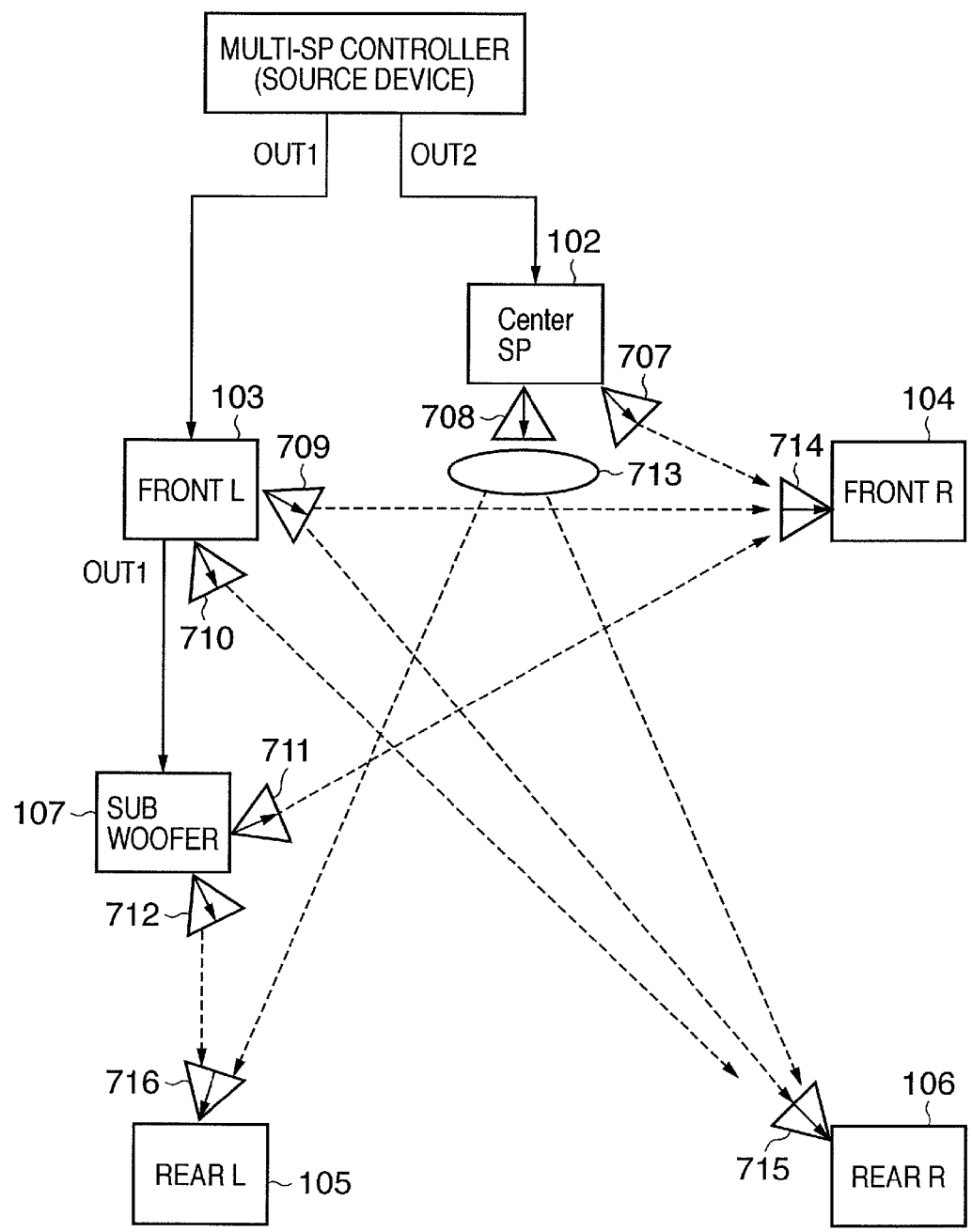
FIG. 7B is a diagram for explaining wireless connections in the case of a 60 GHz-band millimeter-wave wireless communication connection state.

FIG. 7B is a diagram for explaining a wireless connection in the case of 60 GHz-band millimeter-waves which can assure a large transmission band due to a high carrier frequency but are susceptible to blocking by a human body due to the strong directivity and short wavelength.

In FIG. 7B, the same reference numerals denote the same blocks as in FIG. 1. Reference numerals 707 to 712 denote millimeter-wave transmission antennas of the wired connection devices 102, 103, and 107 which mainly assume data transmission. Each device comprises two antennas. These transmission antennas have, for example, 60-degree wide directivity, and are directed to the wireless connection devices 104, 105, and 106 to have an optimal cover range.

In FIG. 7B, reference numerals 714, 715, and 716 denote millimeter-wave reception antennas provided to the wireless connection devices 104, 105, and 106. These reception antennas are located to be able to receive transmitted radio waves from the wired connection devices from as many routes as possible. Reference numeral 713 denotes a human body. The human body 713 stands in front of the transmission antenna 708 of the center SP 102 and blocks millimeter-wave transmission. Even in this case, since the reception antennas receive data from a plurality of routes, communications function normally. Note that frequency synchronization of wireless carriers of wireless signals in a plurality of routes is implemented by wired or wireless transmission of a reference signal.

Figure 7C:
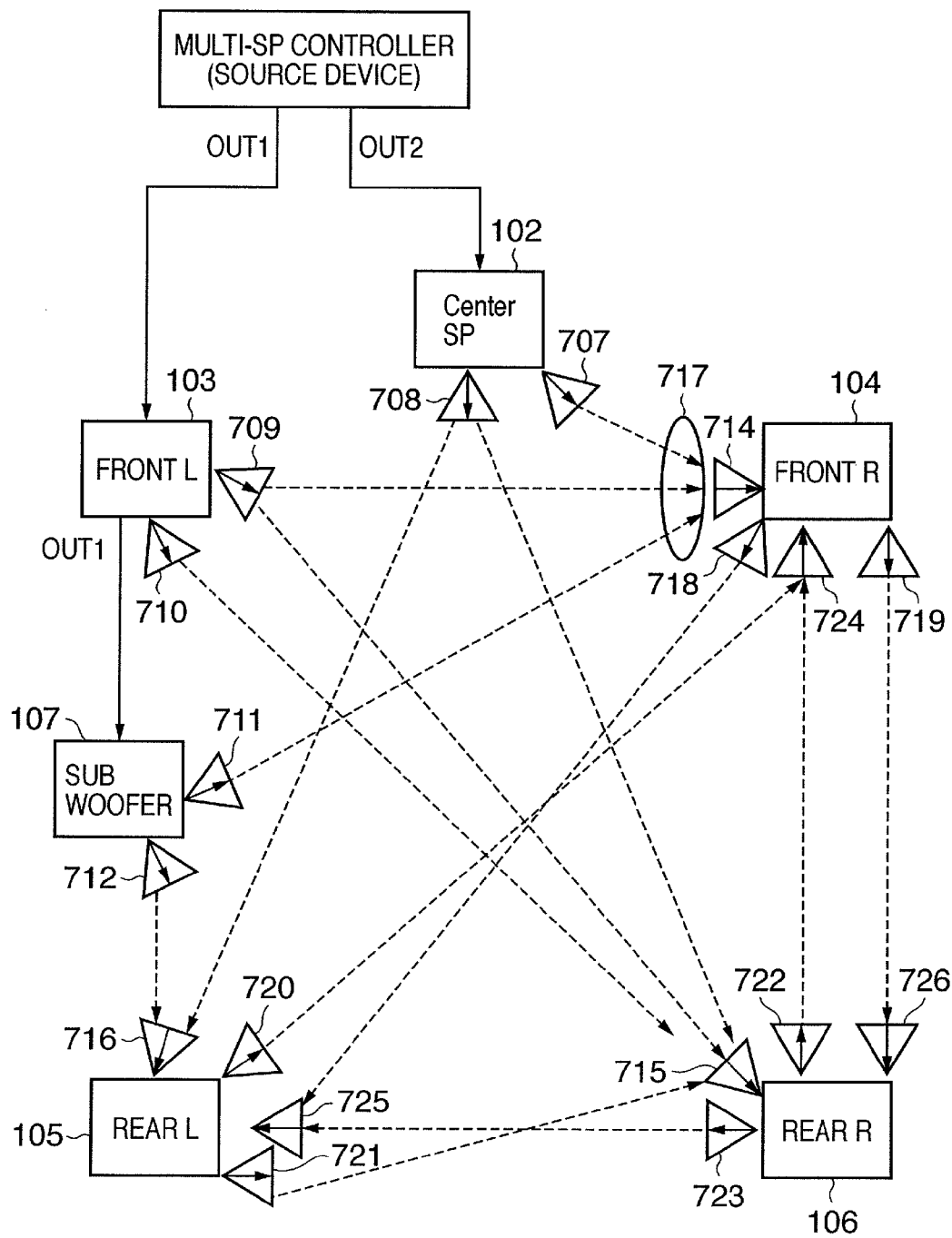
FIG. 7C is a diagram for explaining wireless connections in the case of a 60 GHz-band millimeter-wave wireless communication connection state.

However, when a human body 717 stands in front of the reception antenna 714 of the front R SP 104, all transmission routes to the reception antennas are blocked and communications are interrupted, as shown in FIG. 7C. To prevent this, a plurality of reception antennas must be provided to the wireless connection devices 104, 105, and 106, and millimeter-wave transfer among the wireless connection devices is required.

In FIG. 7C, reference numerals 718, 719, 720, 721, 722, and 723 denote millimeter-wave transmission antennas. Each wireless connection device comprises two antennas. Reference numerals 724, 725, and 726 denote millimeter-wave reception antennas, each of which is equipped as the second reception antenna on each wireless connection device. In this way, each wireless connection device comprises two reception antennas and two transmission antennas.

As a result, as can be seen from FIG. 7C, the case of signal blocking by the human body 717 is handled since the reception antenna 724 can receive data from other routes (transmission antennas 720 and 722). Note that the millimeter-wave data transfer between the wireless connection devices poses problems such as transmission due to positive feedback, amplitude scale-out (clip), or the like unless reception and transfer timings are shifted. To prevent such problems, the sub-frame configuration shown in FIG. 6E is used.

In FIG. 6E, reference numeral 625 denotes a sub-frame sync period used in millimeter-wave transmission. In order to independently assure the millimeter-wave transmission period from the wired connection device and the millimeter-wave transfer period from the wireless connection device, the sub-frame sync period is set to be ½ of a frame sync period, as shown in FIG. 6E. For this reason, time compression of data is required, and a delay for one frame is generated until completion of wireless transfer for one wired transmission frame.

Note that the millimeter-wave transfer count is set to be 1, and the sub-frame period is ½ of the frame period. However, when the transfer count is 2, the sub-frame period is ⅓ of the frame period.

As described above, the wired transmission and the wireless transmission of the 2.5 GHz to 5 GHz band can use the same frame configuration, but the millimeter-wave transmission requires the sub-frame configuration.

The time slot setting (data sending method) in the sub-frame configuration may be different from that in the frame. However, the embodiment of the present invention adopts the same setting, and merely compresses the time axis.

Implementation of concurrent outputs will be described below. The synchronous transmission of multi-channel data is achieved by the frame and sub-frame configurations based on the time slot method, but a mechanism associated with concurrent outputs from multiple devices is required.

Normally, upon making surround playback using multi speakers as in 5.1CH or the like, sounds output from the respective speakers must undergo time alignment. This is because a 5.1CH original sound source is assumed to have the same distances between respective speakers (except for the SW) and a listening point, as shown in FIG. 24A, but such equal distances cannot be attained in fact in the actual configuration, as shown in FIG. 24B. For this reason, the source side such as the AV amplifier or the like applies delays required to correct different distances to respective audio CH signals, as shown in FIG. 24C, thereby driving the respective speakers at the same timing. The correction precision at this time requires a microsecond unit. Therefore, when sub-frames are used like in the millimeter-wave transmission, a method of implementing concurrent outputs is required.

<Concurrent Output Control>

Figure 17A:
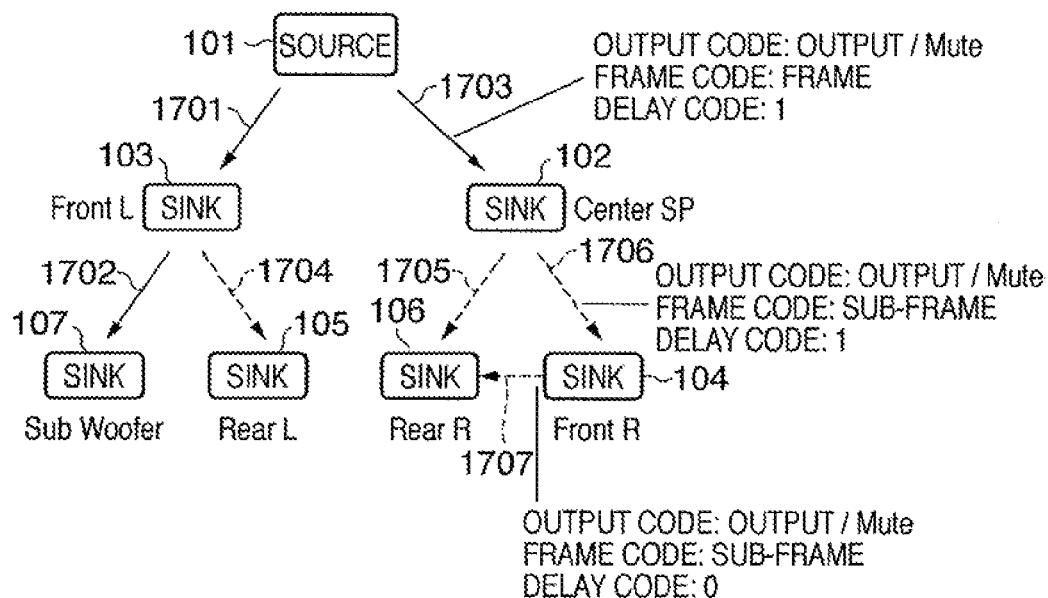
FIG. 17A is a view for explaining concurrent output control.

The method of implementing concurrent outputs according to the embodiment of the present invention will be described below. FIG. 17A is a view for explaining the concurrent output control, and shows the data flow when millimeter-waves are used in wireless connections as shown in FIG. 1. Referring to FIG. 17A, reference numerals 1701 to 1703 denote frame data transmissions by wired connections; and 1704 to 1706, sub-frame data transmissions by millimeter-waves. Reference numeral 1707 denotes a transfer sub-frame transmission by millimeter-waves. Actual transmission data contents of these transmissions are as shown in FIG. 17D. In FIG. 17D, reference numeral 1708 denotes a wired connection frame (transmissions 1701 to 1703); 1709, a sub-frame (transmissions 1704 to 1706) by millimeter-waves; and 1710, a transfer sub-frame (sub-frame 1707).

Audio data in the frame 1708, the sub-frame 1709 and the sub-frame 1710 are audio data to be output at the same timing. The frame 1708 precedes one frame by the sub-frame 1709. The sub-frame 1709 precedes one sub-frame by the sub-frame 1710.

FIG. 17C shows an example of fields and setting data of an output command (control information). The output command includes data indicating whether or not to output target data (output or Mute), a frame code (frame or sub-frame), a delay count code (the number of frame periods to be delayed upon playback of data or the number of delay periods to be delayed for respective sub-frames), and the like. Based on the output command (control information), each device (SP adapter) controls the playback timings of audio data (playback control).

In FIG. 17D, reference numeral 1711 denotes an output command for the frame 1708. In this case, the frame code includes frame information, and the delay count code includes "1". Based on this information, the sink devices 102, 103, and 107 delay data by one period for each frame, and output the delayed data. Reference numeral 1712 (FIG. 17D) denotes an output command for the sub-frame 1709. In this command, the frame code includes sub-frame information, and the delay count code includes "1". Based on this information, the sink devices 104, 105, and 106 delay data by one period for each sub-frame, and output the delayed data.

Reference numeral 1713 (FIG. 17D) denotes an output command for the sub-frame 1710. In this command, the frame code includes sub-frame information, and the delay count code includes "0". Based on this information, the sink device 106 outputs data for each sub-frame to have a delay of zero periods. With the output commands, the differences due to the transmission method and transmission routes can be absorbed, and concurrent output of all the sink devices is implemented.

Figure 17B:
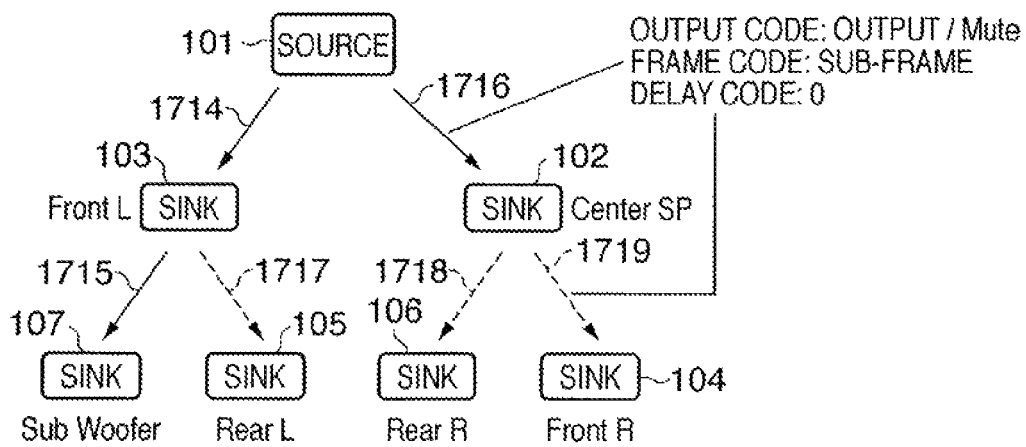
FIG. 17B is a view showing an example in the case of 2.5 GHz to 5 GHz wireless communication.
Figure 17D:
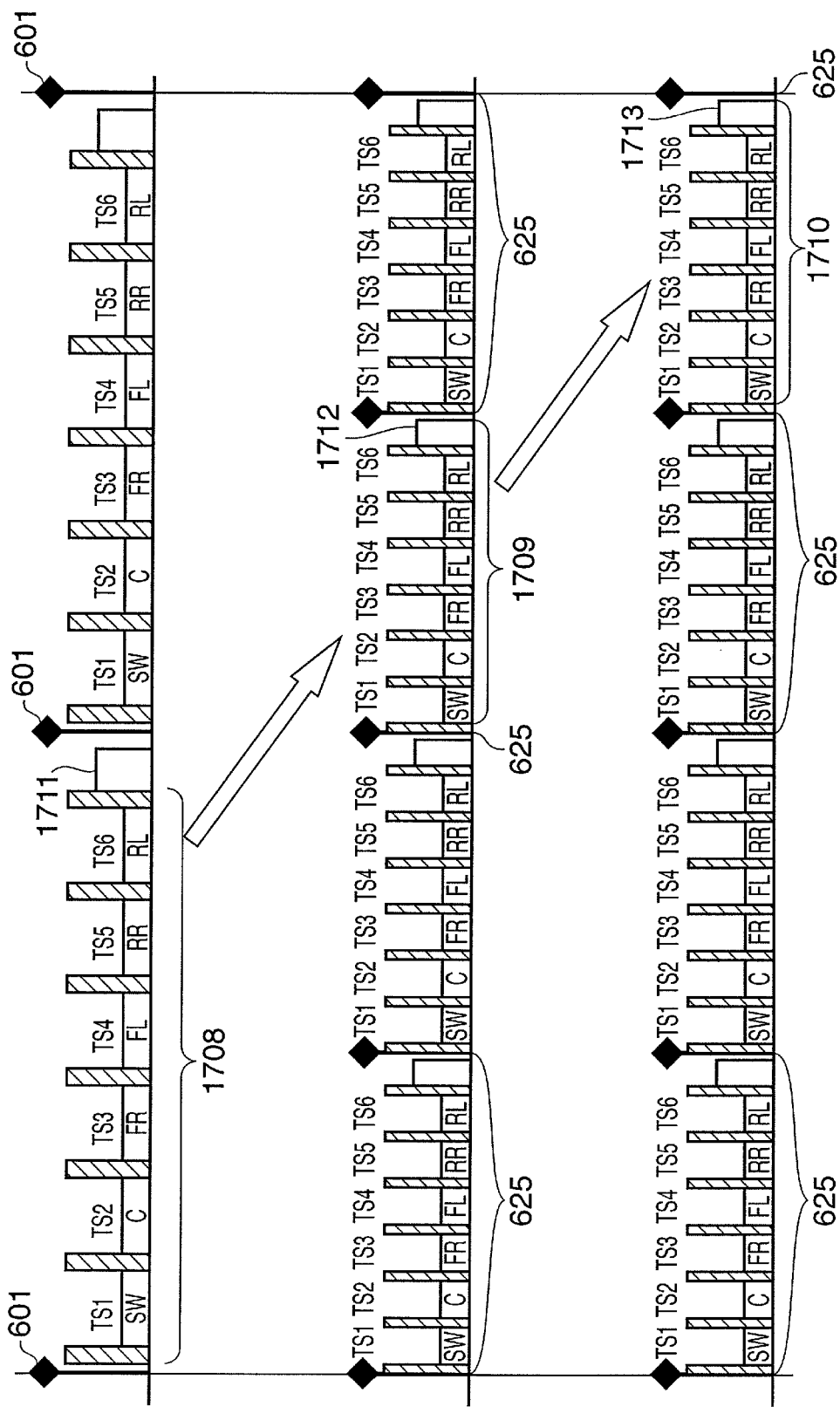
FIG. 17D is a chart showing an example of data transmission by means of millimeter-wave transfer sub-frames.

FIG. 17B shows an exemplary case of wireless connections using the 2.5 GHz to 5 GHz band. In this case, since no sub-frame is used, the same output commands are used in all routes 1714 to 1719: the frame code includes frame information, and the delay count code includes "0".

<Delay Time Correction for Concurrent Outputs>

The delay time correction method required to improve the precision of the concurrent output timing will be described below. FIG. 18A also describes signal processing delay times in respective sink devices in addition to FIG. 17D. In FIG. 18A, reference numerals 1801 to 1803 denote processing delay times in respective layers in association with transmission routes. These delay times include an FEC (Forward Error Correction) execution time, general signal processing delay, and the like. Of course, this case is based on the premise that the data itself in the given time slot has undergone FEC coding in advance.

Reference numeral 1801 denotes a processing delay time in the wired connection using a frame; 1802, a processing delay time when using the millimeter-wave sub-frame transmission; and 1803, a processing delay time when using the millimeter-wave transfer sub-frame (SF). These processing delays differ depending upon the FEC method used, the implementation method, and the like. For this reason, the source device must detect the processing delay times of the respective devices in order to calculate a maximum processing delay time, and must notify the respective devices of difference values from the maximum processing delay time. FIG. 18B shows the setting flow for this purpose.

In step S1804 in FIG. 18B, the user activates a processing delay time correction mode. After the processing delay time correction mode is activated, the source device transmits a delay time notification request command to all the devices (S1805). Upon reception of the delay time notification request command, the respective devices (wired connection devices and wireless connection devices) calculate their own processing delay times or read out stored values (S1806). The devices notify the source device of their processing delay times using a delay time notification command (S1807). Since the detailed operations associated with this request command and notification command are the same as in FIGS. 4A and 4B, a repetitive description thereof will be omitted.

The source device collects the processing delay times from the data reception timings until playback in the respective devices. The source device serves as maximum processing delay time calculation means, and calculates a maximum processing delay time after it collects the processing delay times of all the devices (S1808). The source device then serves as a difference value calculation means, and calculates difference values between the maximum processing delay time and the processing delay times of the devices for respective devices (S1809). The source device also serves as a difference value notification means, and notifies the respective devices of the calculated difference values using difference delay time notification commands (S1810). The respective devices set the received difference delay times in their delay counters (to be described later) (S1811), thus ending the processing delay time correction mode.

<System Operation>

The system operation will be described below. FIGS. 8A to 8C, FIGS. 9A to 9C, FIGS. 10A to 10C, FIGS. 11A to 11C, FIGS. 13A to 13C, and FIGS. 14A to 14C are block diagrams showing details of the system according to the embodiment of the present invention. FIGS. 8A to 8C and FIGS. 9A to 9C show the system according to the first embodiment, which uses the wireless connection of the 2.5 GHz to 5 GHz band in the wireless communication unit, and FIGS. 10A to 10C and FIGS. 11A to 11C show the system according to the second embodiment, which uses millimeter-waves. The latter system requires the sub-frame configuration, and its arrangement is more complicated than the former system. FIGS. 13A to 13C and FIGS. 14A to 14C show the system according to a third embodiment in which both the wireless connection of the 2.5 GHz to 5 GHz band and that using millimeter-waves are implemented in the wireless communication unit.

<Wired & Wireless of 2.5 GHz to 5 GHz Band>

The system according to the first embodiment which uses the wireless connection of the 2.5 GHz to 5 GHz band shown in FIGS. 8A to 8C and FIGS. 9A to 9C will be described first.

Figure 8A:
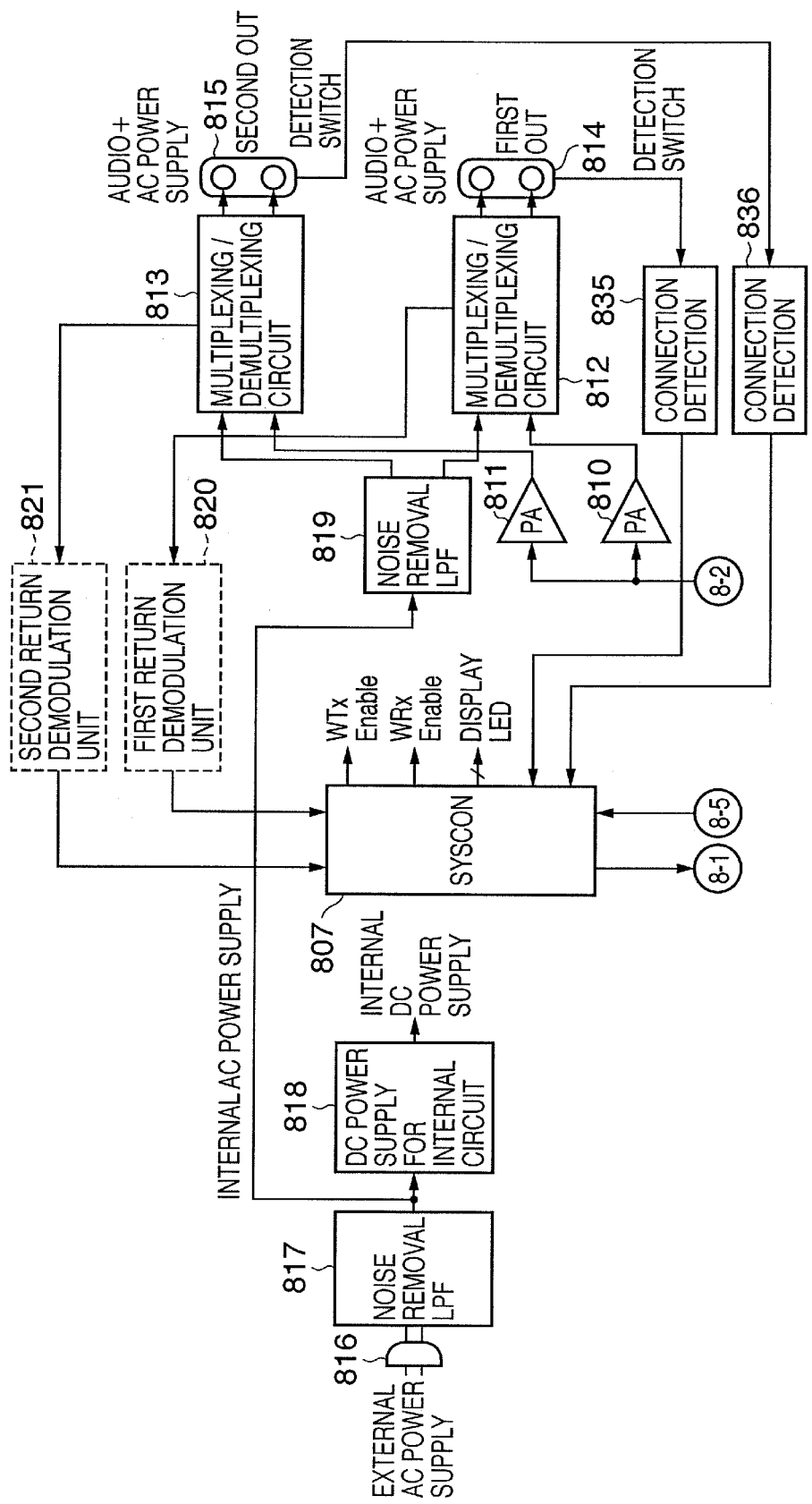
FIG. 8A is a block diagram showing the arrangement of a multi-SP controller (source device) in the case of a wired & 2.5 GHz to 5 GHz wireless communication connection state.
Figure 8B:
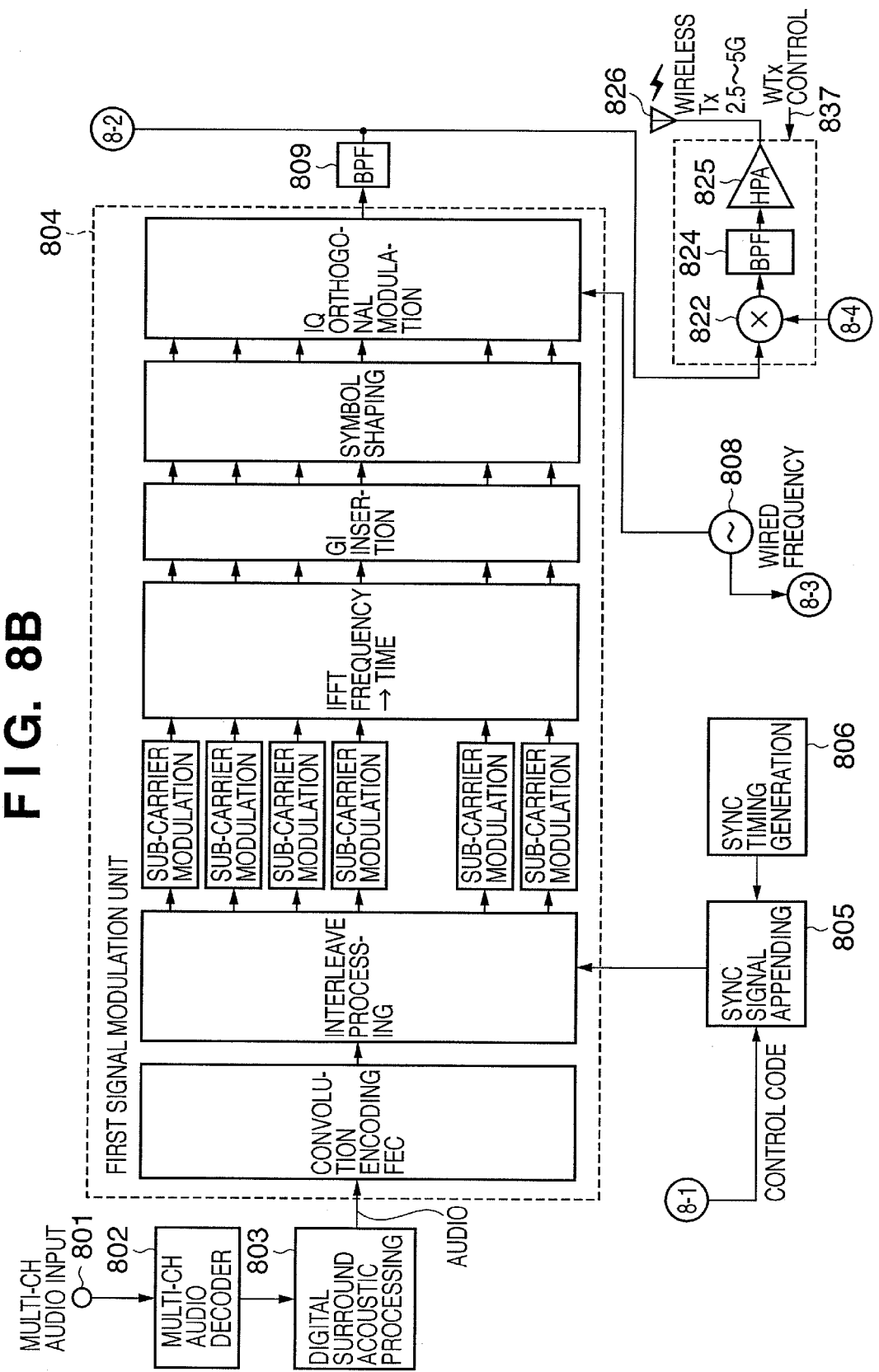
FIG. 8B is a block diagram showing the arrangement of the multi-SP controller (source device) in the case of a wired & 2.5 GHz to 5 GHz wireless communication connection state.
Figure 8C:
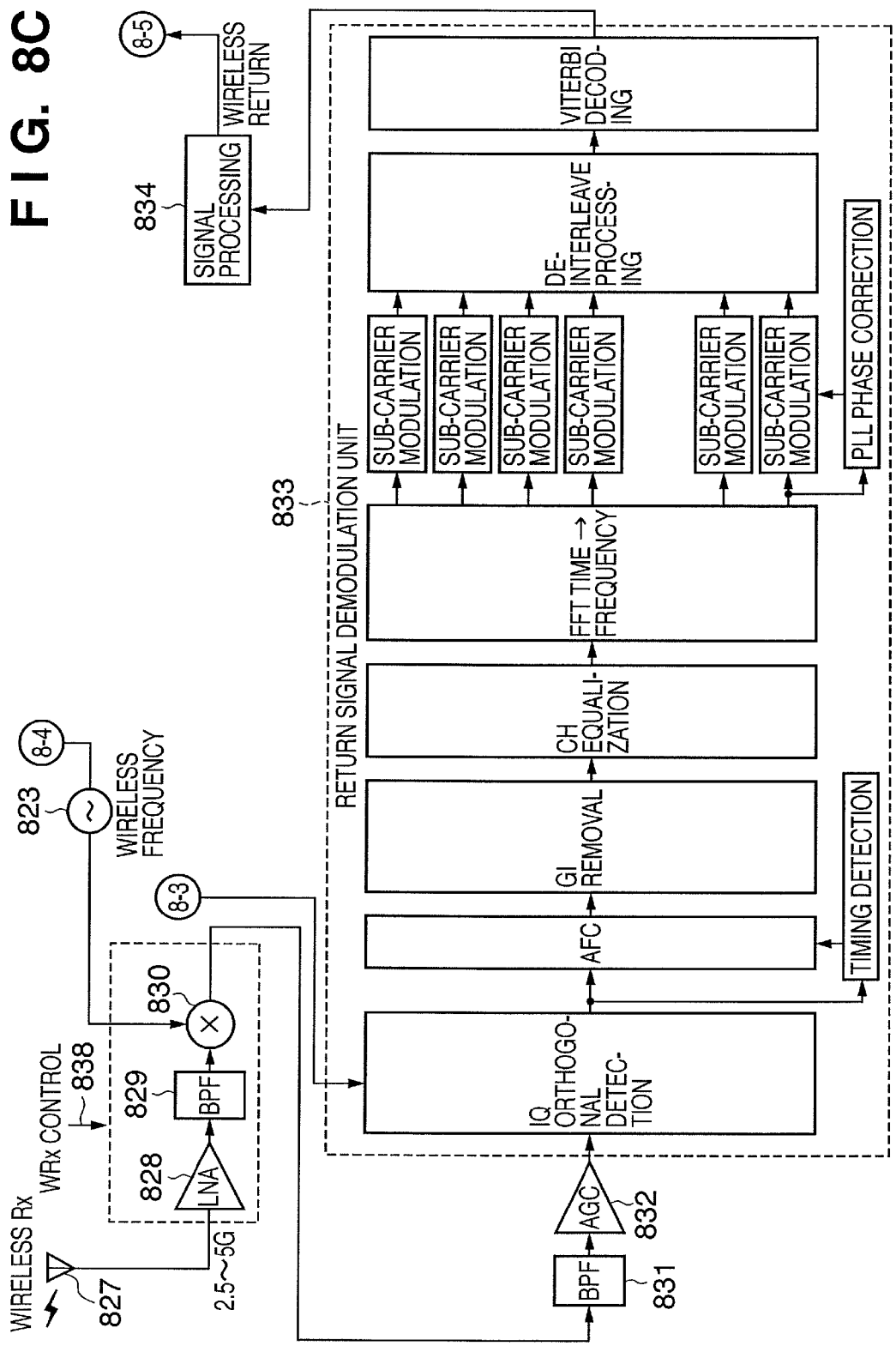
FIG. 8C is a block diagram showing the arrangement of the multi-SP controller (source device) in the case of a wired & 2.5 GHz to 5 GHz wireless communication connection state.
Figure 9A:
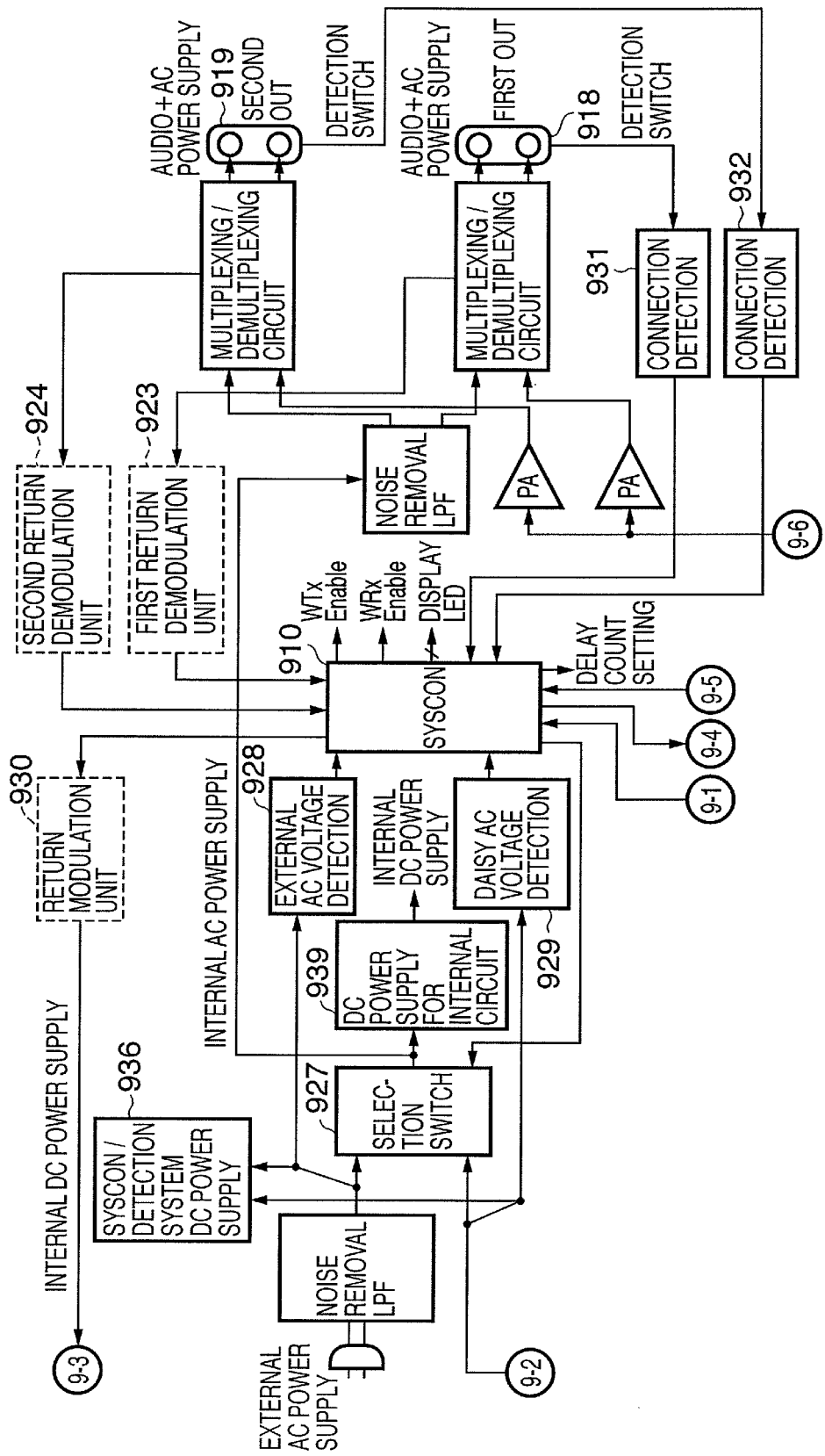
FIG. 9A is a block diagram showing an SP adapter (sink device) in the case of a wired & 2.5 GHz to 5 GHz wireless communication connection state.
Figure 9B:
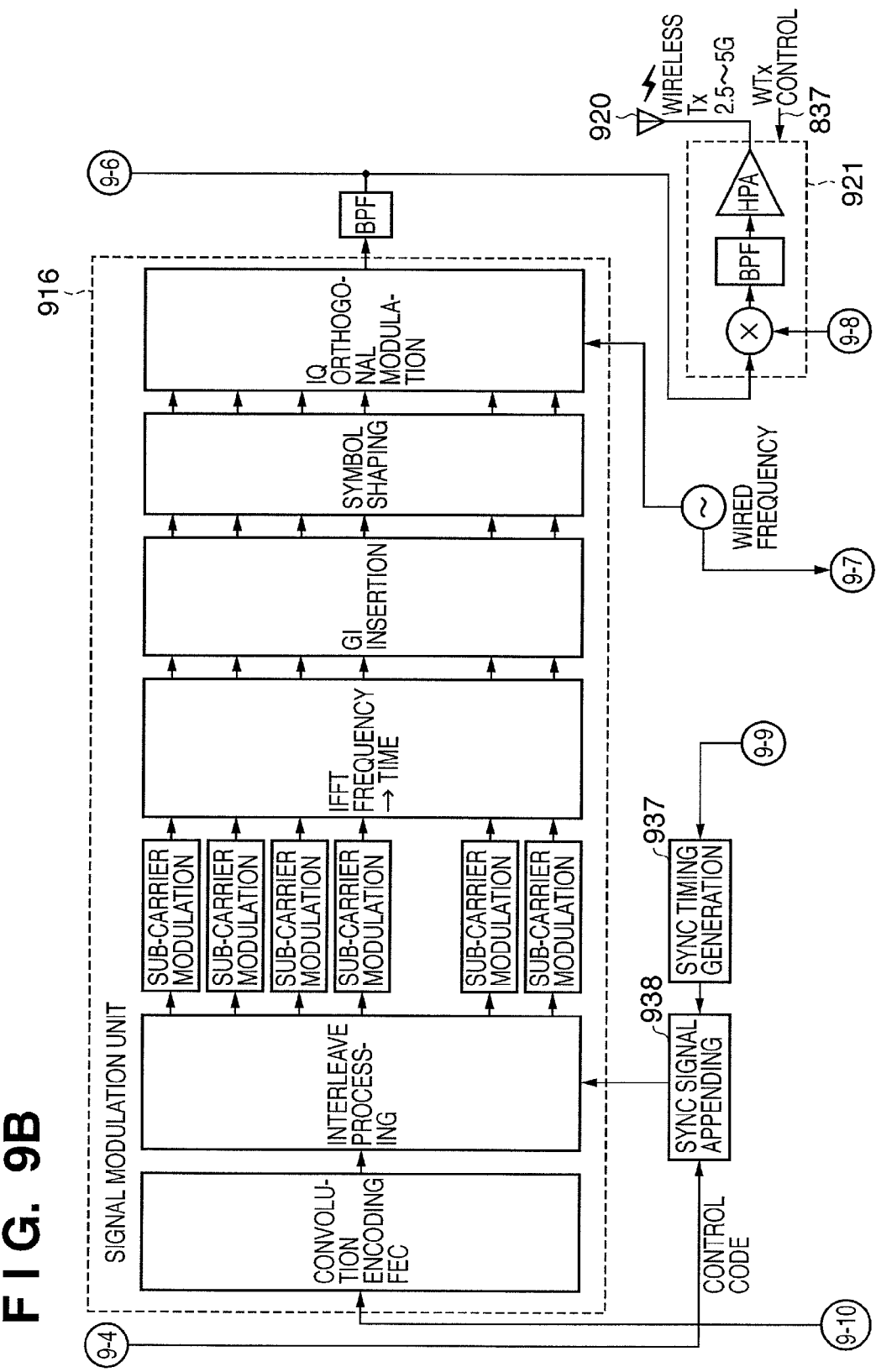
FIG. 9B is a block diagram showing the SP adapter (sink device) in the case of a wired & 2.5 GHz to 5 GHz wireless communication connection state.
Figure 9C:
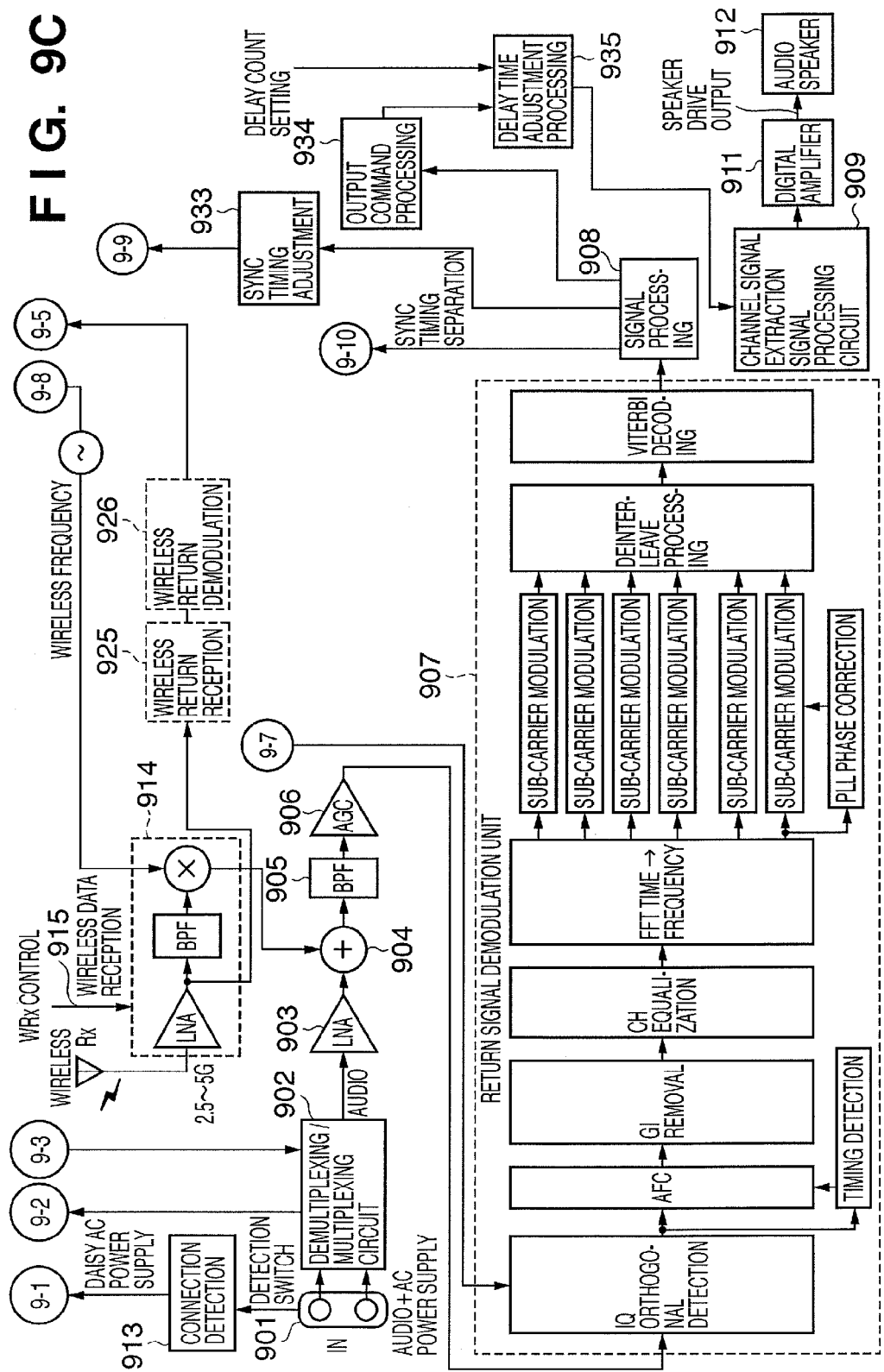
FIG. 9C is a block diagram showing the SP adapter (sink device) in the case of a wired & 2.5 GHz to 5 GHz wireless communication connection state.

FIGS. 8A to 8C are block diagrams of the multi-SP controller (denoted by reference numeral 101 in FIGS. 1 and 2A) as the source device, and FIGS. 9A to 9C are block diagrams of the SP adapter (denoted by reference numerals 102 to 107 in FIGS. 1 and 2B) as the sink device side.

Referring to FIG. 8B, reference numeral 801 denotes a multi-CH audio input terminal; 802, a multi-CH audio decoder; and 803, a digital surround acoustic processing unit or circuit. These components respectively correspond to those denoted by reference numerals 201, 202, and 203 in FIG. 2A. Reference numeral 804 denotes a first signal modulation unit, (for example, an OFDM modulator). Since the detailed arrangement of the first signal modulation unit is a state-of-the-art technique, a description thereof will not be given.

Reference numeral 805 denotes a sync signal appending circuit associated with the data frame generation in FIG. 6A; and 806, a generation circuit of various clock signals including sync timings. The sync timing generation circuit 806 generates timing pulses corresponding to, for example, 96-kHz, 24-bit audio data in response to an instruction (not shown) from a syscon 807.

Reference numeral 808 denotes a wired carrier frequency oscillator used to convert the frequency into the transmission band used in the daisy wired transmission. The digital surround acoustic processing circuit 803 applies frequency characteristic correction, delay time correction (time alignment), and amplitude correction to 5.1CH acoustic data, which is separated into 6 independent channel signals by the multi-CH audio decoder 802. The 5.1CH acoustic data having undergone the amplitude correction and the like is then sent to the first signal modulation unit 804 in a predetermined format. These audio data for respective CHs are written in the data fields in FIG. 6A. The correspondence between the time slots and respective channel data is based on an instruction (not shown) from the syscon.

When the time slots and roles are stored in correspondence with each other, the first signal modulation unit 804 forms, for example, the wired transmission frame shown in FIG. 6B by the aforementioned operations. This transmission frame undergoes OFDM modulation, and is then frequency-converted by the wired carrier frequency oscillator 808. The converted frame is then sent to a band-pass filter (BPF filter) 809. After the predetermined band limitation by the BPF filter 809, the transmission signal is sent to power amplifiers 810 and 811. The transmission signals amplified to a predetermined power level by the power amplifiers 810 and 811 are sent to multiplexing/demultiplexing circuits 812 and 813, and are multiplexed along with a power supply.

The power supply and multiplexed transmission signals are sent to daisy wired output terminals 814 and 815. In this way, predetermined transmission data are output to the daisy wired outputs of the two systems.

On the other hand, reference numeral 816 denotes an external AC power supply plug, which is connected an indoor AC power supply outlet. Reference numeral 817 denotes a noise removal filter for removing noise from the external AC power supply. The noise removal filter attenuates a predetermined band so as not to exert an adverse influence on subsequent transmission signal multiplexing. If the indoor AC power supply line includes a packet transmission signal such as PLC or the like, it is especially important to remove it. Reference numeral 818 denotes a DC power supply circuit which generates a DC power supply for internal use. The AC power supply after noise removal is sent to the multiplexing/demultiplexing circuits 812 and 813 via another noise removal filter 819. The purpose of the second noise removal is to remove electromagnetic noise of internal circuits picked up by parallel cable interconnections of the intermediate route immediately before multiplexing/demultiplexing.

FIG. 12A shows details of the multiplexing/demultiplexing circuit. In FIG. 12A, reference numeral 1201 denotes external AC power supply input terminals; 1202, a low-pass filter (LPF); 1203, an output resistor; 1204 and 1205, RF amplifiers; 1206, an RF transformer; and 1207, power supply multiplexed transmission signal output terminals. Also, reference numeral 1208 denotes a transmission signal input terminal; 1209, a reception output signal of a transmission signal from the daisy wired connection; and 1210, RF coupling capacitors.

The RF amplifiers 1204 and 1205, resistor 1203, and RF transformer 1206 form a 2-wire to 4-wire conversion circuit which is a state-of-the-art technique. Upon operation of the 2-wire to 4-wire conversion circuit and the LPF 1202, a transmission signal from the terminal 1208 is output to the terminals 1207, and conversely, transmission signals from the terminals 1207 are output to the terminal 1209. The LPF 1202 prevents leakage of the transmission signal to the terminals 1201. Voltages from the AC power supply flow from the terminals 1201 to the terminals 1207.

With the aforementioned operations of the multiplexing/demultiplexing circuits, the transmission signals from the power amplifiers 810 and 811 are output to the daisy wired output terminals 814 and 815 while being multiplexed with the power supply. On the other hand, reception signals from the daisy wired output terminals 814 and 815 are sent to a first Return demodulation unit 820 and second Return demodulation unit 821, and are demodulated to obtain return signals such as a notification command and the like from the devices.

These signals are sent to the syscon 807. This return signal transmission uses, for example, OFDM with a narrow transmission band, and simplification can be attained by a normal OFDM signal demodulation unit. Note that OFDM parameters are selected so that OFDM of return signals and that of audio data undergo frequency division multiplexing transmission on a single interconnection. A description of its practical embodiment will not be given.

As for wireless transmission, a wired band transmission signal sent from the BPF filter 809 is frequency-converted into a wireless transmission signal by the output from a wireless frequency carrier oscillator 823, and a multiplier 822 and BPF 824. The wireless transmission signal undergoes predetermined power amplification by an RF power amplifier 825, and is fed to an antenna 826.

As for wireless return reception, a wireless transmission wave received by an antenna 827 (in the 2.5 GHz to 5 GHz band, the antenna can be commonly used for transmission and reception), is amplified by a low-noise amplifier (LNA) 828, and only a required band is extracted by a predetermined BPF 829. After that, the output from the BPF 829 is down-converted by the output from the wireless frequency carrier oscillator 823, and a multiplier 830 and BPF 831, and the converted signal is sent to an auto-gain control circuit (AGC circuit) 832. Reference numeral 833 denotes an OFDM signal demodulation unit, which employs a state-of-the-art technique, and demodulates the reception signal from the AGC circuit using wired carriers from the wired carrier frequency oscillator 808. The output from the signal demodulation unit 833 is a wireless return signal, and need not always have a transmission frame shown in FIG. 6B. When the signal has the transmission frame, the received return signal undergoes predetermined signal extraction processing by a signal processing circuit 834, and is then sent to the syscon 807.

Reference numerals 835 and 836 (FIG. 8A) denote connection detection circuits which detect the ON/OFF states of mechanical insertion detection switches attached, for example, to the daisy wired output receptacle. The output from these connection detection circuits is sent to the syscon 807. Reference numeral 837 denotes an Enable control signal of a wireless transmission unit; and 838, an Enable control signal of a wireless reception unit. The syscon 807 controls these signals.

On the other hand, in the block diagrams (FIGS. 9A to 9C) of the SP adapter (devices 102 to 107 in FIGS. 1 and 2B) as the sink device side, reference numeral 901 denotes a daisy wired input terminal. The power supply and multiplexed transmission signal received at this terminal is sent to a demultiplexing/multiplexing circuit 902. The detailed arrangement of the demultiplexing/multiplexing circuit is as shown in FIG. 12B, and extracts the AC power supply and reception signal from the input power supply and multiplexed signal. Conversely, return signals such as a notification command and the like are output to the daisy wired side. FIGS. 12A and 12B show the same circuit arrangement although they have opposite directions of use.

The received data demultiplexed by the demultiplexing/multiplexing circuit 902 is sent to a low-noise amplifier (LNA) 903 and undergoes predetermined amplification. The amplified data is then sent to a band-pass filter (BPF filter) 905 via an adder 904. The BPF filter 905 extracts only a required band, and sends the extracted data to an OFDM demodulator 907 via an auto-gain control circuit (AGC circuit) 906. The received data demodulated by the OFDM demodulator 907 has the frame configuration shown in FIG. 6B. The frames of the reception data are sent to a signal processing circuit 908 to extract frame sync timings and TS sync timings, and the extracted timings are sent to a channel signal extraction signal processing circuit 909 for the given channel together with the reception data. The channel signal extraction signal processing circuit is configured with its own role code by a syscon 910, and extracts data corresponding to this role code.

Then, the channel signal extraction signal processing circuit executes predetermined processing, for example, correction of the SP frequency characteristics and the like. The processed data is sent to a digital amplifier 911 and undergoes digital amplification to a predetermined power level. The amplified data is then supplied, for example, to an audio speaker 912. Reference numeral 913 denotes a detection circuit which receives an ON/OFF signal, for example from a mechanical switch attached to the daisy wired input terminal to perform connection detection, and sends its detection result to the syscon 910. Reference numeral 914 denotes a wireless data reception unit; and 915, a WRX control signal used to control activation/deactivation of the wireless reception unit.

A signal modulation unit 916 accepts the frames received from the signal processing circuit 908, and modulates the frames for transfer to the next stage. After modulation, the frames are output to daisy output terminals 918 and 919 via the same processing as in FIGS. 8A to 8C.

In the case of wireless transmission as well, data is transmitted from a transmission antenna 920 by the same processing as in FIGS. 8A to 8C. The syscon controls based on a wireless Tx control signal 922 whether or not to use a wireless transmission unit 921.

Wired return reception signals and the like from the next stage, which are received by the daisy output terminals 918 and 919, are demultiplexed by multiplexing/demultiplexing circuits, and are respectively sent to a first Return demodulation unit 923 and second Return demodulation unit 924. After the demodulation, the signals are passed to the syscon 910.

Wireless return reception signals are demodulated by a wireless Return reception unit 925 and wireless Return demodulation unit 926, and are passed to the syscon 910.

A daisy AC voltage detection circuit 929 (first voltage detection means) can detect the multiplexed AC voltage via the wired connection to a wired communication unit (wired communication means) of the adapter. An external AC voltage detection circuit 928 (second voltage detection means) can detect an external AC power supply voltage. The syscon 910 (power supply switch means) can switch a power supply selection switch 927 by checking the outputs from the daisy AC voltage detection circuit 929 (first voltage detection means) and the external AC voltage detection circuit 928 (second voltage detection means).

Upon reception of commands and the like from the daisy wired input, the syscon 910 inputs ACK, a notification command, and the like (or status notification and the like) to a Return modulation unit 930. The output from the Return modulation unit 930 is sent to the daisy wired input terminal 901. Reference numerals 931 and 932 denote connection detection circuits which detect the ON/OFF states of the mechanical insertion detection switches attached to, for example, the daisy wired output receptacle. The outputs from these connection detection circuits are sent to the syscon 910. When these detection circuits do not detect any cable connections to the daisy output terminals 918 and 919, for example, the syscon 910 can control and activate the wireless communication unit 921 by the wireless Tx control signal 922.

Reference numeral 933 denotes a sync timing adjustment circuit, which performs phase adjustment to the frame sync timing demultiplexed by the signal processing circuit, and supplies an external sync reset signal to a sync timing generation circuit 937.

Reference numeral 934 denotes an output command processing circuit; and 935, a delay time adjustment processing circuit.

The output command processing circuit 934 and delay time adjustment processing circuit 935 function in regard to the output timing of an acoustic output. The output command processing circuit 934 associates with the concurrent output processing function described above in relation to FIGS. 17A to 17D. The case of 2.5 GHz to 5 GHz wireless corresponds to FIG. 17B, and the output command processing circuit 934 instructs the delay time adjustment processing circuit 935 to execute predetermined delay processing according to the frame code and delay count code in the output command. The delay time adjustment processing circuit 935 executes delay time correction for the concurrent outputs described in relation to FIGS. 18A and 18B in addition to the delay processing (zero delay since the case of 2.5 GHz to 5 GHz wireless does not require any special processing such as frame period delay and the like) associated with the output command.

That is, the delay time adjustment processing circuit 935 delays an output trigger from the output command processing circuit 934 by a predetermined period, executes delay processing by a period corresponding to the delay counter, and then passes the output trigger to the channel signal extraction signal processing circuit 909. In this manner, the concurrent output timing is adjusted. Note that the delay counter value of the delay time adjustment processing circuit 935 is set by the syscon 910 as a value obtained by adding the difference delay time notified from the multi-SP controller (source device) to its own processing delay time.

In this way, the delay time adjustment processing circuit 935 delays the output trigger from the output command processing circuit 934, and sends the delayed output trigger to the channel signal extraction signal processing circuit 909, thus driving the output operation.

Reference numeral 936 denotes a DC power supply generation circuit for the syscon and detection system. The DC power supply generation circuit 936 always allows use of the syscon 910 and detection system using the external AC power supply and the AC power supply from the demultiplexing/multiplexing circuit 902. Note that the detection system includes the connection detection circuit 913 of the daisy wired input, the connection detection circuits 931 and 932 of the daisy wired outputs, the external AC voltage detection circuit 928, and the daisy AC voltage detection circuit 929.

<Wired & Millimeter-Wave Wireless>

Figure 10A:
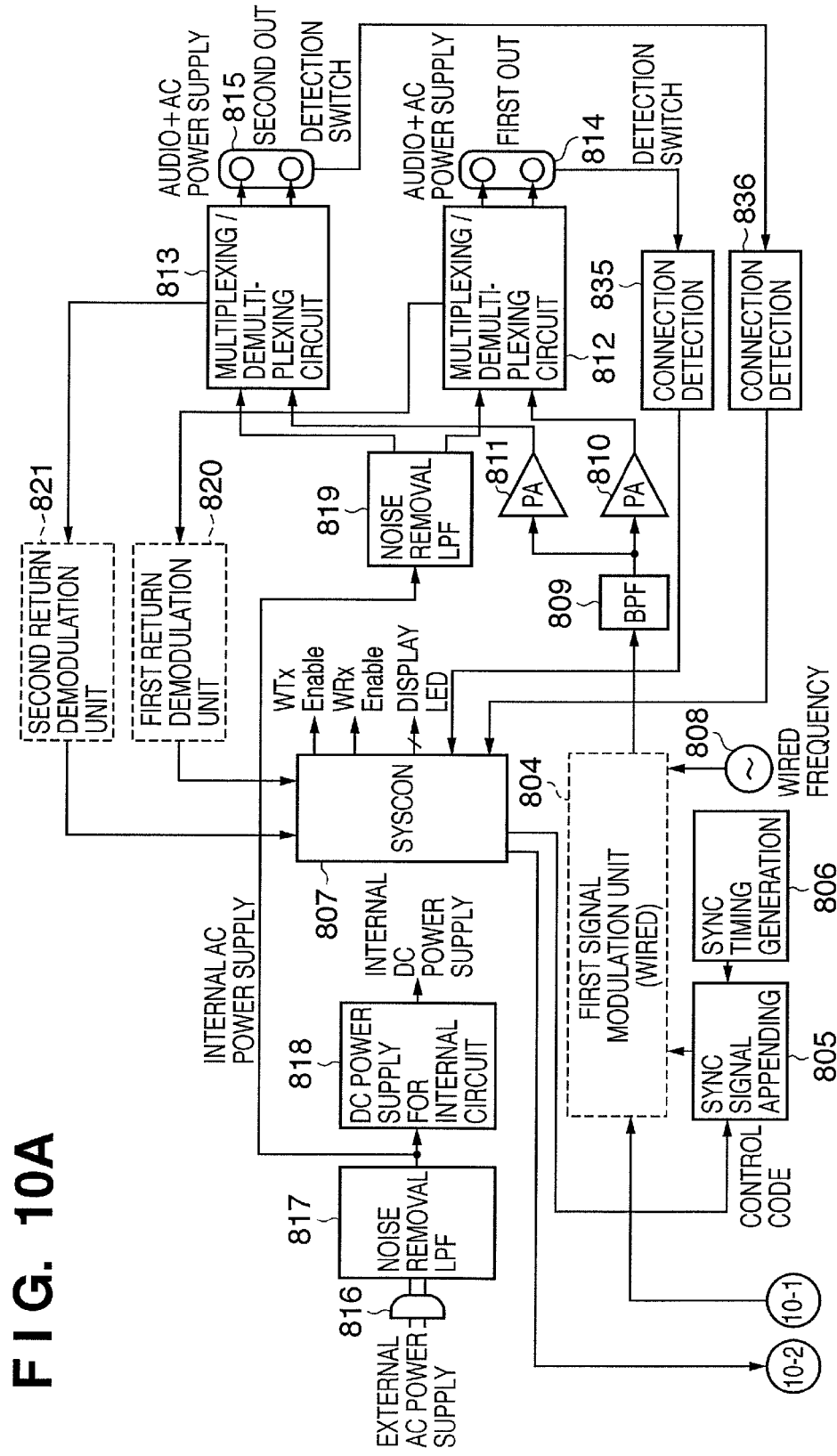
FIG. 10A is a block diagram showing the arrangement of a multi-SP controller (source device) in the case of a wired & millimeter-wave wireless communication connection state.
Figure 10B:
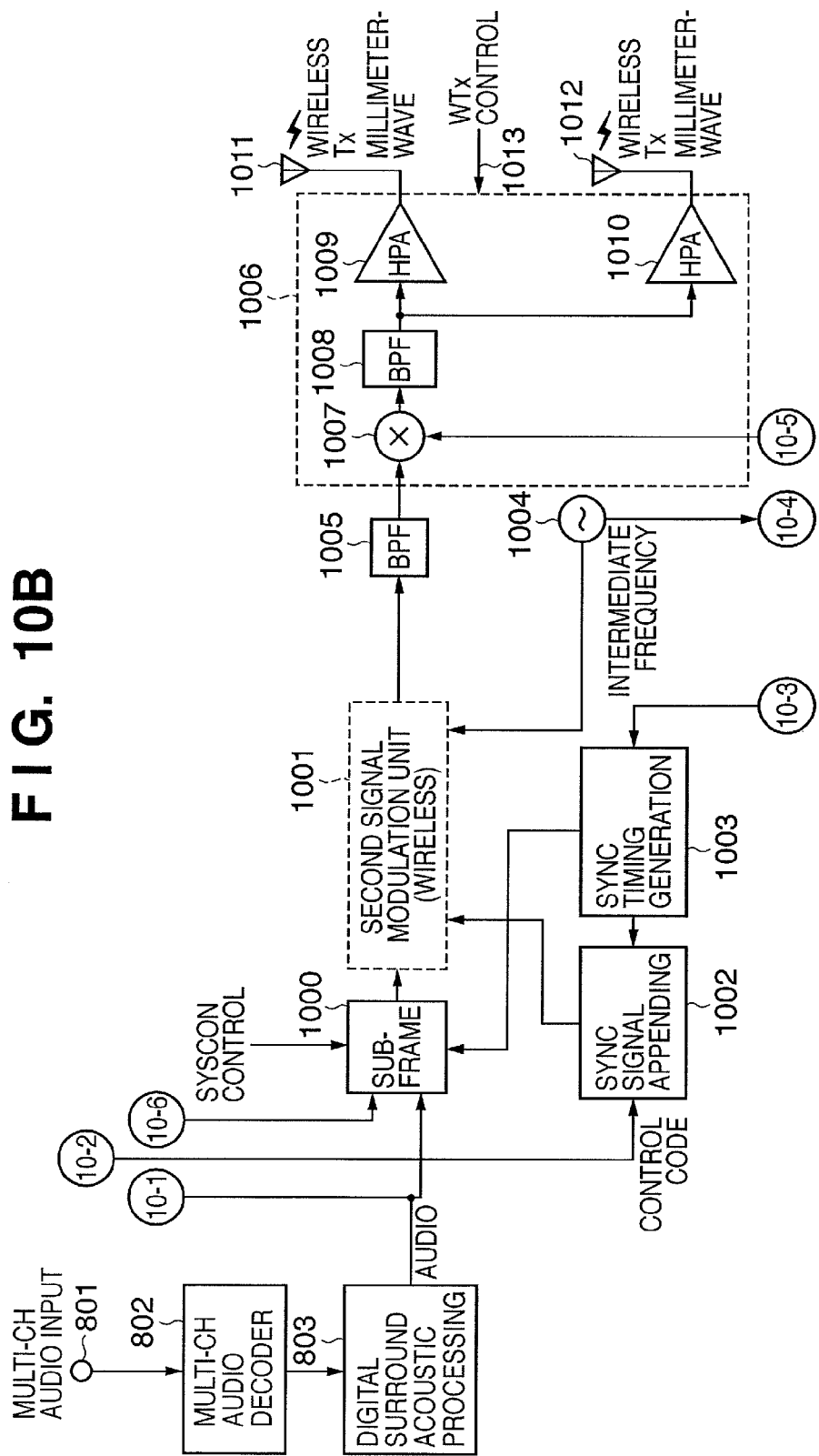
FIG. 10B is a block diagram showing the arrangement of the multi-SP controller (source device) in the case of a wired & millimeter-wave wireless communication connection state.
Figure 10C:
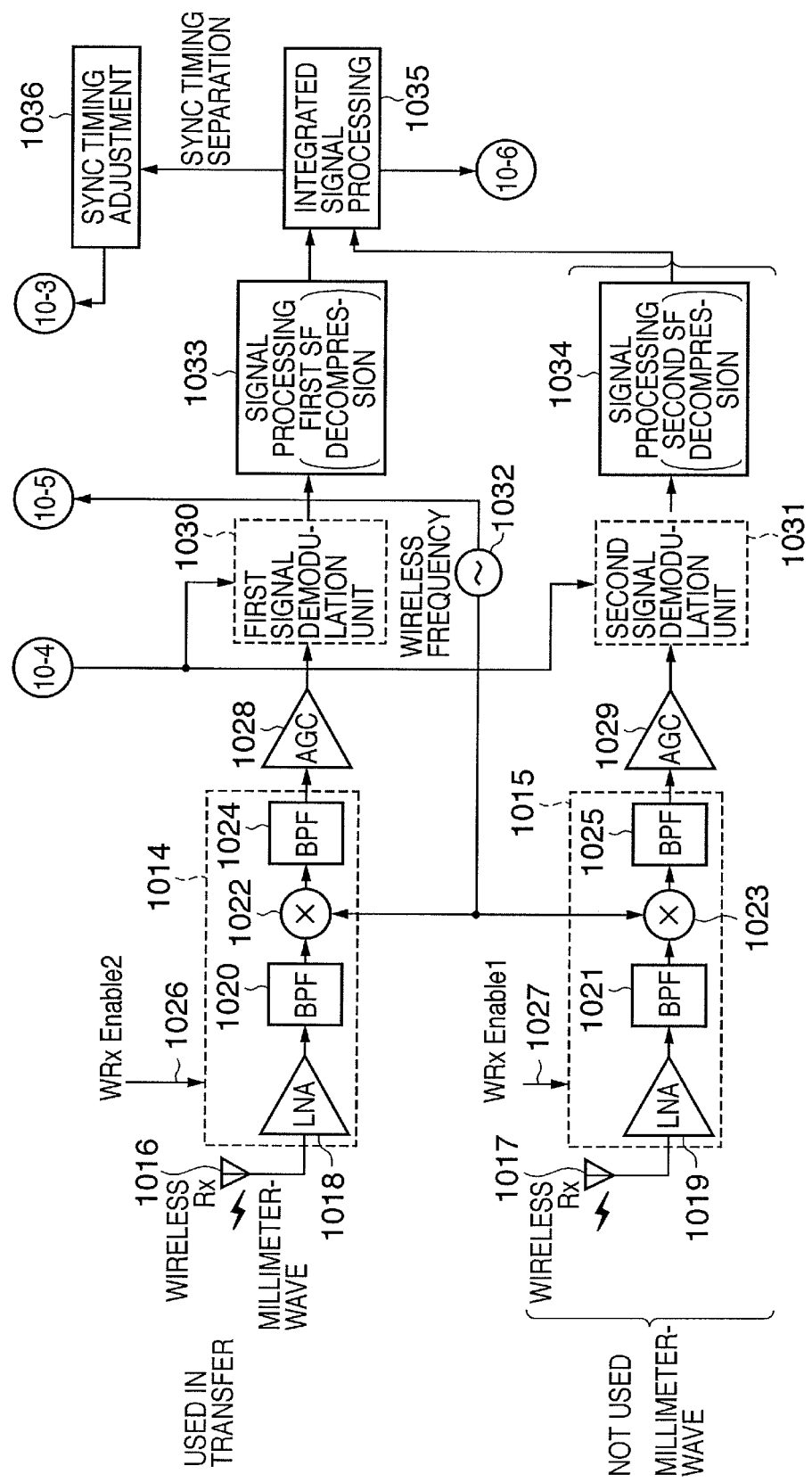
FIG. 10C is a block diagram showing the arrangement of the multi-SP controller (source device) in the case of a wired & millimeter-wave wireless communication connection state.
Figure 11B:
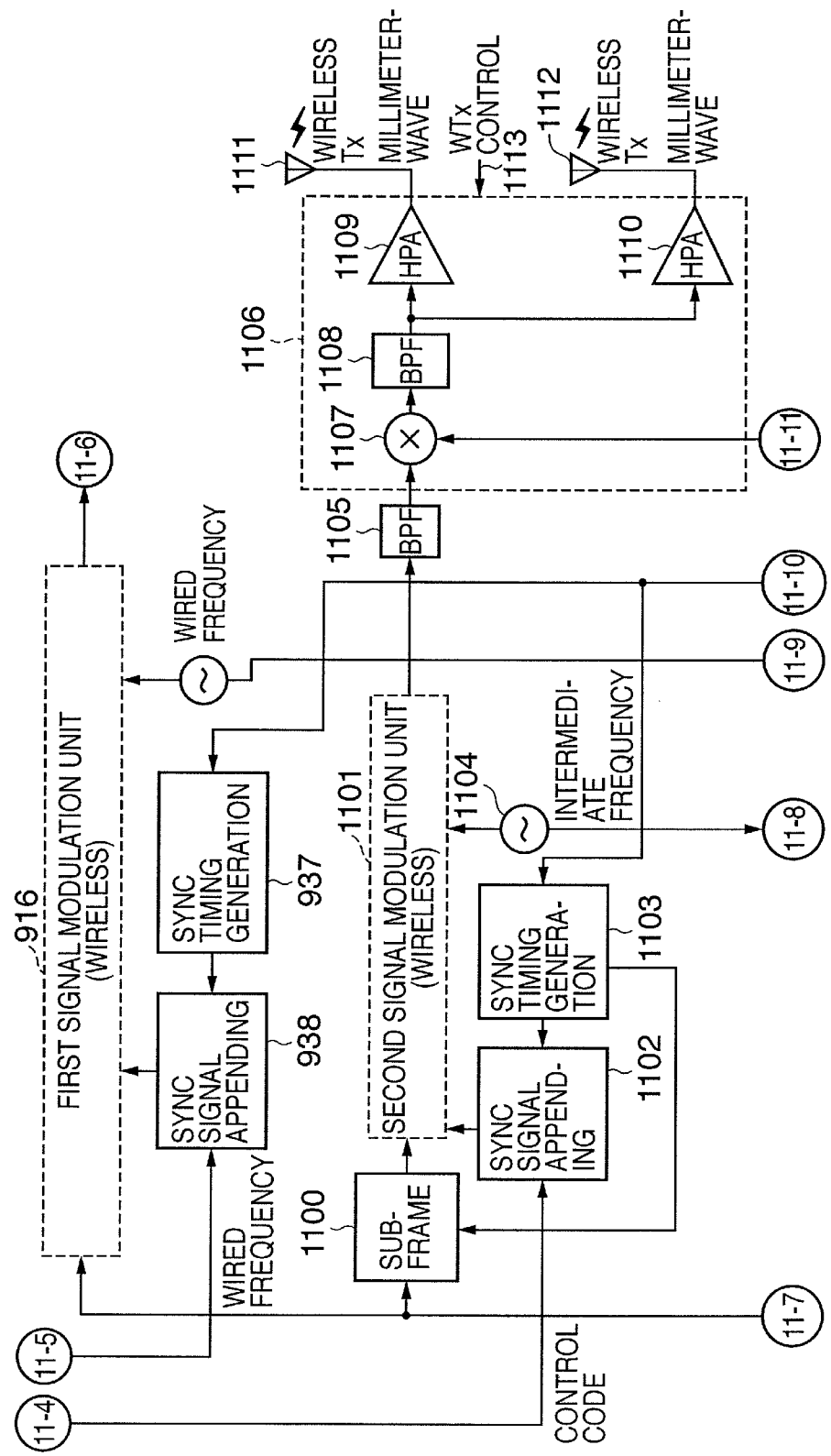
FIG. 11B is a block diagram showing the SP adapter (sink device) in the case of a wired & millimeter-wave wireless communication connection state.

FIGS. 10A to 10C and FIGS. 11A to 11C show the second embodiment which uses millimeter-waves. FIGS. 10A to 10C are block diagrams of the multi-SP controller (denoted by reference numeral 101 in FIGS. 1 and 2A) as the source device, and FIGS. 11A to 11C are block diagrams of the SP adapter (denoted by reference numerals 102 to 107 in FIGS. 1 and 2B) as the sink device side. In FIGS. 10A to 10C, the same reference numerals denote the same blocks as in FIGS. 8A to 8C, and new reference numerals are assigned to only different blocks.

Since the operation of the wired communication unit is the same as in FIGS. 8A to 8C, a millimeter-wave communication unit will be mainly described below. In FIG. 10B, reference numeral 1000 denotes a sub-frame compression processing circuit, which comprises a compression buffer that holds data for one frame, and a write/read control circuit.

In the case of millimeter-waves, the sub-frame shown in FIG. 6E must be used, and the sub-frame compression processing circuit 1000 generates compressed data for the sub-frame. The sub-frame compression processing circuit 1000 has inputs of two systems, that is, the input from the digital surround acoustic processing circuit 803 and that from an integrated signal processing circuit 1035. The latter input is used upon transferring the sub-frame received by a millimeter-wave reception unit. Switching of the inputs depends on the method of using the millimeter-wave communication unit, and is controlled by the syscon 807.

Reference numeral 1001 denotes a second signal modulation circuit, which performs OFDM modulation of the sub-frame signal in the millimeter-wave band.

Reference numeral 1002 denotes a sync signal appending circuit associated with sub-frame generation in FIG. 6E. The sync signal appending circuit 1002 generates a predetermined sub data frame using various timing clocks from a sync timing generation circuit 1003. Reference numeral 1004 denotes an intermediate frequency oscillator, which converts the OFDM modulated signal of the sub-frame into an intermediate frequency. Reference numeral 1005 denotes a BPF filter which extracts only predetermined band components after the intermediate frequency conversion. Reference numeral 1006 denotes a millimeter-wave transmission unit, which converts the OFDM signal after the intermediate frequency conversion into millimeter-waves. The millimeter-wave transmission unit comprises a multiplier 1007, BPF 1008, RF power amplifiers 1009 and 1010, and connects millimeter-wave antennas 1011 and 1012. Reference numeral 1013 denotes an Enable control signal for the millimeter-wave transmission unit, which undergoes predetermined control from the syscon 807.

The millimeter-wave transmission unit receives millimeter-wave carriers from a millimeter-wave band oscillator 1032. Since details of the operation of the millimeter-wave transmission unit are the same as those in the case of 2.5 GHz to 5 GHz wireless, a description thereof will not be given. Note that the millimeter-wave transmission unit is different from the case of 2.5 GHz to 5 GHz wireless in that the RF power amplifiers and antennas for two systems are provided to take a measure against antenna blocking.

Millimeter-wave signals output from the millimeter-wave antennas for two systems use the first sub-frame shown in FIG. 6E when the sub-frame compression processing circuit 1000 receives the input from the digital surround acoustic processing circuit 803 side. Also, the millimeter-wave signals use the second sub-frame when the circuit 1000 receives the input from the integrated signal processing circuit 1035 side.

The millimeter-wave reception unit is used only when the multi-SP controller performs millimeter-wave transfer. Whether or not the multi-SP controller performs millimeter-wave transfer depends on the method of use. In FIG. 10C, the millimeter-wave reception unit has millimeter-wave reception circuits 1014 and 1015 for two systems. This is to share with a millimeter-wave communication unit (having reception units for two systems) of the SP adapter.

The millimeter-wave reception circuits 1014 and 1015 respectively comprise low-noise amplifiers 1018 and 1019, BPFs 1020 and 1021, multipliers 1022 and 1023, and BPFs 1024 and 1025, and connect millimeter-wave antennas 1016 and 1017. Reference numerals 1026 and 1027 denote Enable control signals for the respective millimeter-wave reception circuits, which are used to make predetermined control from the syscon 807. Details of the operation are the same as those in case of 2.5 GHz to 5 GHz wireless. Reception signals of the millimeter-wave reception circuits 1014 and 1015 are sent to a first signal demodulation circuit 1030 and second signal demodulation circuit 1031 via AGC circuits 1028 and 1029. Reference numeral 1032 denotes a millimeter-wave band frequency oscillator. The received millimeter-wave signals are converted into the intermediate frequency band by this oscillator 1032, the multipliers 1022 and 1023, and the BPFs 1024 and 1025.

The intermediate frequency band signals are sent to the first signal demodulation circuit 1030 and second signal demodulation circuit 1031 via the AGC circuits 1028 and 1029, and undergo OFDM demodulation after they are converted to baseband signals using the intermediate frequency signal from the intermediate frequency oscillator 1004. The reception sub-frame signals after demodulation are sent to signal processing circuits 1033 and 1034 and undergo decompression processing. The two systems operate independently: a decompressed signal for the first sub-frame signal can be obtained from the signal processing circuit 1033, and that for the second sub-frame signal can be obtained from the signal processing circuit 1034. However, since the multi-SP controller uses such signal in only millimeter-wave transfer, only one system associated with the first sub-frame is used.

The signal which is decompressed to be converted into a frame period by the signal processing circuit 1033 is sent to the integrated signal processing circuit 1035, and the frame sync timing is demultiplexed. The sync timing undergoes phase adjustment by a sync timing adjustment circuit 1036, and is then sent to the sync timing generation circuit 1003 to activate external synchronization.

FIGS. 11A to 11C are block diagrams of the SP adapter upon using millimeter-waves according to the second embodiment. In FIGS. 11A to 11C, the same reference numerals denote the same blocks as those in FIGS. 9A to 9C, and new reference numerals are assigned to only different blocks. Since the operation of the wired communication unit is the same as in FIGS. 9A to 9C, a millimeter-wave communication unit will be mainly described below.

Referring to FIG. 11C, reference numerals 1116 and 1117 denote millimeter-wave reception antennas; and 1114 and 1115, millimeter-wave reception units for two systems, which have millimeter-wave reception circuits for two independent systems. This is to take a measure against blocking for the reception antennas shown in FIG. 7C.

Millimeter-wave reception signals for two systems are frequency-converted by a millimeter-wave band signal from a millimeter-wave band wireless frequency oscillator 1132, and are sent to AGC circuits 1128 and 1129. The signals output from the AGC circuits 1128 and 1129 are sent to a first signal demodulation unit 1130 and second signal demodulation unit 1131. The signals undergo OFDM demodulation by these demodulation units after they are converted into baseband signals by an intermediate frequency signal from an intermediate frequency oscillator 1104. These reception signals are then sent to signal processing circuit 1133 and 1134. The first signal processing circuit 1133 extracts and decompresses the first sub-frame, and sends the decompressed frame to an integrated signal processing circuit 1135. On the other hand, the second signal processing circuit 1134 extracts and decompresses the second sub-frame, and sends the decompressed frame to the integrated signal processing circuit 1135.

The integrated signal processing circuit 1135 selects one frame free from any errors of the decompressed frame from the first sub-frame and that from the second sub-frame, and sends the selected frame to the channel signal extraction signal processing circuit 909. After that, an acoustic output is created by the digital amplifier 911 and audio speaker 912.

In the case of the wired connection, the integrated signal processing circuit 1135 selects the reception frame from the first signal demodulation unit (OFDM demodulator) 907. The integrated signal processing circuit 1135 sends the reception frame to the channel signal extraction signal processing circuit 909. After that, an acoustic output is created by the digital amplifier 911 and audio speaker 912.

The output command processing circuit 934 and delay time adjustment processing circuit 935 function in regard to the output timing of an acoustic output. The output command processing circuit 934 associates with the concurrent output processing function described above in relation to FIGS. 17A to 17D. The case of millimeter-waves corresponds to FIG. 17A, and the output command processing circuit 934 instructs the delay time adjustment processing circuit 935 to execute predetermined delay processing according to the frame code and delay count code in the output command. The delay time adjustment processing circuit 935 executes delay time correction for the concurrent outputs described in relation to FIGS. 18A and 18B in addition to the delay processing associated with the output command.

That is, the delay time adjustment processing circuit 935 delays an output trigger from the output command processing circuit 934 by a predetermined period, executes delay processing by a period corresponding to the delay counter, and then passes the output trigger to the channel signal extraction signal processing circuit 909. In this manner, the concurrent output timing is adjusted.

Note that the delay counter value of the delay time adjustment processing circuit 935 is set by the syscon 910 as a value obtained by adding the difference delay time notified from the multi-SP controller (source device) to its own processing delay time.

The integrated signal processing circuit 1135 sends the decompressed frame from the first sub-frame to the first signal modulation unit 916 for wired transfer. In this way, the wired transfer operation to the next stage is executed. The integrated signal processing circuit 1135 sends the received first sub-frame to a sub-frame compression circuit 1100 for millimeter-wave transfer. As for the millimeter-wave transfer to the next stage, the sub-frame compression circuit 1100 generates compressed data for a sub-frame, and sends it to a second signal modulation unit 1101. Then, the sub-frame undergoes OFDM modulation in the millimeter-wave band.

A sub-frame sync signal required to generate a transfer sub-frame is obtained from a sync signal appending circuit 1102. A sync timing generation circuit 1103 supplies various timing clocks required to generate the sub-frame sync signal to the sync signal appending circuit 1102. The sync timing generation circuit 1103 is externally synchronized with the reception frame sync timing after phase adjustment by a sync timing adjustment circuit 1136.

The sub-frame signal that has undergone the OFDM modulation then undergoes intermediate frequency conversion by an intermediate frequency from the intermediate frequency oscillator 1104, and is then sent to a millimeter-wave transmission unit 1106 via a BPF 1105. The millimeter-wave transmission unit applies millimeter-wave conversion to the sub-frame signal by millimeter-wave carriers from the millimeter-wave band wireless frequency oscillator 1132, and outputs the converted signals from antennas 1111 and 1112.

The wired transfer is processed by the same processes as those in FIGS. 9A to 9C, and signals are output from the daisy output terminals 919 and 918.

The millimeter-wave related blocks in FIGS. 11B and 11C are the same as those denoted by reference numerals 1000 to 1036 in FIGS. 10B and 10C, and can be shared by both devices.

The operation of the SP adapter in FIGS. 11A to 11C differs depending on the presence/absence of the wired connection.

In the example of FIG. 7C, in the wired connection devices 102, 103, and 107, the two transmission antennas are used to make millimeter-wave transmission using the first sub-frame. These devices do not use any millimeter-wave reception function. The two antennas of the device are individually directed to optimal directions in consideration of the directivity.

On the other hand, in the case of the wireless connection devices 104, 105, and 106, the first reception antennas 714, 715, and 716 (antenna 1116 in FIG. 11C) of the devices receive the first sub-frame transmission, and transfer the second sub-frame. Then, the same transfer data of the second sub-frame is fed to the two transmission antennas. Therefore, each of the two transmission antennas 718, 719, 720, 721, 722, and 723 (antennas 1111 and 1112 in FIG. 11B) of the devices output millimeter-waves of the second sub-frame in predetermined directions. The second reception antennas 724, 725, and 726 (antenna 1117 in FIG. 11C) of the wireless connection devices 104, 105, and 106 are directed to the predetermined directions, and receive the second sub-frame millimeter-waves. In this way, the wireless connection devices 104, 105, and 106 can receive the first and second sub-frames, and can take a measure against blocking of antennas.

<Wired & 2.5 GHz to 5 GHz Band & Millimeter-Waves>

A case will be described as the third embodiment wherein both the 2.5 GHz to 5 GHz band and millimeter-waves are used as wireless transmission means.

By implementing both the 2.5 GHz to 5 GHz band and millimeter-waves, sharing of roles according to the characteristics can be made, for example the settings and the like are made using the 2.5 GHz to 5 GHz band, and the millimeter-waves are exclusively used in broad-band data transmission. This is rational since commands such as "system setting", "delay time measurement", and the like described above between the source device and sink device can be exchanged using the 2.5 GHz to 5 GHz band. In the third embodiment, the millimeter-wave transmission and reception units are prepared as a single unit which allows add-on later. In this manner, when the number of wireless connection devices is small, the user uses the 2.5 GHz to 5 GHz band, and when the number of wireless connection devices increases, he or she can additionally equip the millimeter-wave module.

Figure 13A:
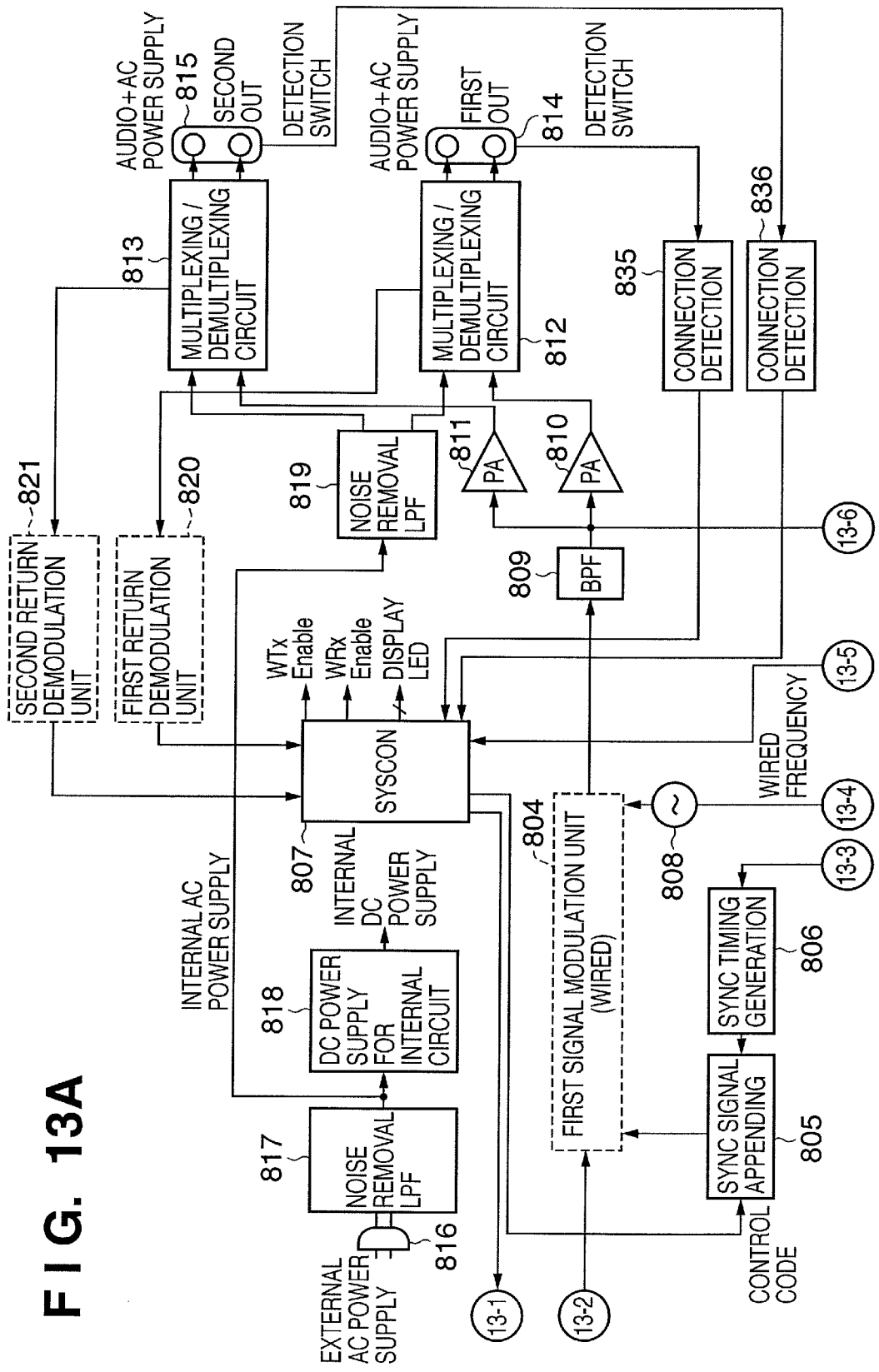
FIG. 13A is a block diagram showing the arrangement of a multi-SP controller (source device) in the case of a wired & 2.5 GHz to 5 GHz & millimeter-wave wireless communication connection state.
Figure 13C:
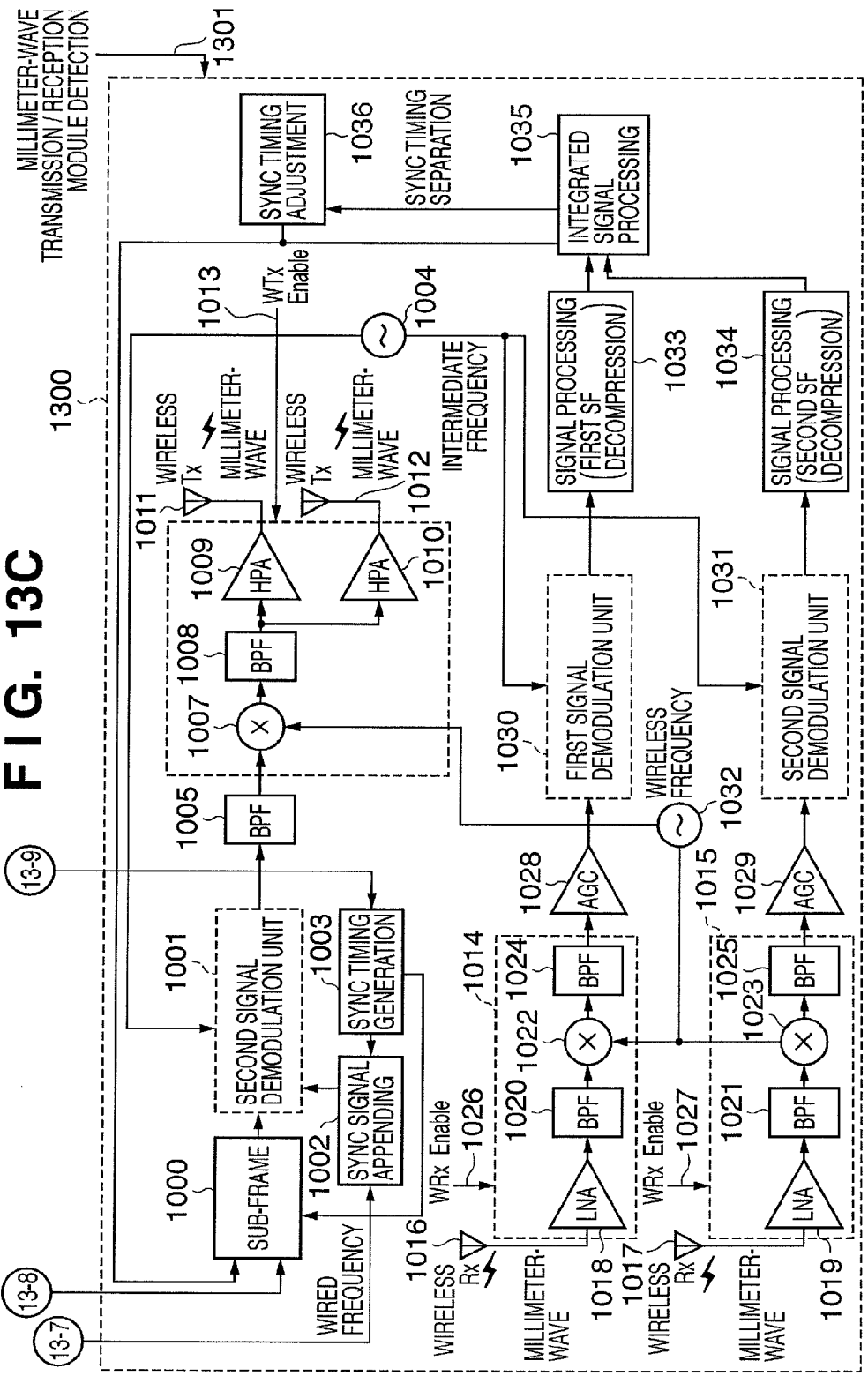
FIG. 13C is a block diagram showing the arrangement of the multi-SP controller (source device) in the case of a wired & 2.5 GHz to 5 GHz & millimeter-wave wireless communication connection state.
Figure 14B:
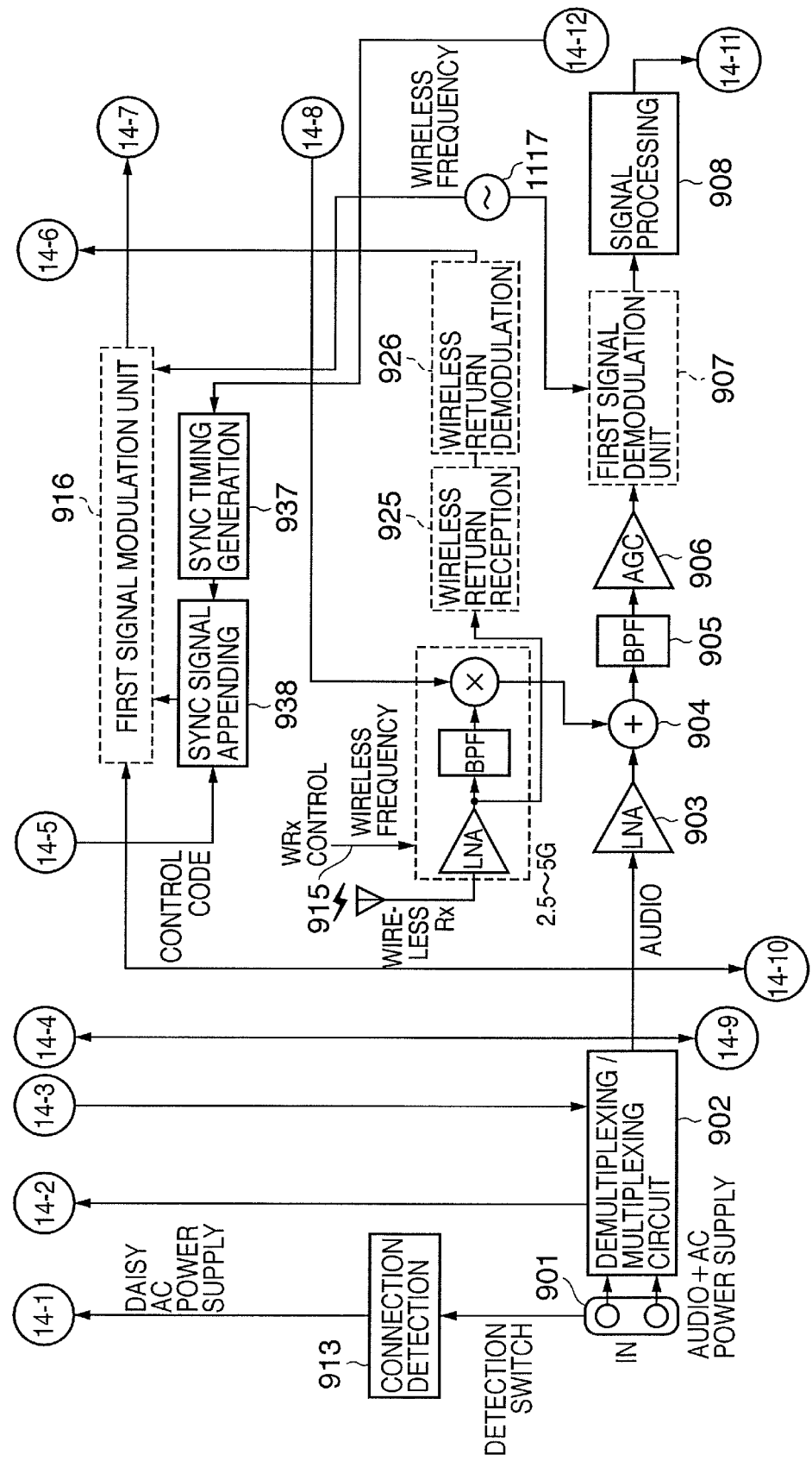
FIG. 14B is a block diagram showing the arrangement of the SP adapter (sink device) in the case of a wired & 2.5 GHz to 5 GHz & millimeter-wave wireless communication connection state.
Figure 14C:
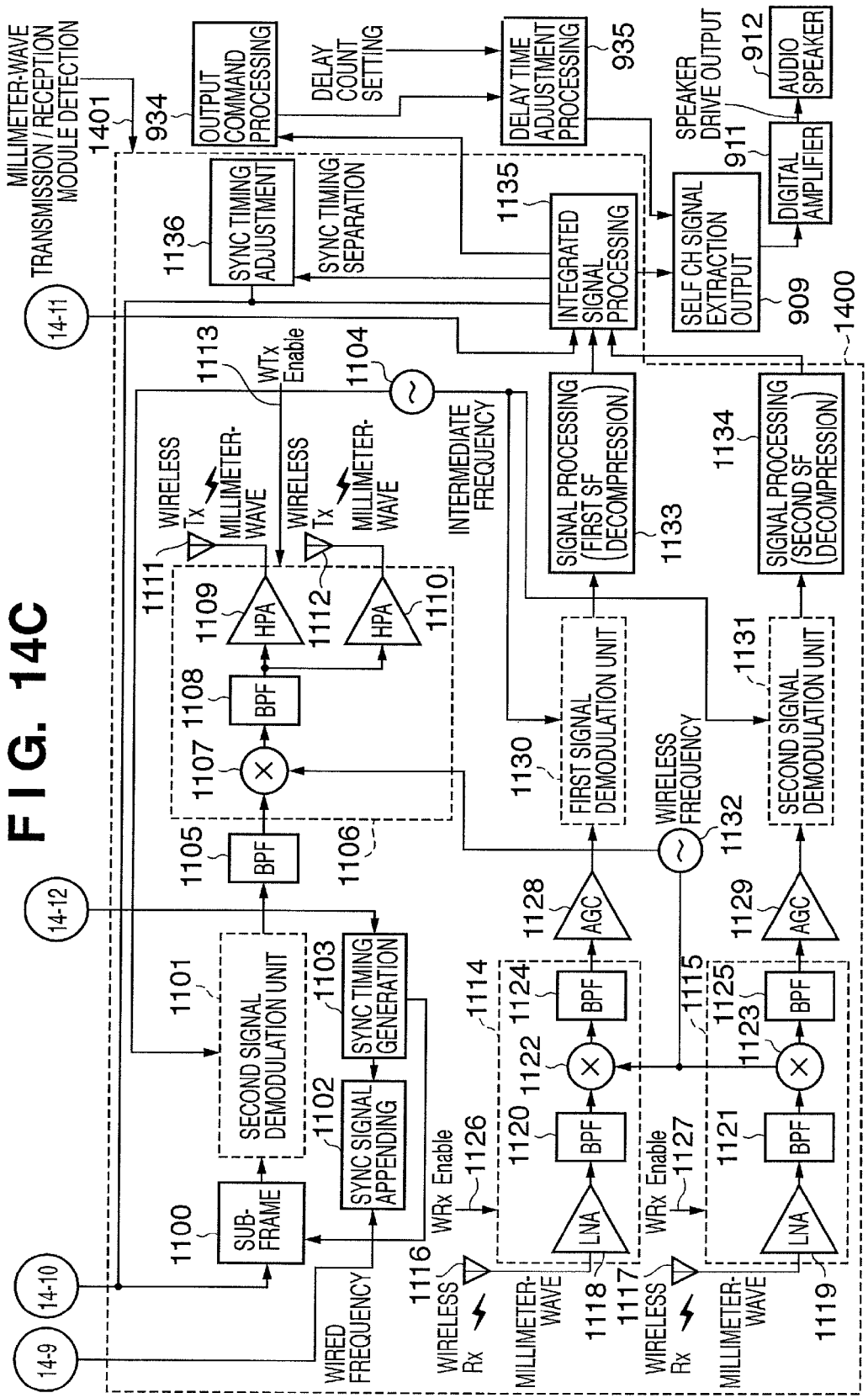
FIG. 14C is a block diagram showing the arrangement of the SP adapter (sink device) in the case of a wired & 2.5 GHz to 5 GHz & millimeter-wave wireless communication connection state.

FIGS. 13A to 13C are block diagrams of the multi-SP controller (source device) according to the third embodiment, and FIGS. 14A to 14C are block diagrams of the SP adapter (sink device).

FIGS. 13A to 13C implement the multi-SP controller using wired/2.5 GHz to 5 GHz band/millimeter-wave by combining the multi-SP controller using wired/2.5 GHz to 5 GHz wireless in FIGS. 8A to 8C and that using the wired/millimeter-waves in FIGS. 10A to 10C. In FIGS. 13A to 13C, the same reference numerals denote the same blocks as in FIGS. 8A to 8C and FIGS. 10A to 10C, and new reference numerals are assigned to only different blocks.

Referring to FIG. 13C, reference numeral 1300 denotes a millimeter-wave transmission/reception module (first wireless communication unit) which can receive millimeter-waves as the first frequency. The millimeter-wave transmission/reception module 1300 is detachable. The millimeter-wave transmission/reception module 1300 is prepared by combining as a module the blocks 1000 to 1036 in FIGS. 10B and 10C, and is attached as an add-on module via predetermined physical and electrical I/Fs. Note that the same module is used in the SP adapter in FIG. 14C as a millimeter-wave transmission/reception module 1400.

The source device comprises an attachment detection unit (attachment detection means) which detects whether or not the millimeter-wave transmission/reception module (first wireless communication unit) is attached. The attachment detection unit (attachment detection means) can detect based on a detection signal 1301 of the millimeter-wave transmission/reception module by means of a mechanical switch, electrical signal, or the like whether or not the module is attached. The detection result is sent to the syscon 807. Based on the detection result of the attachment detection unit (attachment detection means), the syscon 807 serves as communication control means which controls the millimeter-wave transmission/reception module (first wireless communication unit) and a 2.5 GHz to 5 GHz wireless communication unit (second wireless communication unit). Other blocks are the same as those described using FIGS. 8A to 8C and FIGS. 10A to 10C. The operation associated with audio transmission in the multi-SP controller shown in FIGS. 13A to 13C is the same as that of the wired & millimeter-waves in FIGS. 10A to 10C, and a repetitive description thereof will be avoided.

The 2.5 GHz to 5 GHz wireless communication unit (second wireless communication unit) in FIGS. 13A to 13C is used to exchange commands with the sink devices by 2.5 GHz to 5 GHz (second frequency) wireless communications. Since the commands use the command area 616 in the data/command frame shown in FIG. 6A, the operation for the commands is the same as that in FIGS. 8A to 8C, and a repetitive description thereof will be avoided.

FIGS. 14A to 14C implement an SP adapter using wired/2.5 GHz to 5 GHz band/millimeter-wave wireless communication by combining the SP adapter using wired/2.5 GHz to 5 GHz wireless communication in FIGS. 9A to 9C and that using the wired/millimeter-wave communication in FIGS. 11A to 11C. In FIGS. 14A to 14C, the same reference numerals denote the same blocks as in FIGS. 9A to 9C and FIGS. 11A to 11C, and new reference numerals are assigned to only different blocks.

Referring to FIG. 14C, reference numeral 1400 denotes a millimeter-wave transmission/reception module, which is prepared by combining as a module the blocks 1100 to 1136 in FIGS. 11B and 11C. The module 1400 is the same as the millimeter-wave transmission/reception module 1300 in FIG. 13C.

The adapter comprises an attachment detection unit (attachment detection means) as in the multi-SP controller. The attachment detection unit (attachment detection means) can detect based on a detection signal 1401 of the millimeter-wave transmission/reception module whether or not the module is attached, as in FIG. 13C. The detection result is sent to the syscon 910. Based on the detection result of the attachment detection unit (attachment detection means), the syscon 910 serves as communication control means which controls the millimeter-wave transmission/reception module (first wireless communication unit) and a 2.5 GHz to 5 GHz wireless communication unit (second wireless communication unit). Other blocks are the same as those described using FIGS. 9A to 9C and FIGS. 11A to 11C. The operation associated with audio transmission in the SP adapter shown in FIGS. 14A to 14C is the same as that of the wired & millimeter-waves in FIGS. 11A to 11C, and a repetitive description thereof will be avoided.

The 2.5 GHz to 5 GHz wireless communication unit (second wireless communication unit) in FIGS. 14A to 14C is used to exchange commands with the source device. Since the commands use the command area 616 in the data/command frame shown in FIG. 6A, the operation for the commands is the same as that in FIGS. 9A to 9C, and a repetitive description thereof will be avoided.

<Detection System and System Control Operation>

Figure 15A:
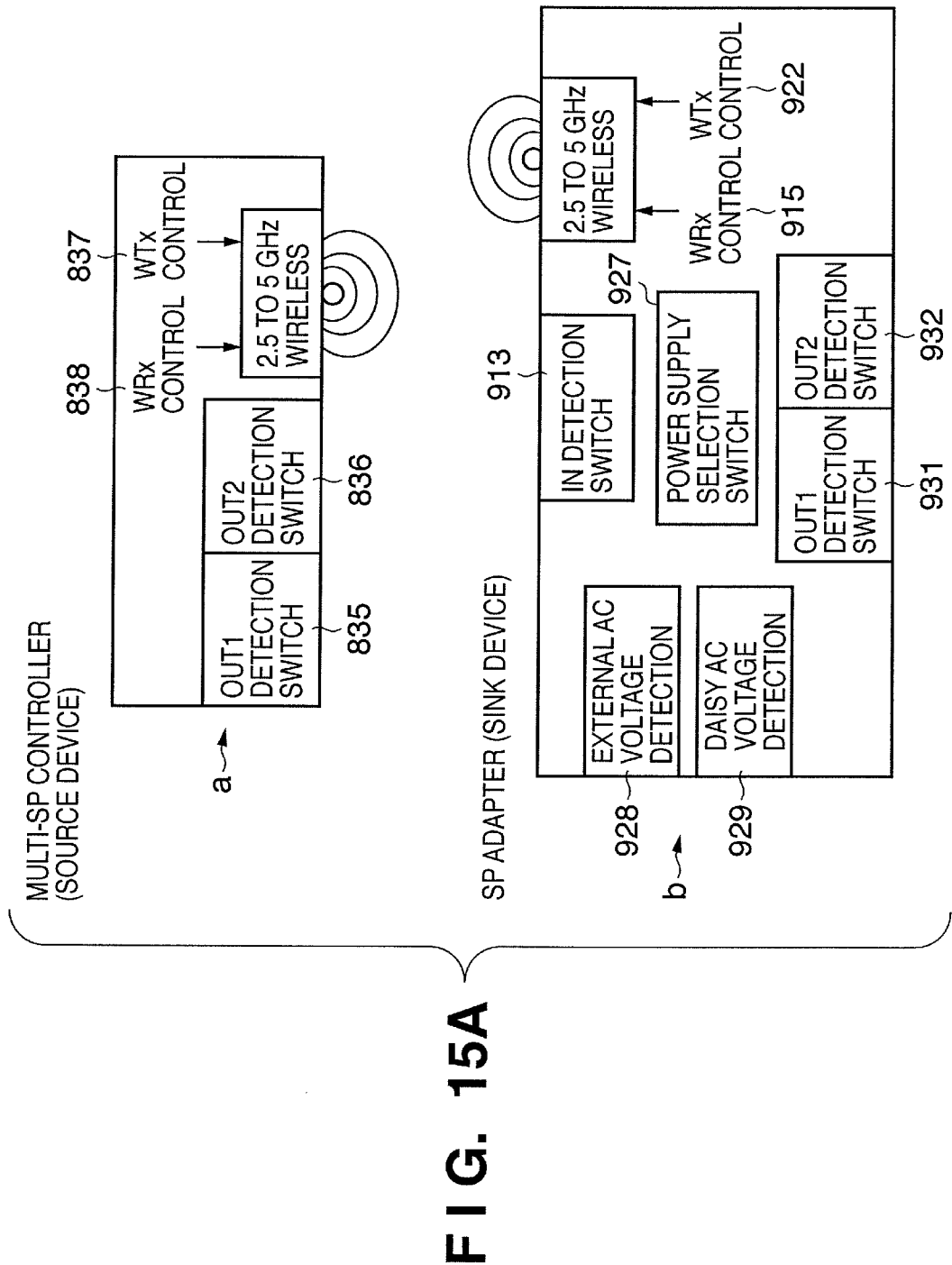
FIG. 15A is a diagram for explaining a system control operation in the case of a wired & 2.5 GHz to 5 GHz wireless communication connection state.

The system control operation associated with the first to third embodiments will be described below. The system control operation in the case of wired & 2.5 GHz to 5 GHz wireless communication will be described first with reference to FIG. 15A.

FIGS. 16A(1) to 16A(3) are flowcharts for explaining the system control flows of the multi-SP controller and SP adapter in the case of wired & 2.5 GHz to 5 GHz wireless communication.

The multi-SP controller checks in step S1600 if the wired OUT1 and OUT2 detection switches 835 and 836 detect the connections of the daisy connectors. If neither of these switches detect connections, since wireless transmission is required, the multi-SP controller activates the 2.5 GHz to 5 GHz wireless communication unit in step S1601. More specifically, the multi-SP controller enables the WRx control signal 838 and WTx control signal 837 (see FIGS. 8A to 8C). After that, the multi-SP controller executes the system setting operation by wirelessly transmitting a wireless setting command and detecting the connection states of respective sink devices (see FIGS. 4A and 4B).

On the other hand, if a connection is detected at either terminal, since a wired connection is detected, the multi-SP controller executes the system setting operation by transmitting a wired setting command via the wired connection and detecting the wired connection states of the respective sink devices in step S1602. The multi-SP controller checks if the number of detected wired connection devices (L) is smaller than the total number of devices (N) (S1603). If L=N, since there is no wireless connection device, the multi-SP controller does not activate the wireless communication unit (S1604).

On the other hand, if L<N, since M (=N−L) wireless connection devices are connected, the multi-SP controller sends a wireless ON command to the wired connection devices (S1605) and also activates its own wireless communication unit (see FIGS. 4A and 4B).

The SP adapter checks in step S1649 if the wired IN detection switch 913 detects connection of the daisy connector.

If no connection is detected (NO in S1649), the SP adapter checks the detection result of the AC voltage detection circuit of the external AC power supply in step S1650. If NO in step S1650, some abnormality has occurred (S1651); if YES in step S1650, the SP adapter controls the power supply selection switch 927 to switch to the external AC power supply side (S1652). In this way, the multiplexed AC power supply for the daisy wired output to the next stage can be obtained, and the AC power supply is supplied to the DC power supply circuit for internal circuits other than the detection system and syscon, thus activating the internal circuits other than the detection system and syscon.

After that, the syscon activates the wireless communication unit (S1653). More specifically the syscon enables the WRx control signal 915 and WTx control signal (wireless Tx control signal) 922 (see FIGS. 9A to 9C).

Subsequently, the SP adapter checks in step S1654 if the wired OUT1 and OUT2 detection switches 931 and 932 detect connections of the daisy connectors. If no wired connection is detected at these outputs (NO in S1654), an isolated wireless connection device is determined (S1655). Such device corresponds to the Front R 104, Rear L 105, and Rear R 106 in FIG. 1.

Figure 19:
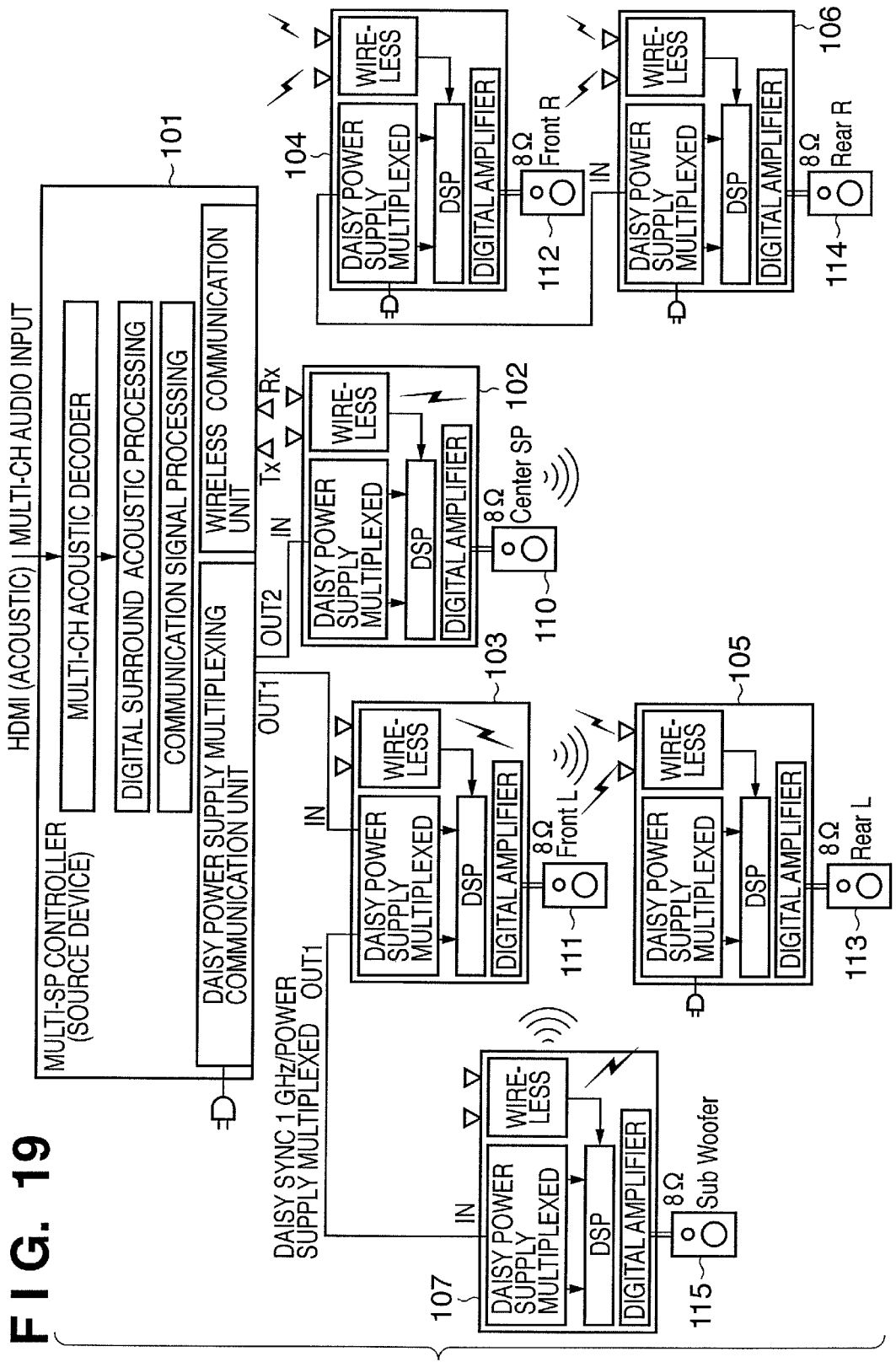
FIG. 19 is a block diagram showing another embodiment of a network surround system.
Figure 20:
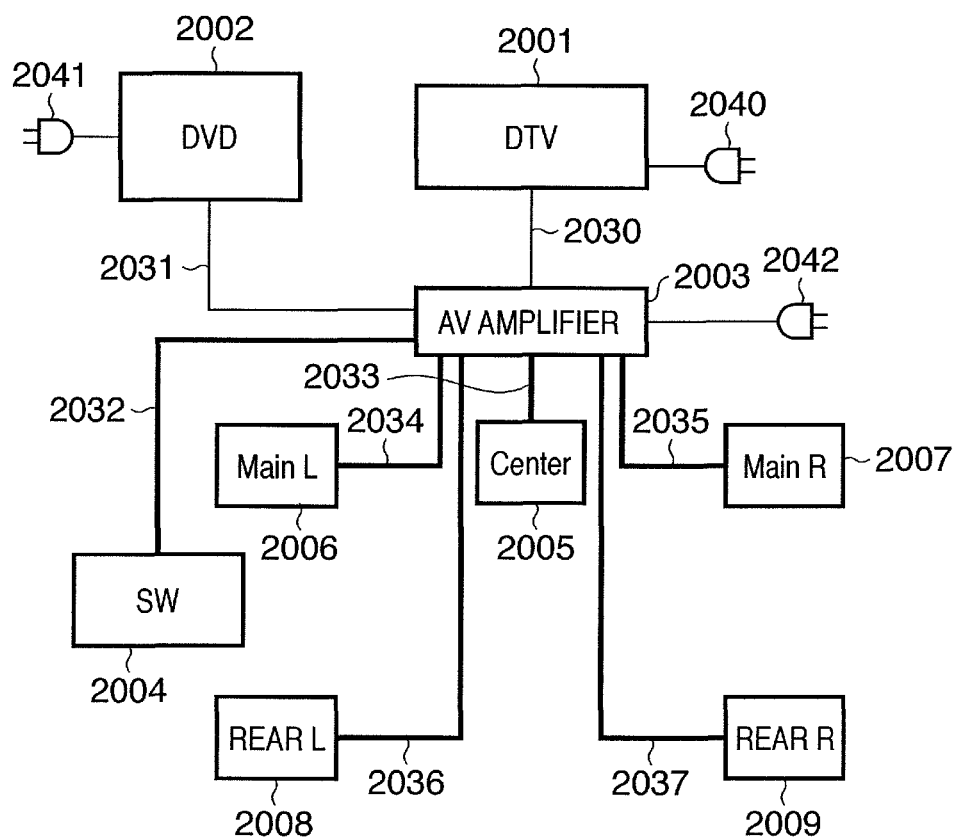
FIG. 20 is a block diagram showing the prior art of full-wired interconnections using analog speaker cables.
Figure 21:
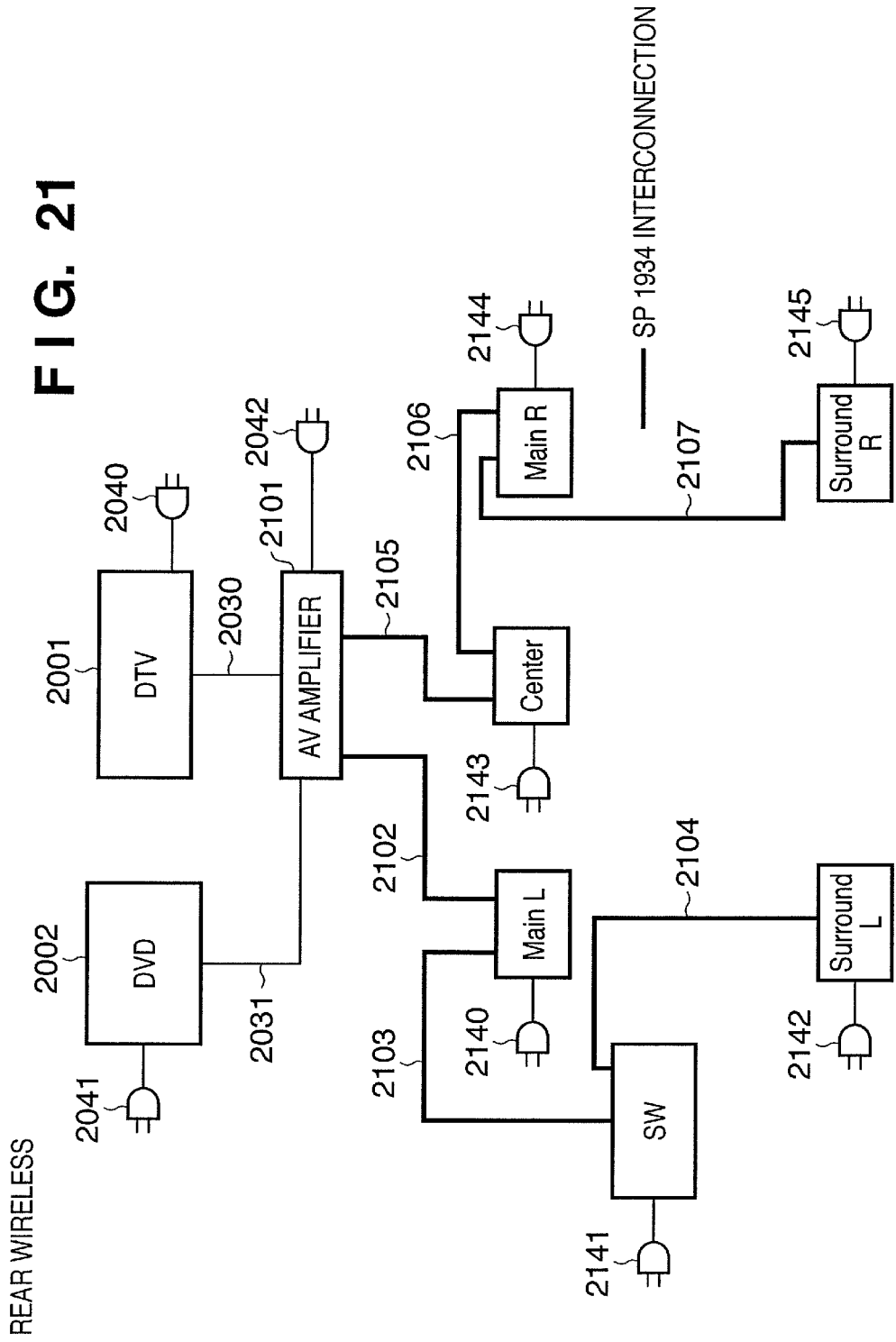
FIG. 21 is a block diagram showing the prior art of network interconnections using IEEE1394.
Figure 23:
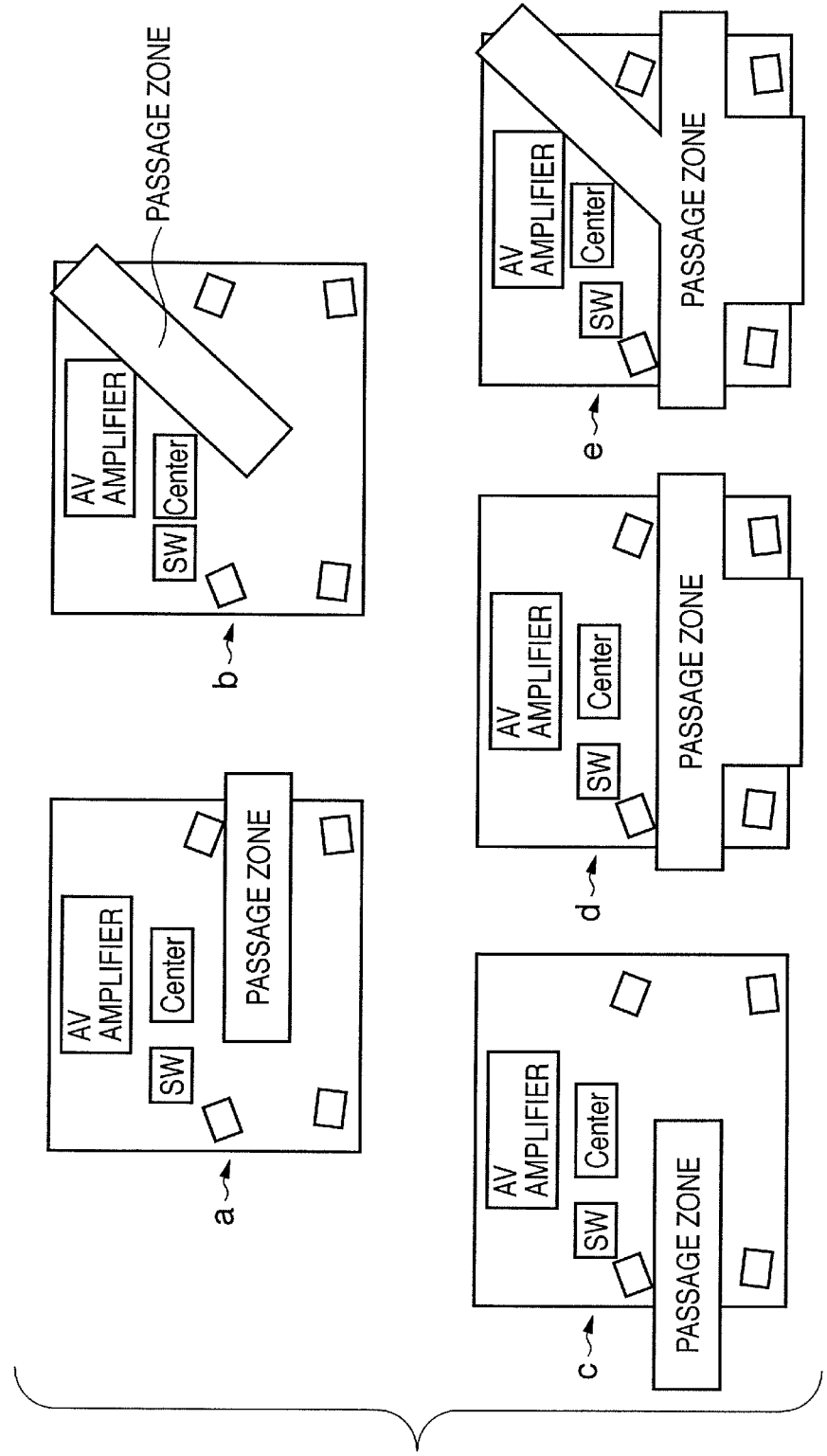
FIG. 23 shows an example of interconnection difficulty locations.

If YES in step S1654, since a wired connection is detected at either output, this corresponds to the case wherein the SP adapter also serves as a wired connection device like the Front R 104 in FIG. 19. In this case, the SP adapter must detect the wired connection states of the next stage and subsequent stages (S1656).

On the other hand, if YES in step S1649, the SP adapter checks in step S1657 the detection result of the AC voltage detection circuit of the AC power supply from the daisy wired IN. If NO in step S1657, some abnormality has occurred (S1662); if YES in step S1657, the SP adapter controls the power supply selection switch 927 to switch to the daisy AC power supply side (S1658). In this way, the multiplexed AC power supply for the daisy wired output to the next stage can be obtained, and the AC power supply is supplied to the DC power supply circuit for internal circuits other than the detection system and syscon, thus activating the internal circuits other than the detection system and syscon.

Subsequently, the SP adapter checks in step S1659 if the wired OUT1 and OUT2 detection circuits 931 and 932 detect connections of the daisy connectors. If NO in step S1659, that is, if no wired connection is detected at both the outputs, that SP adapter serves as a wired connection device at the terminal end, and corresponds to the Center SP 102 and Sub-Woofer 107 in FIG. 1. In this case, the SP adapter waits for reception of a wireless ON command from the source device (S1660). If YES in step S1659, since a wired connection is detected at either output, this corresponds to the case wherein the SP adapter also serves as a wired connection device like the Front L 103 in FIG. 1. In this case, the SP adapter must detect the wired connection states of the next stage and subsequent stages (S1661).

The reason why the AC voltage detection steps (S1650, S1657) are provided in the aforementioned system control flow in addition to the wired IN daisy connector connection detection step (S1649) is to allow distinguishing, for example, a case wherein an idle line is inserted.

The system control operation in case of wired & millimeter-waves will be described below with reference to FIG. 15B. FIGS. 16B(1) to 16B(3) are flowcharts showing the system control flows of the multi-SP controller and SP adapter.

The multi-SP controller checks in step S1610 if the wired OUT1 and OUT2 detection switches 835 and 836 detect connections of daisy connectors. If neither of these switches detect connections, since wireless transmission is required, the multi-SP controller activates the millimeter-wave wireless communication unit in step S1611. More specifically, the multi-SP controller enables the WRx Enable1 and Enable2 signals 1026 and 1027 and WTx Enable signal 1013 (see FIGS. 10A to 10C). After that, the multi-SP controller executes the system setting operation by wirelessly transmitting a wireless setting command and detecting the connection states of respective sink devices (see FIGS. 4A and 4B).

On the other hand, if a connection is detected at either terminal, since a wired connection is detected, the multi-SP controller executes the system setting operation by transmitting a wired setting command via the wired connection and detecting the wired connection states of the respective sink devices in step S1612. The multi-SP controller checks if the number of detected wired connection devices (L) is smaller than the total number of devices (N) (S1613). If L=N, since there is no wireless connection device, the multi-SP controller does not activate the wireless communication unit (S1614).

On the other hand, if L<N, since M (=N–L) wireless connection devices are connected, the multi-SP controller sends a wireless ON command to the wired connection devices (S1615) and also activates its own wireless communication unit (see FIGS. 4A and 4B).

The SP adapter checks in step S1670 if the wired IN detection switch 913 detects connection of the daisy connector. If no connection is detected (NO in S1670), the SP adapter checks the detection result of the AC voltage detection circuit of the external AC power supply in step S1671a.

If NO in step S1671a, some abnormality has occurred (S1671b); if YES in step S1671a, the SP adapter controls the power supply selection switch 927 to switch to the external AC power supply side (S1672). In this way, the multiplexed AC power supply for the daisy wired output to the next stage can be obtained, and the AC power supply is supplied to the DC power supply circuit for internal circuits other than the detection system and syscon, thus activating the internal circuits other than the detection system and syscon. After that, the syscon activates the wireless communication unit (S1673). More specifically the syscon enables the WRx Enable1 and Enable2 signals 1126 and 1127 and WTx Enable signal 1113 (see FIGS. 11A to 11C).

Subsequently, the SP adapter checks in step S1674 if the wired OUT1 and OUT2 detection switches 931 and 932 detect connections of daisy connectors. If no wired connection is detected at these outputs, an isolated wireless connection device is determined (S1675). In case of millimeter-waves, since transfer is required to take a measure against blocking, the SP adapter activates the millimeter-wave communication unit for the purpose of transfer. This corresponds to the Front R 104, Rear L 105, and Rear R 106 in FIGS. 1 and 7C.

If YES in step S1674, since a wired connection is detected at either output, this corresponds to the case wherein the SP adapter also serves as a wired connection device like the Front R 104 in FIG. 19. In this case, the SP adapter must detect the wired connection states of the next stage and subsequent stages (S1676).

On the other hand, if YES in step S1670, the SP adapter checks in step S1677a the detection result of the AC voltage detection circuit of the AC power supply from the daisy wired IN.

If NO in step S1677a, some abnormality has occurred (S1677b); if YES in step S1677a, the SP adapter controls the power supply selection switch 927 to switch to the daisy AC power supply side (S1678). In this way, the multiplexed AC power supply for the daisy wired output to the next stage can be obtained, and the AC power supply is supplied to the DC power supply circuit for internal circuits other than the detection system and syscon, thus activating the internal circuits other than the detection system and syscon.

Subsequently, the SP adapter checks in step S1679 if the wired OUT1 and OUT2 detection circuits 931 and 932 detect connections of the daisy connectors. If no wired connection is detected at both the outputs (NO in S1679), that SP adapter serves as a wired connection device at the terminal end, and corresponds to the Center SP 102 and Sub-Woofer 107 in FIG. 1. In this case, the SP adapter waits for reception of a wireless ON command from the source device (S1680).

If YES in step S1679, since the wired connection is detected at either output, this corresponds to the case wherein the SP adapter also serves as a wired connection device like the Front L 103 in FIG. 1. In this case, the SP adapter must detect the wired connection states of the next stage and subsequent stages (S1681).

Figure 7D:
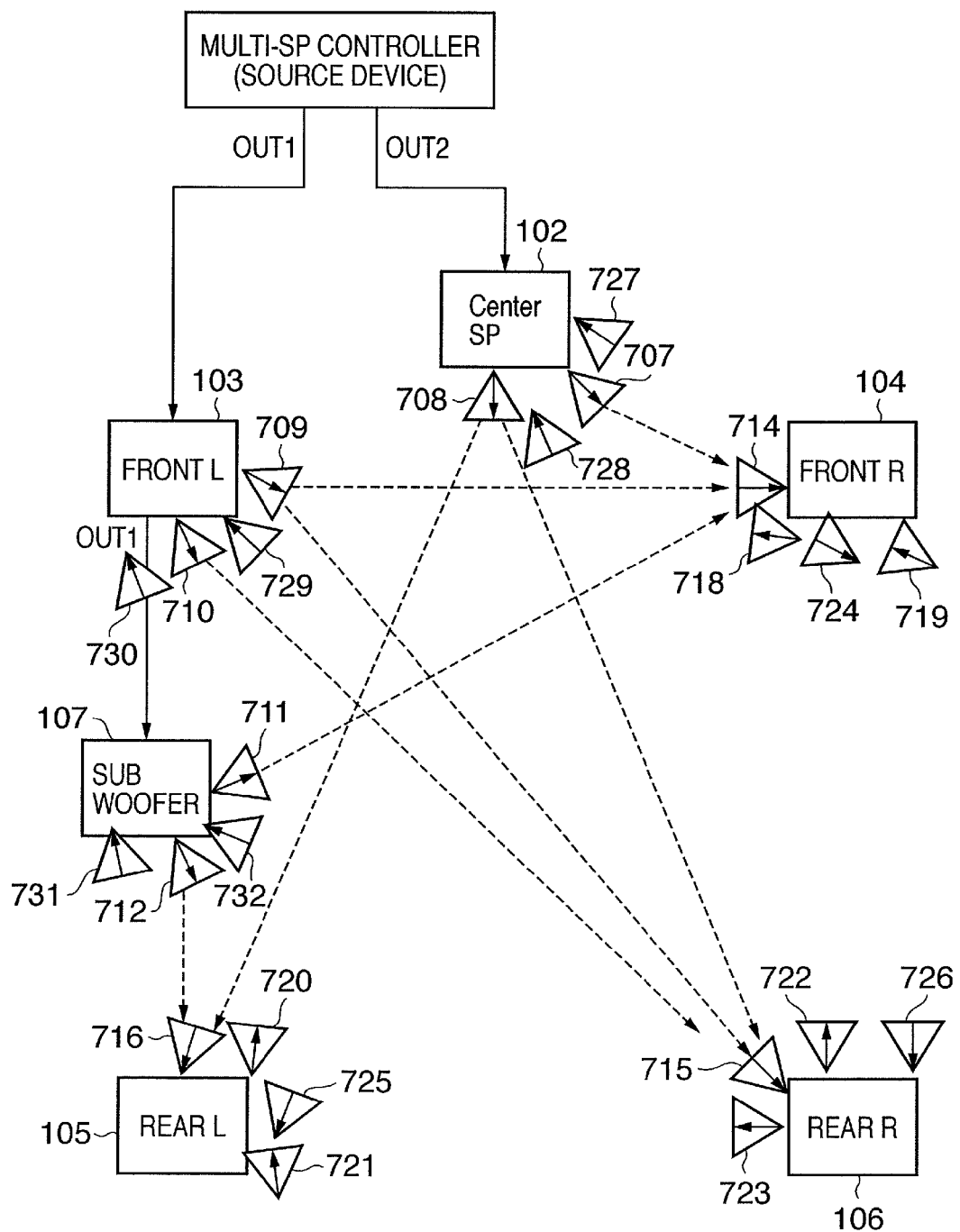
FIG. 7D is a diagram for explaining understanding of a wireless connection state using 60 GHz-band millimeter-waves.

In the case of millimeter-wave communication as well, the wireless connection states are to be detected like in the case of 2.5 GHz to 5 GHz wireless communication. However, it is impossible to detect the wireless connection states in practice without any special method such as the directivity rotation control of the antennas and the like. That is, upon detecting the wireless connection states in the system setting, as shown in FIG. 7D, the directions of the antennas 718 to 726 used in transfer/transmission/reception are rotated or their directivities are moved to face the millimeter-wave antennas of the wired connection devices.

The wired connection devices use the reception antennas 727 to 732 to direct them to face the wireless connection devices. In this way, the wired connection devices and wireless connection device can exchange commands. In this case, transmission/reception using the frame can be made without using any sub-frame.

Figure 15C:
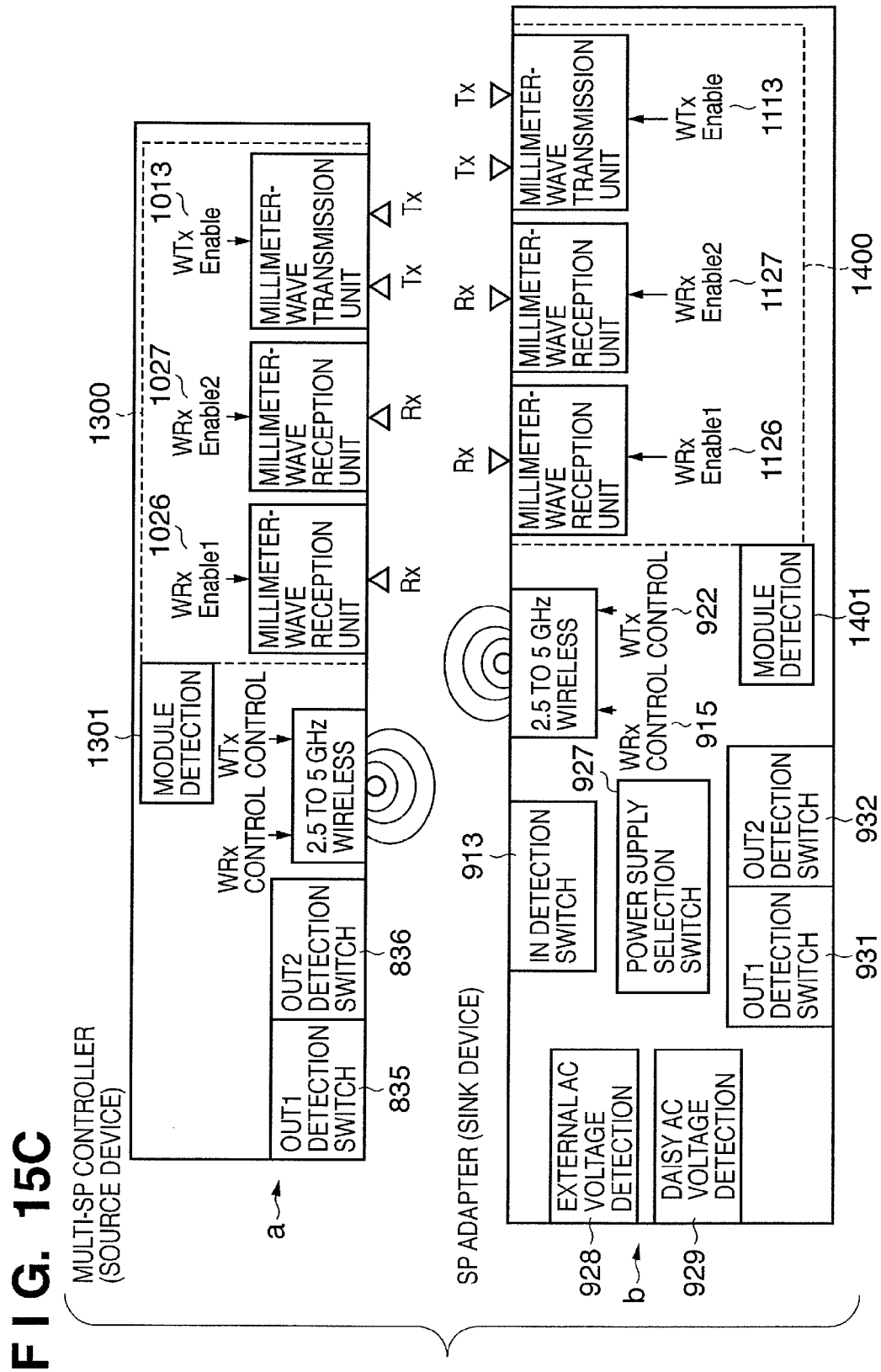
FIG. 15C is a diagram for explaining a system control operation in the case of wired & 2.5 GHz to 5 GHz & millimeter-wave wireless communication.

The system control operation in the case of wired, and 2.5 GHz to 5 GHz & millimeter-wave wireless communication will be described below with reference to FIG. 15C. In this case, the setting operations such as the system setting, delay time measurement, and the like by means of exchange of commands use the 2.5 GHz to 5 GHz wireless, and wireless data transmission uses the millimeter-waves. In this way, the millimeter-waves can be exclusively used in data transmission/reception, and no directivity rotation control of the antennas is required for exchanging commands.

FIGS. 16C(1) to 16C(3) are flowcharts showing the system control flows of the multi-SP controller and SP adapter.

The multi-SP controller checks in step S1618 if the millimeter-wave module is connected. If NO in step S1618, since the millimeter-wave module is not attached, the subsequent processing is the same as that in the case of wired & 2.5 GHz to 5 GHz wireless communication in FIGS. 16A(1) to 16A(3) (S1619).

If YES in step S1618, since the millimeter-wave module is attached, the wireless communications are selectively used: the setting operation uses the 2.5 GHz to 5 GHz wireless, and the wireless data transmission uses the millimeter-waves.

The multi-SP controller checks in step S1620 if the wired OUT1 and OUT2 detection switches 835 and 836 detect the connections of the daisy connectors. If neither of these switches detect connections, since wireless transmission is required, the multi-SP controller activates the 2.5 GHz to 5 GHz wireless communication unit for setting and the millimeter-wave wireless communication unit for data transmission in step S1621. More specifically, the multi-SP controller enables the WRx control signal 838, WTx control signal 837, WRx Enable1 and Enable2 signals 1026 and 1027, and WTx Enable signal 1013. After that, the multi-SP controller executes the system setting operation by wirelessly transmitting a wireless setting command at the frequency of the 2.5 GHz to 5 GHz band and detecting the connection states of respective sink devices (see FIGS. 4A and 4B).

On the other hand, if a connection is detected at either one terminal, since a wired connection is detected, the multi-SP controller executes the system setting operation by transmitting a wired setting command via the wired connection and detecting the wired connection states of the respective sink devices in step S1622. The multi-SP controller checks if the number of detected wired connection devices (L) is smaller than the total number of devices (N) (S1623). If L=N, since there is no wireless connection device, the multi-SP controller does not activate the wireless communication unit (S1624).

On the other hand, if L<N, since M (=N−L) wireless connection devices are connected, the multi-SP controller sends a wireless ON command to the wired connection devices (S1625) and also activates its own 2.5 GHz to 5 GHz wireless communication unit and millimeter-wave wireless communication unit (see FIGS. 4A and 4B).

The SP adapter checks in step S1682 if the wired IN detection switch 913 detects connection of the daisy connector.

If no connection is detected (NO in S1682), the SP adapter checks the detection result of the AC voltage detection circuit of the external AC power supply in step S1683. If NO in step S1683, some abnormality has occurred (S1684); if YES in step S1683, the SP adapter controls the power supply selection switch 927 to switch to the external AC power supply side (S1685). In this way, the multiplexed AC power supply for the daisy wired output to the next stage can be obtained, and the AC power supply is supplied to the DC power supply circuit for internal circuits other than the detection system and syscon, thus activating the internal circuits other than the detection system and syscon. The SP adapter checks if the millimeter-wave module is connected (S1686). If NO in step S1686, since the millimeter-wave module is not attached, the subsequent processing is the same as that in the case of wired & 2.5 GHz to 5 GHz wireless communication in FIGS. 16A (1) to 16A(3) (S1687). If YES in step S1686, since the millimeter-wave module is attached, the wireless communications are selectively used: the setting operation uses the 2.5 GHz to 5 GHz wireless, and the wireless data transmission uses the millimeter-waves.

The syscon then activates the 2.5 GHz to 5 GHz wireless communication unit for setting and the millimeter-wave wireless communication unit for data transmission (S1688). More specifically, the syscon enables the WRx control signal 915, WTx control signal 922, WRx Enable1 and Enable2 signals 1126 and 1127, and WTx Enable signal 1113.

Subsequently, the SP adapter checks in step S1689 if the wired OUT1 and OUT2 detection switches 931 and 932 detect connections of the daisy connectors. If no wired connection is detected at these outputs (NO in S1689), an isolated wireless connection device is determined (S1690). In the case of millimeter-waves, since transfer is required to take a measure against blocking, the SP adapter activates the millimeter-wave communication unit for the purpose of transfer. This corresponds to the Front R 104, Rear L 105, and Rear R 106 in FIGS. 1 and 7C. At the same time, the SP adapter activates the 2.5 GHz to 5 GHz wireless communication unit for setting.

If YES in step S1689, since a wired connection is detected at either output, this corresponds to the case wherein the SP adapter also serves as the wired connection device like the Front R 104 in FIG. 19. In this case, the SP adapter must detect the wired connection states of the next stage and subsequent stages (S1691).

On the other hand, if YES in step S1682, the SP adapter checks in step S1692 the detection result of the AC voltage detection circuit of the AC power supply from the daisy wired IN. If NO in step S1692, some abnormality has occurred (S1693); if YES in step S1692, the SP adapter controls the power supply selection switch 927 to switch to the daisy AC power supply side (S1694). In this way, the multiplexed AC power supply for the daisy wired output to the next stage can be obtained, and the AC power supply is supplied to the DC power supply circuit for internal circuits other than the detection system and syscon, thus activating the internal circuits other than the detection system and syscon.

The SP adapter checks if the millimeter-wave module is connected (S1695). If NO in step S1695, since the millimeter-wave module is not attached, the subsequent processing is the same as that in the case of wired & 2.5 GHz to 5 GHz wireless communication in FIGS. 16A(1) to 16A(3) (S1696). If YES in step S1695, since the millimeter-wave module is attached, the wireless communications are selectively used: the setting operation uses the 2.5 GHz to 5 GHz wireless, and the wireless data transmission uses the millimeter-waves.

Subsequently, the SP adapter checks in step S1697 if the wired OUT1 and OUT2 detection circuits 931 and 932 detect connections of the daisy connectors. If no wired connection is detected at both the outputs (NO in S1697), that SP adapter serves as a wired connection device at the terminal end, and corresponds to the Center SP 102 and Sub-Woofer 107 in FIG. 1. In this case, the SP adapter waits for reception of a wireless ON command from the source device (S1698).

If YES in step S1697, since a wired connection is detected at either output, this corresponds to the case wherein the SP adapter also serves as a wired connection device like the Front L 103 in FIG. 1. In this case, the SP adapter must detect the wired connection states of the next stage and subsequent stages (S1699).

This embodiment has been explained taking the network surround system as an example. However, the present invention is not limited to this, and can be similarly applied to display control of video information using multi-displays and the like.

As described above, according to the embodiment of the present invention, the total number of interconnections of the speaker cables and power supply interconnections can be reduced, and the interconnections themselves can be simplified.

According to the embodiments of the present invention, since a network I/F on the playback device side can be configured without any advanced-function CPU and time stamp-compatible hardware, low cost can be attained.

According to the embodiments of the present invention, since wireless interconnections can be adopted at arbitrary locations to cope with failures in terms of actual interconnections depending on the installation locations in home, a flexible communication system can be realized.

Other Embodiments

Note that the objects of the present invention are also achieved by supplying a storage medium, which records a program code of software that can implement the functions of the above-mentioned embodiments to a system or apparatus. Also, the objects can be achieved when a computer (or a CPU or MPU) of the system or apparatus reads out and executes the program code stored in the storage medium.

In this case, the program code itself read out from the storage medium implements the functions of the aforementioned embodiments, and the storage medium which stores the program code constitutes the present invention.

As the storage medium for supplying the program code, for example, a flexible disk, hard disk, optical disk, magneto-optical disk, CD-ROM, CD-R, nonvolatile memory card, ROM, and the like may be used.

The functions of the above-mentioned embodiments are implemented when the computer executes the readout program code. Also, an OS (operating system) running on the computer executes some or all of actual processing operations based on an instruction of the program code to implement the above-mentioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-243399, filed Sep. 7, 2006 and Japanese Patent Application No. 2007-139527, filed May 25, 2007, which are hereby incorporated by reference herein in their entirety.

What is claimed is:

1. A communication system having a controller for transmitting data to be played back by a plurality of playback devices corresponding to a plurality of channels, and a plurality of adapters for executing playback by the plurality of playback devices, the controller comprising:

a first determination unit configured to determine whether each of the plurality of adapters receives data via wired transmission or wireless transmission;

a second determination unit configured to determine a delay count value of the data to be received by an adapter of the plurality of adapters for receiving the data via the wireless transmission determined by the first determination unit;

a setting unit configured to set data to be played back by the plurality of playback devices and control information for indicating a delay period, corresponding to the delay count value determined by adding delay time differences between a maximum delay time and delay times of respective adapters to a processing delay time of a delay time adjustment processing circuit, to be delayed upon playback of the data to be played back in time slots of a sync transmission frame, wherein the delay period is indicated based on a frame length of the sync transmission frame; and a transmission unit configured to transmit the sync transmission frame set by the setting unit to the plurality of adapters, wherein each of the plurality of adapters comprises:

a reception unit configured to receive the sync transmission frame transmitted by the transmission unit; and a playback control unit configured to extract data corresponding to the channel to be played back by the adapter from the sync transmission frame, and control a playback timing of the data based on control information corresponding to the data.

2. The communication system according to claim 1, wherein the controller further comprises:

a maximum delay time calculation unit configured to collect delay times from data reception timings until playback of the respective adapters, and calculate the maximum delay time for the adapters;

a difference calculation unit configured to calculate the differences between the maximum delay time and the delay times of the respective adapters; and a difference notification unit configured to notify the respective adapters of the differences, and wherein each of the plurality of adapters further comprises a correction unit configured to correct the playback timing for playing back the data based on the difference notified by the difference notification unit.

3. The communication system according to claim 1, wherein the controller further comprises:

a first wired connection detection unit configured to detect the presence or absence of a wired connection between a wired communication unit of the controller and each adapter;

a first activation unit configured to execute activation of a wireless communication unit of the controller based on the detection result of the first wired connection detection unit; and an activation signal transmission unit configured to transmit an activation signal used to synchronize activation of the wireless communication unit of the controller and a wireless communication unit of each adapter, and wherein each of the plurality of adapters further comprises a second activation unit configured to execute activation of the wireless communication unit of the adapter based on reception of the activation signal.

4. The communication system according to claim 1, wherein the controller further comprises a correspondence notification unit configured to notify correspondence between positions of the time slots and roles of the respective channels, and wherein each adapter further comprises a data extraction unit configured to extract the data corresponding to the adapter based on the correspondence from the sync transmission frame.

5. The communication system according to claim 1, wherein the time slot corresponding to each channel in the sync transmission frame includes header information for each adapter to extract the data.

6. The communication system according to claim 1, wherein the control information includes information indicating if the data is a frame or a sub-frame, and information associated with a frame sync period to be delayed upon playback of the data or a sub-frame sync period to be delayed for each sub-frame upon playback of the data.

7. The communication system according to claim 3, wherein each of the plurality of adapters further comprises a second wired connection detection unit configured to detect the presence or absence of a wired connection to a wired communication unit of the adapter, and wherein the second activation unit is configured to activate the wireless communication unit if the second wired connection detection unit detects that the wired connection to the wired communication unit is absent.

8. The communication system according to claim 7, wherein each of the plurality of adapters further comprises:

a first voltage detection unit configured to detect a multiplexed AC voltage via the wired connection to the wired communication unit of the adapter;

a second voltage detection unit configured to detect a voltage of an external AC power supply; and a power supply switching unit configured to switch a power supply based on the detection results of the first voltage detection unit, the second voltage detection unit, and the second wired connection detection unit.

9. The communication system according to claim 8, wherein the power supply switching unit is configured to switch to the voltage of the external AC power supply if the second wired connection detection unit detects that the wired connection to the wired communication unit is absent and the second voltage detection unit detects the voltage from the external AC power supply.

10. The communication system according to claim 3, wherein the controller further comprises:

a collection unit configured to collect information of a received signal strength indication based on a wireless connection notification transmitted from each adapter;

a comparison unit configured to compare the information of the received signal strength indication collected by the collection unit with a predetermined setting value; and a wireless connection control unit configured to, when the information of the received signal strength indication is larger than the setting value as a result of comparison by the comparison unit, determine the adapter whose wireless communication unit is to be stopped, and transmit a command for stopping a wireless connection to the determined adapter, and wherein the second activation unit is configured to stop wireless communication by the wireless communication unit based on reception of the command for stopping the wireless connection.

11. The communication system according to claim 3, wherein each of the wireless communication unit of the controller and the wireless communication unit of each of the plurality of adapters, comprises:
- an interface configured to attach a first wireless communication unit configured to make a wireless communication using a first frequency; and
- a second wireless communication unit configured to make a wireless communication using a second frequency lower than the first frequency.

12. The communication system according to claim 11, wherein each of the controller and the plurality of adapters comprises:
- an attachment detection unit configured to detect the presence or absence of attachment of the first wireless communication unit via the interface; and
- a communication control unit configured to control the first wireless communication unit and the second wireless communication unit if the first wireless communication unit is attached via the interface based on the detection result of the attachment detection unit, and
- wherein the communication control unit is configured to selectively use the first wireless communication unit for transmitting the data, and the second wireless communication unit for performing a setting operation if the attachment detection unit detects that the first wireless communication unit is attached via the interface.

13. A controller for transmitting, in a communication system comprising a plurality of adapters for executing playback by a plurality of playback devices corresponding to a plurality of channels, data to be played back by the plurality of playback devices, the controller comprising:
- a first determination unit configured to determine whether each of the plurality of adapters receives data via wired transmission or wireless transmission;
- a second determination unit configured to determine a delay count value of the data to be received by an adapter of the plurality of adapters for receiving the data via the wireless transmission determined by the first determination unit;
- a setting unit configured to set data to be played back by the plurality of playback devices and control information for indicating a delay period, corresponding to the delay count value determined by adding delay time differences between a maximum delay time and delay times of respective adapters to a processing delay time of a delay time adjustment processing circuit, to be delayed upon playback of the data to be played back in time slots of a sync transmission frame, wherein the delay period is indicated based on a frame length of the sync transmission frame; and
- a transmission unit configured to transmit the sync transmission frame set by the setting unit to the plurality of adapters.

14. A method of transmitting, in a communication system comprising a controller for transmitting data and a plurality of adapters for executing playback by a plurality of playback devices corresponding to a plurality of channels, the data to be played back by the plurality of playback devices, the method comprising:
- determining, in a first determining step, whether each of the plurality of adapters receives data via wired transmission or wireless transmission;
- determining, in a second determining step, a delay count value of the data to be received by an adapter of the plurality of adapters for receiving the data via the wireless transmission determined in the first determining step;
- setting data to be played back by the plurality of playback devices and control information for indicating a delay period, corresponding to the delay count value determined by adding delay time differences between a maximum delay time and delay times of respective adapters to a processing delay time of a delay time adjustment processing circuit, to be delayed upon playback of the data to be played back in time slots of a sync transmission frame based on determination results of the first and second determining steps in time slots of the sync transmission frame, wherein the delay period is indicated based on a frame length of the sync transmission frame;
- transmitting the set sync transmission frame to the plurality of adapters;
- receiving at each adapter the sync transmission frame;
- extracting data corresponding to the channel to be played back by each adapter from the sync transmission frame; and
- controlling a playback timing of the data based on control information corresponding to the data.

15. A method of transmitting, in a communication system comprising a controller for executing the method of transmitting data and a plurality of adapters for executing playback by a plurality of playback devices corresponding to a plurality of channels, data to be played back by the plurality of playback devices, the method comprising:
- determining, in a first determining step, whether each of the plurality of adapters receives data via wired transmission or wireless transmission;
- determining, in a second determining step, a delay count value of the data to be received by an adapter of the plurality of adapters for receiving the data via the wireless transmission determined in the first determining step;
- setting data to be played back by the plurality of playback devices and control information for indicating a delay period, corresponding to the delay count value determined by adding delay time differences between a maximum delay time and delay times of respective adapters to a processing delay time of a delay time adjustment processing circuit, to be delayed upon playback of the data to be played back in time slots of a sync transmission frame based on determination results of the first and second determining steps in time slots of the sync transmission frame, wherein the delay period is indicated based on a frame length of the sync transmission frame; and
- transmitting the set sync transmission frame to the plurality of adapters.

* * * * *